(12) United States Patent
Howard et al.

(10) Patent No.: US 7,941,479 B2
(45) Date of Patent: May 10, 2011

(54) PARALLEL PROCESSING SYSTEMS AND METHOD

(75) Inventors: Kevin David Howard, Louisville, CO (US); Glen Curtis Rea, Longmont, CO (US); Nick Wade Robertson, Aurora, CO (US); Silva Chang, Boulder, CO (US)

(73) Assignee: Massively Parallel Technologies, Inc., Louisville, CO (US)

( * ) Notice: Subject to any disclaimer, the term of this patent is extended or adjusted under 35 U.S.C. 154(b) by 0 days.

(21) Appl. No.: 12/636,447

(22) Filed: Dec. 11, 2009

(65) Prior Publication Data

US 2010/0094924 A1    Apr. 15, 2010

Related U.S. Application Data

(60) Continuation of application No. 12/197,881, filed on Aug. 25, 2008, now Pat. No. 7,730,121, which is a division of application No. 10/340,524, filed on Jan. 10, 2003, now Pat. No. 7,418,470, which is a continuation-in-part of application No. 09/603,020, filed on Jun. 26, 2000, now Pat. No. 6,857,004.

(60) Provisional application No. 60/347,325, filed on Jan. 10, 2002.

(51) Int. Cl.
*G06F 15/16* (2006.01)
(52) U.S. Cl. ........ 709/201; 709/205; 709/217; 709/218; 706/10; 718/108
(58) Field of Classification Search .................. 709/201, 709/205, 217, 218; 718/108; 706/10
See application file for complete search history.

(56) References Cited

U.S. PATENT DOCUMENTS

| | | | |
|---|---|---|---|
| 5,166,674 A | | 11/1992 | Baum et al. |
| 5,224,100 A | * | 6/1993 | Lee et al. ...................... 370/408 |
| 5,325,526 A | | 6/1994 | Pierce et al. |
| 5,349,682 A | | 9/1994 | Rosenberry |
| 5,371,852 A | | 12/1994 | Attanasio et al. |
| 5,488,609 A | | 1/1996 | Hluchyj et al. |

(Continued)

FOREIGN PATENT DOCUMENTS

EP    0107453    5/1984

(Continued)

OTHER PUBLICATIONS

Thibodeaux, "Organizers Hope To Give Lafayatte Superstart In High-Tech Direction", Oct. 27, Supercomputeronline.com, 2 pages.

(Continued)

*Primary Examiner* — Liangche A. Wang
(74) *Attorney, Agent, or Firm* — Lathrop & Gage LLP

(57) ABSTRACT

Methods and systems for parallel computation of an algorithm using a plurality of nodes configured as a Howard Cascade. A home node of a Howard Cascade receives a request from a host system to compute an algorithm identified in the request. The request is distributed to processing nodes of the Howard Cascade in a time sequence order in a manner to minimize the time to so expand the Howard Cascade. The participating nodes then perform the designated portion of the algorithm in parallel. Partial results from each node are agglomerated upstream to higher nodes of the structure and then returned to the host system. The nodes each include a library of stored algorithms accompanied by data template information defining partitioning of the data used in the algorithm among the number of participating nodes.

18 Claims, 63 Drawing Sheets

U.S. PATENT DOCUMENTS

| | | | |
|---|---|---|---|
| 5,689,722 A | | 11/1997 | Swarztrauber |
| 5,699,500 A | | 12/1997 | Dasgupta |
| 5,758,144 A | | 5/1998 | Eberhard et al. |
| 5,838,906 A | | 11/1998 | Doyle et al. |
| 5,857,076 A | | 1/1999 | Schmidt |
| 5,860,010 A | | 1/1999 | Attal |
| 5,905,736 A | | 5/1999 | Ronen et al. |
| 6,014,669 A | * | 1/2000 | Slaughter et al. ............ 707/610 |
| 6,117,180 A | * | 9/2000 | Dave et al. ...................... 703/20 |
| 6,154,765 A | * | 11/2000 | Hart ............................. 709/201 |
| 6,163,855 A | * | 12/2000 | Shrivastava et al. ............. 714/4 |
| 6,167,428 A | * | 12/2000 | Ellis .............................. 709/201 |
| 6,295,573 B1 | * | 9/2001 | Bailey et al. ................. 710/260 |
| 2001/0011294 A1 | * | 8/2001 | Ellis, III ....................... 709/201 |
| 2003/0135614 A1 | * | 7/2003 | Hattori et al. ................ 709/224 |

FOREIGN PATENT DOCUMENTS

| | | |
|---|---|---|
| EP | 0640930 | 5/1995 |
| EP | 0921485 | 6/1999 |
| EP | 1031923 | 8/2000 |
| EP | 1096378 | 5/2001 |
| WO | 9427216 | 11/1994 |
| WO | 9919807 | 4/1999 |
| WO | 0101219 | 1/2001 |

OTHER PUBLICATIONS

IBM, "Cluster-Based Stack Optimization Algorithm for Very Large-scale Integration", Sep. 1987, IBM Technical disclosure Bulletin, vol. 30, Issue 4, p. No. 1445-1447 (4).

Chong et al, "Concurrent Processing for Picture Archiving and Comunication system (PACS)", Jun. 1995, IEEE, p. No. 468-472.

Antaki et al, "The soft side of New Enterprise", May 1999, MIT enterprise FORUM of Dallus Network Inc., 2 pages.

Hitachi, "The Next Generation of Information Technology", spring 97, Hitachi today No. 39, p. No. 1-6 and cover page.

Kahaner, "Fujitsu's 2.sup.nd Parallel computing WS (PCW'93) Nov. 1993 Kawasaki Japan" Dec. 1993, 15 pages.

Ryan et al, "A Scalable Distributed Multimedia Knowledge Retrieval System on a cluster of Heterogeneous High Performance Architectures", International Journal on artificial intelligence tools, vol. 9, No. 3 (2000) p. No. 343-367.

(Author unknown), "CAD comes on line", Feb. 21, 2000, p. s-28, Design News-Automotive.

Danny Hillis, "Massive, Parallel Supercomputers—Where they're Going—How They'll Work", Forbes ASAP, Feb. 22, 1999, pp. 60-62 and 64.

Internet Information article: "MSC.SOFTWARE Announces visualNastran 4d2Go; A total Engineering Solution to be Bundled with CAD Products", Mar. 6, 2000.

Cohen, ED et al. Efficient Covexity and Domination Algorithms for Fine-and Medium-Grain Hybercube Computers, Algoithmica, vol. 7, pp. 51-75, Springer Verlag New York, Inc., 1992.

Benedicts, E.P., "Multiprocessor architectures are converging", Hypercube Concurrent Computers and Applications: Proceedings of the third conference on Hypercube concurrent computers and applications: Architecture, software, computer systems, and general issues, vol. 1, pp. 12-20, Pasadena, California, Jan. 19-20, 1988.

Livingston, Marilyn L. and Stout, Quentin F., "Fault Tolerance of the Cyclic Buddy Subcube Location Sceme in Hypercubes", Proceedings of the 6th Distributed Memory Computing Conference (1991), IEEE, pp. 34-41, 1991.

Fox, G.C., "What have we learnt from using real parallel machines on real problems?", Hypercube Concurrent Computers and Applications: Proceedings of the third conference on Hypercube concurrent computers and applications: Architecture, software, computer systems, and general issues, vol. 2, pp. 897-955, Pasadena, California, Jan. 19-20, 1988.

"Topologies—computational messaging for multicomputers", Hypercube Concurrent Computers and Applications: Proceedings of the third conference on Hypercube concurrent computers and applications: Architecture, software, computer systems, and general issues, vol. 1, pp. 580-593, Pasadena, California, Jan. 19-20, 1988.

Keagle, C., et al.: "Categorization and performance analysis of advanced avionics algorithms on parallel processing architectures" IEE, May 22, 1989, pp. 1722-1724.

Trystram D: "Scheduling parallel applications using malleable tasks on clusters" Parallel And Distributed Processing Syposium., Proceedings 15th International San Francisco, CA, USA Apr. 23-27, 2001, Los Alamitos, CA USA, IEE Comput. Soc, 2128-2135.

Min-Bin Chen, et al.: "Parallel 2d delaunay triangulations in hpf and mpi" Parallel And Distributed Processing Symposium, Proceeding 15th International San Francisco, CA, USA Apr. 23-27, 2001, Los Alamitos, CA, USA, IEEE Comput. Soc, 301-308.

Fernandez, E.B., et al: "Fault-tolerant parallel algorithms" Proceedings of Southeaston. Williamsburg, Spril 7-10 1991, Proceedings of the Southeast Conference, New York, IEEE, US vol. 1, Apr. 7, 1991, pp. 466-469.

Xiaoxiong, Zhong, et al.: "Optimal implantation of parallel divide-and-conquer algooriths on de Bruijn networks" Frontiers of assively Parallel Computatioh, 1992., Fourth Symposium on the McLean, VA, USA Oct. 19-21, 1992, Los Alamitos, CA, USA, IEEE Comput. Soc, US Oct. 19, 1992, pp. 583-585.

Welch, L.R., et al.: "Metrics and techniques for automatic partitioning and assignment of object-based concurrent programs" Parallel and Distributed Processing, 1995. Proceedings. Seventh IEEE Symposium on San Antonio, TX, USA Oct. 25-28, 1995, Los Alamitos,CA, USA, IEEE Comput. Soc, US, Oct. 25, 1995, pp. 440-447.

Kwan, A.W., et al.: "Using parallel programming paradigms for structuing programs on distributed memory computers" IEE, Apr. 28, 1991, pp. 210-213.

Grundy, J: "Software architecture modelling, analysis an dimplementation with softarch" Proc 34th Hawaii International Conference on System Sciences, Jan. 3, 2001, pp. 3825-3834.

Pontelli, E., et al: "Automatic compile-time parallelization of prolog programs for dependent and-parallelism" Proc. Of the Fourteenth International Conference on Logic Programming, [online] Jul. 1997, pp. 108-122, Retrieved From the Internet URL:http://citeseer.ist.psu.edu/cacxhe/papers/cs/16510/http:zSzzSzwww.cs.nmsu.eduzSzguptazSzacezSzstaticdap.pdf/pontelli97automatic.pdf> [retrieved Sep. 1, 2004].

Coddington, P.D., et al: "Web-based access to distributed high-performance geographic information systems for decision support" Proceedings Of The Hawaii International Conference On System Sciences, XX, XX, Jan. 5, 1999, pp. 1-12.

"Method Sending Object Agent and Receiving Object Agent" IBM Technical Disclosure Bulletin, IBM Corp. New York, US, vol. 39, No. 12, Dec. 1, 2996, p. 43.

Cameron, I, et al.: "BT Webworld TM-WEB Hosting for Every business Need" British Telecommunications Engineering, British Telecommunications Engineering, London, GB, vol. 16, No. 4, 1998, pp. 273-278.

Saletore, V.A., et al.: "Parallel Computations on the CHARM Heterogeneous Workstation Cluster" High Performance Distributed Computing, 1994, Proceedings Of the Third IEEE International symposium On San Francisco, CA, USA Aug. 2-5, 1994, Los Alamitos, CA, USA, IEEE Comput. Soc, Aug. 2, 1994, pp. 203-210.

DeSouza-Batista, J.C., et al.: "A Sub-optimal 28 Assignment of Application Tasks Onto Heterogeneous Systems" Heterogenous Computing Workshop, 1994, Proceedings Cancun, Mexico Apr. 26, 1994, Los Alamitos, CA USA, IEEE Comput Soc., 1994, pp. 9-16.

Ross, G.B. et al.: "A Scalable Mutlicomputer" Circuits and Systems, 1993, Proceedings of the 36th Midwest Symposium on Detroit, MI, USA Aug. 16-18, 1993, New York, NY, USA, IEEE, Aug. 16, 1993, pp. 1117-1120.

Chowdhury, A., et al.: "Supporting Dynamic Space-Sharing on Clusters of Non-Dedicated Workstations" Distributed Computing Systems, 1997, Proceedings of the 17th International Conference in Baltimore, MD, USA May 27-30, 1997, Los Alamitos, CA, USA, IEEE Comput. Soc, US May 27, 1997, pp. 149-158.

Selected File History from related U.S. Appl. No. 09/603,020, 100 pages Sep. 16, 2003 through Oct. 14, 2004.

Selected File History from related U.S. Appl. No. 10/340,524, 44 pages Aug. 6, 2007 through Apr. 18, 2008.

Selected File History from related European Patent Application Serial No. 00944888.7, 37 pages, Jul. 1, 2004 through Sep. 22, 2006.

Selected File History from related European Patent Application Serial No. 03713226.3, 12 pages, Apr. 19, 2007 through Oct. 16, 2007.

International Search Report from related PCT Patent Application Serial No. PCT/US03/000787, 8 pages, Sep. 2, 2004.

International Search Report from related PCT Patent Application Serial No. PCT/US00/17576, 6 pages, Nov. 14, 2000.

Selected File History from related U.S. Appl. No. 12/197,881, 22 pages Sep. 9, 2009 through Jan. 28, 2010.

* cited by examiner

FIG. 64

BITMAP ARRAY

|  | COLUMNS | | | | |
|---|---|---|---|---|---|
| ROWS | 1 | 2 | 3 | ... | n |
| 1 | 1,1 | 1,2 | 1,3 | | 1,n |
| 2 | 2,1 | 2,2 | 2,3 | ... | 2,n |
| 3 | 3,1 | 3,2 | 3,3 | | 3,n |
| | | | | | |
| m | m,1 | m,2 | m,3 | ... | m,n |

FIG. 65

| | | ROW DATA PARTITIONING | | | | |
|---|---|---|---|---|---|---|
| ROW COUNT | NODE 1 | $IR_1,1$ | $IR_1,2$ | $IR_1,3$ | ... | $IR_1,n$ |
| | | $IR_1+1,1$ | $IR_1+1,2$ | $IR_1+1,3$ | | $IR_1+1,n$ |
| | | $IR_1+M_r,1$ | $IR_1+M_r,2$ | $IR_1+M_r,3$ | | $IR_1+M_r,n$ |
| ROW COUNT | NODE 2 | $IR_2,1$ | $IR_2,2$ | $IR_2,3$ | ... | $IR_2,n$ |
| | | $IR_2+1,1$ | $IR_2+1,2$ | $IR_2+1,3$ | | $IR_2+1,n$ |
| | | $IR_2+M_r,1$ | $IR_2+M_r,2$ | $IR_2+M_r,3$ | | $IR_2+M_r,n$ |
| | | | | | | |
| REMAINDER | NODE p | $IR_p,1$ | $IR_p,2$ | $IR_p,3$ | ... | $IR_p,n$ |
| | | $IR_p+1,1$ | $IR_p+1,2$ | $IR_p+1,3$ | | $IR_p+1,n$ |
| | | $IR_p+R_r,1$ | $IR_p+R_r,2$ | $IR_p+R_r,3$ | | $IR_p+R_r,n$ |

| KEY | |
|---|---|
| $IR_i$ | ROW INDEX |
| $M_r$ | ROW COUNT |
| $R_r$ | ROW REMAINDER |
| m | NUMBER OF ROWS |
| n | NUMBER OF COLUMNS |

FIG. 66

COLUMN DATA PARTITIONING

| NODE 1 | | | | NODE 2 | | | | ... | NODE P | | | |
|---|---|---|---|---|---|---|---|---|---|---|---|---|
| 1,IC$_1$ | 1,IC$_1$+1 | ... | 1,IC$_1$+M$_c$ | 1,IC$_2$ | 1,IC$_2$+1 | ... | 1,IC$_2$+M$_c$ | | 1,IC$_p$ | 1,IC$_p$+1 | ... | 1,IC$_p$+R$_c$ |
| 2,IC$_1$ | 2,IC$_1$+1 | ... | 2,IC$_1$+M$_c$ | 2,IC$_2$ | 2,IC$_2$+1 | ... | 2,IC$_2$+M$_c$ | | 2,IC$_p$ | 2,IC$_p$+1 | ... | 2,IC$_p$+R$_c$ |
| 3,IC$_1$ | 3,IC$_1$+1 | ... | 3,IC$_1$+M$_c$ | 3,IC$_2$ | 3,IC$_2$+1 | ... | 3,IC$_2$+M$_c$ | | 3,IC$_p$ | 3,IC$_p$+1 | ... | 3,IC$_p$+R$_c$ |
| m,IC$_1$ | m,IC$_1$+1 | ... | m,IC$_1$+M$_c$ | m,IC$_2$ | m,IC$_2$+1 | ... | m,IC$_2$+M$_c$ | | m,IC$_p$ | m,IC$_p$+1 | ... | m,IC$_p$+R$_c$ |

| KEY | |
|---|---|
| IC$_i$ | COLUMN INDEX |
| M$_c$ | COLUMN COUNT |
| R$_c$ | COLUMN REMAINDER |
| m | NUMBER OF ROWS |
| n | NUMBER OF COLUMNS |

PARALLEL PROCESSING SYSTEMS AND METHOD

RELATED APPLICATIONS

This application is a continuation application of U.S. patent application Ser. No. 12/197,881, filed Aug. 25, 2008 now U.S. Pat. No. 7,730,121, which is a divisional application of U.S. patent application Ser. No. 10/340,524, filed Jan. 10, 2003, now U.S. Pat. No. 7,418,470, which claims priority to U.S. Patent Application Ser. No. 60/347,325, filed on Jan. 10, 2002 and is a continuation-in-part of U.S. patent application Ser. No. 09/603,020, filed on Jun. 26, 2000, now U.S. Pat. No. 6,857,004, the disclosures of which are incorporated herein by reference.

BACKGROUND

Prior art programming methods are implemented with parallel processing architectures called "clusters." Such clusters are generally one of two types: the shared memory cluster and the distributed memory cluster. A shared memory cluster consists of multiple computers connected via RAM memory through a back plane. Because of scaling issues, the number of processors that may be linked together via a shared back plane is limited. A distributed memory cluster utilizes a network rather than a back plane. Among other problems, one limitation of a distributed memory cluster is the bandwidth of the network switch array.

More particularly, each node of an N-node distributed memory cluster must obtain part of an initial dataset before starting computation. The conventional method for distributing data in such a cluster is to have each node obtain its own data from a central source. For problems that involve a large dataset, this can represent a significant fraction of the time it takes to solve the problem. Although the approach is simple, it has several deficiencies. First, the central data source is a bottleneck: only one node can access the data source at any given time, while others nodes must wait. Second, for large clusters, the number of collisions that occur when the nodes attempt to access the central data source leads to a significant inefficiency. Third, N separate messages are required to distribute the dataset over the cluster. The overhead imposed by N separate messages represents an inefficiency that grows directly with the size of a cluster; this is a distinct disadvantage for large clusters.

Shared memory clusters of the prior art operate to transfer information from one node to another as if the memory is shared. Because the data transfer cost of a shared memory model is very low, the data transfer technique is also used within clustered, non-shared memory machines. Unfortunately, using a shared memory model in non-shared memory architectures imposes a very low efficiency; the cluster inefficiency is approximately three to seven percent of the actual processor power of the cluster.

Although increasing the performance of the central data source can reduce the impact of these deficiencies, adding additional protocol layers on the communication channel to coordinate access to the data, or to increase the performance of the communication channel, adds cost and complexity. These costs scale directly as the number of nodes increase, which is another significant disadvantage for large clusters in the prior art.

Finally, certain high performance clusters of the prior art also utilize invasive "parallelization" methods. In such methods, a second party is privy to the algorithms used on a cluster. Such methods are, however, commercially unacceptable, as the users of such clusters desire confidentiality of the underlying algorithms.

The prior art is familiar with four primary parallel programming methods: nested-mixed model parallelism, POSIX Pthreads, compiler extensions and work sharing. Nested-mixed model parallelism is where one task spawns subtasks. This has the effect of assigning more processors to assist with tasks that could benefit with parallel programming. It is however difficult to predict, a priori, how job processing will occur as the amount of increase in computational speed remains unknown until after all of subtasks are created. Further, because only parts of a particular job benefit from the parallel processing, and because of the high computational cost of task spawning, the total parallel activity at the algorithm level is decreased. According to the so-called Amdahl's Law of the prior art, even a small percentage change in parallel activity generates large effective computational cost.

POSIX Pthreads are used in shared memory architectures. Each processor in the shared memory is treated as a separate processing thread that may or may not pass thread-safe messages in communicating with other threads. Although this may work well in a shared memory environment, it does not work well in a distributed processor environment. The inability to scale to large numbers of processors even in a shared memory environment has been well documented in the prior art. Because of bus speed limits, memory contention, cache issues, etc., most shared memory architectures are limited to fewer than sixty-four processors working on a single problem. Accordingly, efficient scaling beyond this number is problematic. The standard method of handling this problem is to have multiple, non-communicating algorithms operating simultaneously. This still limits the processing speedup achievable by a single algorithm.

Compiler extensions, such as distributed pointers, sequence points, and explicit synchronization, are tools that assist in efficiently programming hardware features. Accordingly, compiler extensions tools offer little to enhance parallel processing effects as compared to other prior art methods.

Work-Sharing models are characterized by how they divide the work of an application as a function of user-supplied compiler directives or library function calls. The most popular instance of work sharing is loop unrolling. Another work-sharing tool is the parallel region compiler directives in OpenMP, which again provides for limited parallel activity at the algorithm level.

It is interesting to note that prior art parallel processing techniques are injected into the algorithms and are not "intrinsic" to the algorithms. This may be a result of the historic separation between programming and algorithm development, in the prior art.

SUMMARY

The following U.S. patents provide useful background to the teachings hereinbelow and are incorporated herein by reference:

| | |
|---|---|
| U.S. Pat. No. 4,276,643 | June 1981 |
| U.S. Pat. No. 4,667,287 | May 1987 |
| U.S. Pat. No. 4,719,621 | January 1988 |
| U.S. Pat. No. 4,958,273 | September 1990 |
| U.S. Pat. No. 5,023,780 | June 1991 |
| U.S. Pat. No. 5,079,765 | January 1992 |
| U.S. Pat. No. 5,088,032 | February 1992 |

-continued

| U.S. Pat. No. 5,093,920 | March 1992 |
| U.S. Pat. No. 5,109,515 | April 1992 |
| U.S. Pat. No. 5,125,081 | June 1992 |
| U.S. Pat. No. 5,166,931 | November 1992 |
| U.S. Pat. No. 5,185,860 | February 1993 |
| U.S. Pat. No. 5,224,205 | June 1993 |
| U.S. Pat. No. 5,371,852 | December 1994 |

The present inventions solve numerous problems in parallel computing by providing methods and systems for configuration of and operation of a Howard Cascade (HC). Algorithm computation requests are transmitted to a home node of a HC and distributed (cascaded) through nodes of the HC to expand the algorithm computation request to a desired number of processing nodes. The algorithm to be computed may be predefined by a user and is stored within each processing node of the HC. Associated data is then broadcast to all processing nodes participating in the requested computation. Partial results are agglomerated upstream in the opposite order to the expansion of the HC and then, eventually, forwarded to the requesting host.

A first aspect of the invention provides a parallel processing system having a plurality of processing nodes arranged in a Howard Cascade (HC). The HC couples to a first home node, responsive to an algorithm processing request, for (a) broadcasting the algorithm processing request to the plurality of processing nodes in a time and sequence order within the Howard Cascade and for (b) broadcasting a dataset of an algorithm to at least top level processing nodes of the Howard Cascade simultaneously. The HC then provides for contiguous processing nodes within the plurality of processing nodes being operable to process contiguous parts of the dataset and to agglomerate results contiguously to the first home node in reverse to the time and sequence order.

Another aspect of the invention provides systems and a method for processing a context-based algorithm for enhanced parallel processing within a parallel processing architecture. The method first determining whether work to be performed by the algorithm is intrinsic to the algorithm or to another algorithm. The method then determining whether the algorithm requires data movement; and parallelizing the algorithm based upon whether the work is intrinsic to the algorithm and whether the algorithm requires data movement.

Another aspect of the invention provides systems and a method for parallel processing an algorithm for use within a Howard Cascade. The method being operable to extract input and output data descriptions for the algorithm; acquire data for the algorithm; process the algorithm on nodes of the Howard Cascade; agglomerate node results through the Howard Cascade; and return results to a remote host requesting parallel processing of the algorithm.

Still another aspect of the invention provides systems and a method for parallel computation. The method first transmitting an algorithm computation request and associated data from a requesting host to a home node of a computing system wherein the request includes a requested number (N) of processing nodes to be applied to computation of the request. The method then distributes the computation request from the home node to a plurality of processing nodes wherein the plurality of processing nodes includes N processing nodes coupled to the home node and wherein the distribution is in a hierarchical ordering. Then the method broadcasts the associated data from the home node to all of the plurality of processing nodes, agglomerates a final computation result from partial computation results received from the plurality of processing nodes wherein the agglomeration is performed in the reverse order of the hierarchical ordering, and returns the final computation result from the home node to the requesting host.

Another aspect of the invention provides systems and a method of distributing an algorithm computation request. The method comprises the step of receiving within a home node of a distributed parallel computing system a computation request and associated data from a requesting host system. The method also includes the step of determining a number of processing nodes (N) of the parallel computing system to be applied to performing the computation request, and the step of partitioning the associated data to identify a portion of the data associated with each processing node. Lastly the method comprises the step of recursively communicating the computing request and information regarding the partitioned data from the home node to each of the N processing nodes over a plurality of communication channels during a sequence of discrete time intervals, wherein each communication channel is used for communication by at most one processing node or home node during any one time interval, and wherein the number of discrete time intervals to recursively communicate to all N processing nodes is minimized.

Yet another aspect of the invention provides systems and a method for distributing an algorithm computation request for a complex algorithm in a parallel processing system. The method comprising the steps of: receiving from a requesting host a computation request for a complex algorithm wherein the complex algorithm includes a plurality of computation sections; expanding the computation request to a plurality of nodes configured as a Howard Cascade; computing within the Howard Cascade a first computation section to generate a partial result; returning the partial result to a control device; receiving further direction from the control device; computing within the Howard Cascade a next computation section to generate a partial result in response to receipt of further direction to compute the next computation section; repeating the steps of returning, receiving and computing the next computation section in response to receipt of further direction to compute the next computation section; and returning the partial result to the requesting host as a final result in response to further direction to complete processing of the complex algorithm.

Still another aspect of the invention provides systems and a method for parallelizing an algorithm. The method first receives a new algorithm description from a host system. Next the new algorithm is automatically annotated with template information relating to data used by the new algorithm and relating to data generated by the new algorithm. Lastly the annotated new algorithm is stored in each processing node of a Howard Cascade parallel processing system.

BRIEF DESCRIPTION OF THE DRAWINGS

FIG. 64 illustrates a 2D dataset for an ECADM category algorithm;

FIG. 65 illustrates row data distribution of the 2D dataset of FIG. 64 among nodes in a cluster.

FIG. 66 illustrates column data distribution of the 2D dataset of FIG. 64 among nodes in a cluster.

DETAILED DESCRIPTION OF ILLUSTRATED EMBODIMENTS

Figure 1:
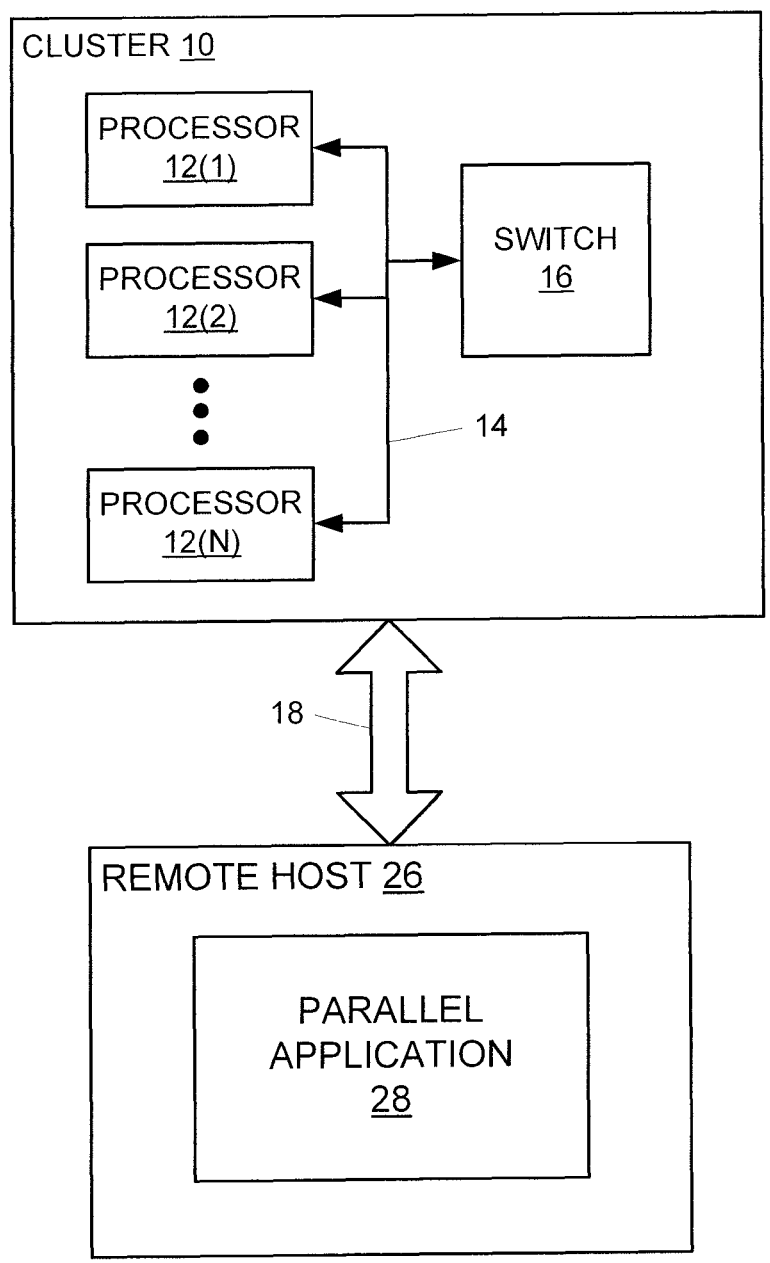
FIG. 1 is a block diagram of a prior art parallel processing cluster that processes an application running on a remote host.

FIG. 1 shows a block diagram illustrating a prior art parallel processing cluster 10 that processes a parallel application 28 operating on a remote host 26. As those skilled in the art appreciate, cluster 10 is for example a Beowulf cluster that connects several processors 12 together, through a communication channel 14 and a switch 16, to process parallel application 28. The number N of processors 12 is carefully matched to cluster type, e.g., sixteen processors for a Beowulf cluster. Remote host 26 communicates with cluster 10 via a data path 18 to access the collective computing power of processors 12 within cluster 10 to run parallel application 28, with a goal of reducing the execution time of parallel application 28.

Figure 2:
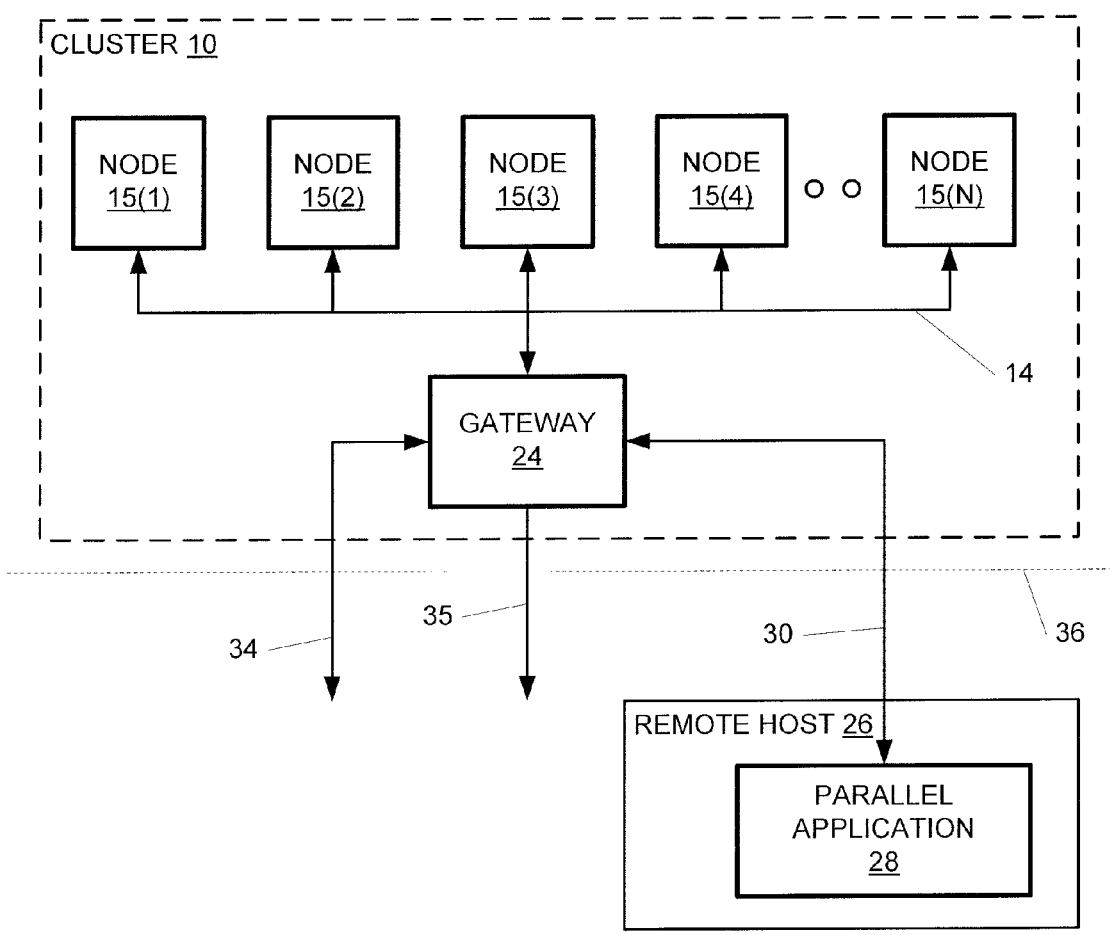
FIG. 2 is a block diagram illustrating further detail of the prior art cluster, application and remote host of FIG. 1.

FIG. 2 shows parallel processing application 28 using cluster 10 in more detail. Nodes 15(1), 15(2), 15(3) . . . 15(N) represent processors 12, FIG. 1, connected together via communication channel 14 that facilitates the movement of computer programs, data, and inter-process messages through nodes 15. As those skilled in the art appreciate, communication channel 14 may consist of computer buses, network linkages, fiber optic channels, Ethernet connections, switch meshes (e.g., switch 16, FIG. 1) and/or token rings, for example. Cluster 10 further has a gateway 24 that provides an interface to cluster 10. Gateway 24 typically provides one or more interfaces—such as a network interface 30, an Internet interface 34, and a peer-to-peer interface 35—to communicate with remote host 26 through a cluster boundary 36.

Remote host 26 is for example a computer system that runs parallel application 28. Illustratively, FIG. 2 shows application 28 and remote host 26 connected to gateway node 24 through network interface 30. In operation, gateway 24 enables communication between parallel application 28, running on host 26, and individual processing nodes 15 within cluster 10. Application 28 loads algorithm code and data onto individual processing nodes 15 prior to parallel processing of the algorithm code and data.

There are two main prior art methods for application 28 to load algorithm code and data onto nodes 15. If cluster 10 is an encapsulated cluster, only the network address of gateway 24 is known by application 28; application 28 communicates with gateway 24 which in turn routes the algorithm code and data to nodes 15. Although internal nodes 15 are hidden from host 26 in this approach, application 28 must still have knowledge of nodes 15 in order to specify the number of nodes to utilize and the handling of node communications through gateway 24.

In a non-encapsulated cluster 10, application 28 has information concerning the organization and structure of cluster 10, as well as knowledge to directly access individual nodes 15. In one example, application 28 uses a remote procedure call (RPC) to address each node 15 individually, to load algorithm and data onto specific nodes 15; in turn, nodes 15 individually respond back to application 28.

Unfortunately, neither of these prior art techniques make cluster 10 behave like a single machine to application 28. Application 28 must therefore be designed a priori for the particular internal architecture and topology of cluster 10 so that it can appropriately process algorithm code and data in parallel.

Figure 3:
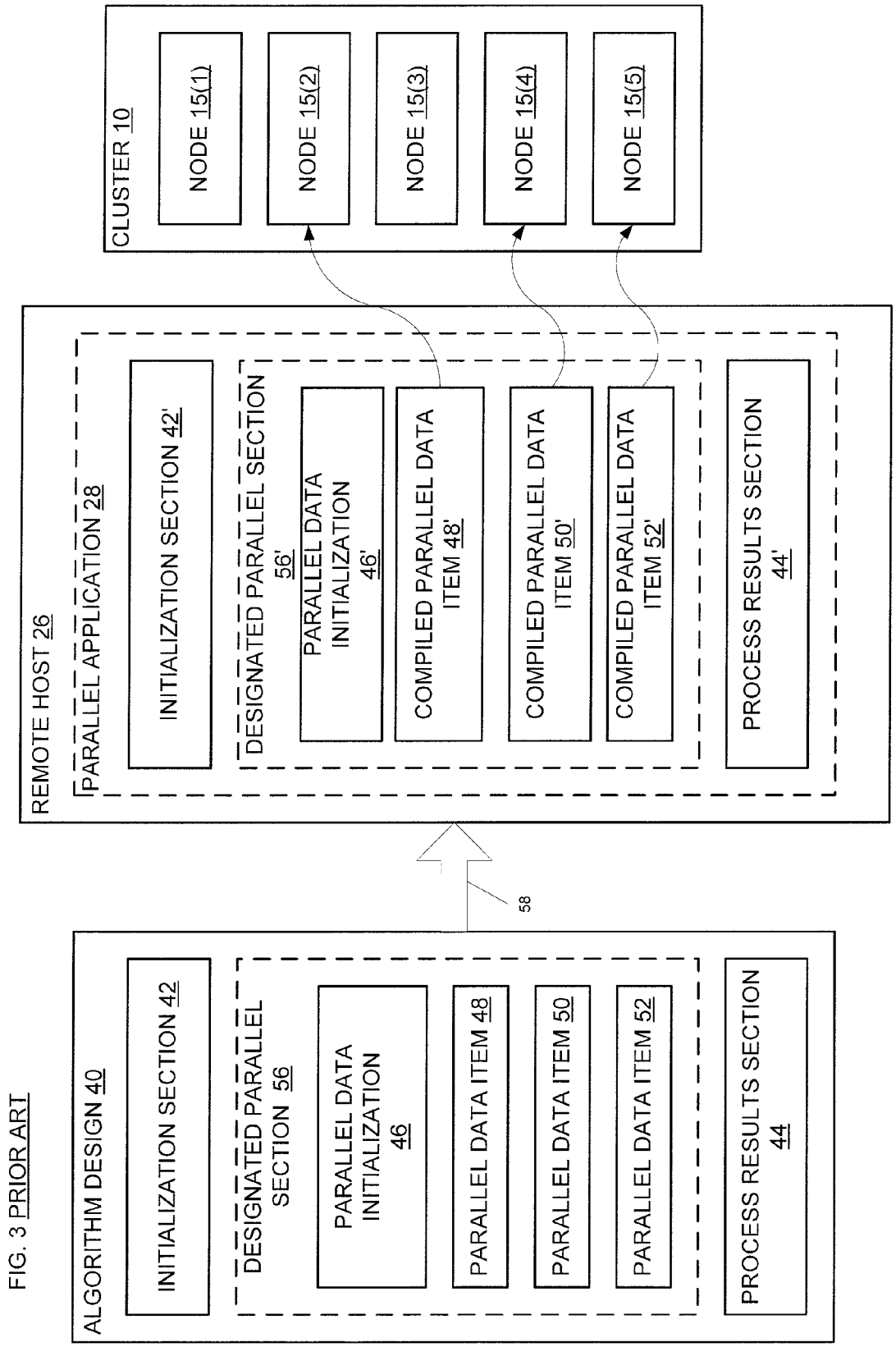
FIG. 3 schematically illustrates algorithm partitioning and processing through the prior art remote host and cluster of FIG. 1, FIG. 2.
Figure 4:
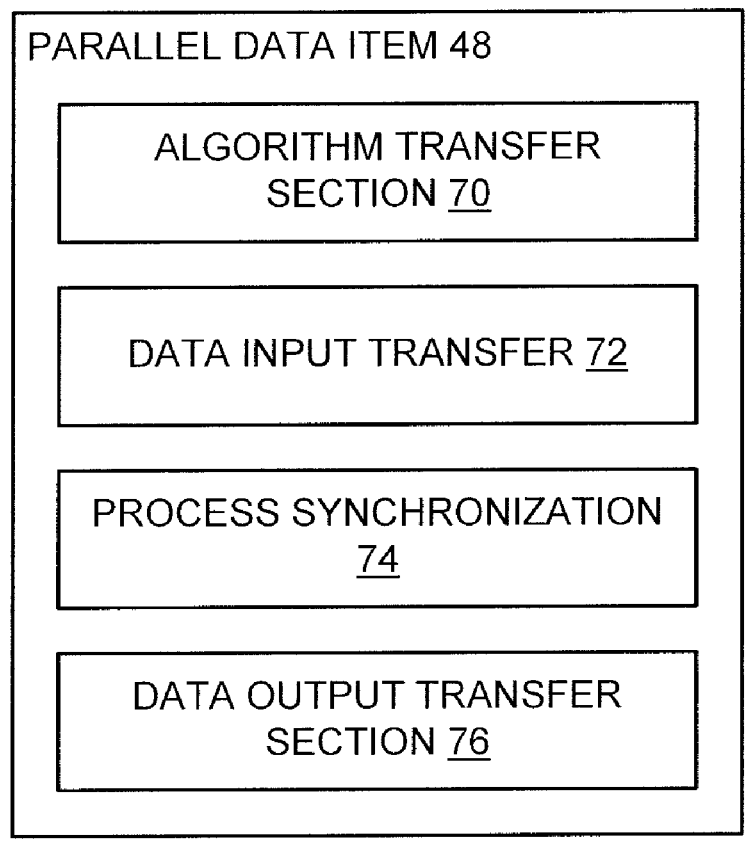
FIG. 4 is a block schematic illustrating further complexity of one parallel data item within an algorithm processed through the prior art parallel application of FIG. 1, FIG. 2.

FIG. 3 schematically illustrates how algorithm code and data are partitioned and processed through remote host 26 and cluster 10. Such algorithm code and data are logically illustrated in FIG. 3 as algorithm design 40. An initialization section 42 first prepares input data prior to algorithm execution; this typically involves preparing a data structure and loading the data structure with the input data. A process results section 44 handles data produced during algorithm execution; this typically involves storing and outputting information. Designated parallel section 56 contains parallel-specific data items 48, 50, and 52. Specifically, parallel data items 48, 50 and 52 represent parts of algorithm code that are to be executed on different nodes 15 in cluster 10. FIG. 4 illustrates further detail of one parallel data item 48; parallel data items 50 and 52 of FIG. 3 are similarly constructed. Process results section 44 combines data output from execution of parallel data items 48, 50 and 52 to form a complete data set.

Each parallel data item 48, 50 and 52 is transferred as algorithmic code and data to cluster 10 for processing. Synchronization with algorithm execution is attained by inter-process communication between parallel application 28 and individual nodes 15 of cluster 10. Parallel processing libraries facilitate this inter-process communication, but still require that algorithm design 40 be formatted, a priori, for the topology of nodes 15. That is, the topology of cluster 10 must be known and fixed when application 28 is compiled.

Arrow 58 represents the step of compiling algorithm design 40 into parallel application 28, for execution on remote host 26. Elements 42, 44, 46, 48, 50, 52 and 56 are illustratively shown as compiled elements 42', 44', 46', 48', 50', 52' and 56' in parallel application 28.

Parallel application 28 is executed by remote host 26 in the following sequence: initialization section 42', parallel data initialization 46', compiled parallel data item 48', compiled parallel data item 50', compiled parallel data item 52', and process results section 44'. In the illustrated example of FIG. 3, compiled parallel data item 48' transfers algorithm code and input data to node 15(2) in cluster 10 via algorithm transfer section 70 and data input section 72, respectively, of FIG. 4. Compiled parallel data item 48' also controls the execution of its algorithm on node 15(2) using process synchronization 74 (FIG. 4) to determine when data processing has completed. When node 15(2) indicates that the execution of parallel data item 48' has completed, data output transfer section 76 (FIG. 4) transfers results from node 15(2) back into parallel application 28.

In similar fashion, compiled parallel data item 50' and compiled parallel data item 52' utilize nodes 15(4) and 15(5), respectively, such that all algorithms of parallel application 28 are processed concurrently by nodes 15(2), 15(4), 15(5) of cluster 10.

Process results section 44' of parallel application 28 operates when compiled parallel data items 48', 50', and 52' are processed by cluster 10 and returned by respective data output transfer sections 76. Data returned by nodes 15(2), 15(4), 15(5) of cluster 10, in this example, are combined by process results section 44' so as to continue processing of the completed data set.

It should be apparent from the foregoing description of the prior art that the focus of architectural designs in high performance computing has concentrated on various hardware-centric solutions. This has been true since the beginnings of parallel processing, particularly since the 1970s. Moreover, the current trend for new parallel processing systems is to use multiple processors working in tandem to achieve higher performance at lower cost. Historically, therefore, hardware advances such as improved processor performance, faster networks, improvements in memory and caching technologies, etc, have far outpaced software advances.

This has remained true for the prior art parallel processing designs despite the fact that Amdahl's law (which predicts parallel performance for a given application on multiple processors) does not expressly address hardware parameters. Amdahl's law is represented by the following equation: speedup=$1/((1-f)+f/p)$, where f is the percent of parallel activity within the algorithm, and p equals the number of processors. "Speedup" determines the processor speed multiplier, e.g., 1×, 2×, etc., of the current processor speed of the individual linked processors in the parallel processing design.

Amdahl's law only takes into consideration the degree of parallel activity at the algorithm level and the number of processors used in the calculations. Finding the limit of Amdahl's law (with respect to the number of processors) is a standard operation that yields the disheartening understanding of how little serial activity must be present before the parallel processing effect becomes unusable. That is, the "maximum speedup" under Amdahl's law is given by the following relationship: $\lim_{p \to \infty}[1/((1-f)+f/p)]=1/(1-f)$, where "maximum speedup" equals the processor speed multiplier, e.g., 1×, 2×, etc., of the current processor speed of the individual linked processors if there are an infinite number of processors p, and f is the percent of parallel activity within the algorithm. Table 1 below shows the maximum speedup for given values of f.

TABLE 1

Maximum Speedup under Amdahl's Law

| f | Maximum Speedup | |
| --- | --- | --- |
| 0.10000 | 1.11 | Processor Equivalent |
| 0.20000 | 1.25 | Processor Equivalent |
| 0.30000 | 1.43 | Processor Equivalent |
| 0.40000 | 1.67 | Processor Equivalent |
| 0.50000 | 2.00 | Processor Equivalent |
| 0.60000 | 2.50 | Processor Equivalent |
| 0.70000 | 3.33 | Processor Equivalent |
| 0.80000 | 5.00 | Processor Equivalent |
| 0.85000 | 6.67 | Processor Equivalent |
| 0.90000 | 10.00 | Processor Equivalent |
| 0.95000 | 20.00 | Processor Equivalent |
| 0.99000 | 100.00 | Processor Equivalent |
| 0.99900 | 1000.00 | Processor Equivalent |

TABLE 1-continued

Maximum Speedup under Amdahl's Law

| f | Maximum Speedup | |
|---|---|---|
| 0.99990 | 10000.00 | Processor Equivalent |
| 0.99999 | 100000.00 | Processor Equivalent |

As described in more detail below, since the key parameter in Amdahl's law is "f", the problem of generating high performance computing with multiple processors is overcome, in part, by (a) approaching parallel processing from an algorithm-centric perspective, and/or by utilizing the Howard Cascade (HC) which increases the parallel activity of cross-communication, each described in more detail below.

The Howard Cascade Architecture System

The Howard Cascade Architecture System ("HCAS") provides a topology for enabling a cluster of nodes (each containing one or more processors) to act as a single machine to one or more remote host computers outside of the inter-cluster network. Unlike the prior art, this enables each remote host to communicate and parallel process algorithm code and data within the cluster but without (a) direct communication with individual cluster nodes and/or (b) detailed knowledge of cluster topology. More particularly, in one embodiment, the HCAS uses the following features to create a single machine experience for a remote host.

- Complete mathematical and logical algorithms are stored on each node of the cluster prior to being accessed by the remote host.
- Mathematical and logical algorithms are made parallel by changing the data sets processed by the mathematical and logical algorithms, though no additions, changes or deletions occur to the algorithm itself.
- The remote host sends algorithm processing requests and data only to a gateway processor attached to a network; mathematical and logical algorithms are not communicated by the remote host to the home node.
- The remote host knows only the IP address and a single port identity of the gateway of the HCAS; multiple ports and/or multiple IP addresses are not required to make use of multiple processing nodes in the cluster.
- The remote host requires no knowledge of the internal parameters of the cluster, including the number of processors used by the cluster and the connectivity model used by the cluster.
- The gateway communicates with a home node within the cascade; the home node facilitates communication to the connected processing nodes.

Figure 5:
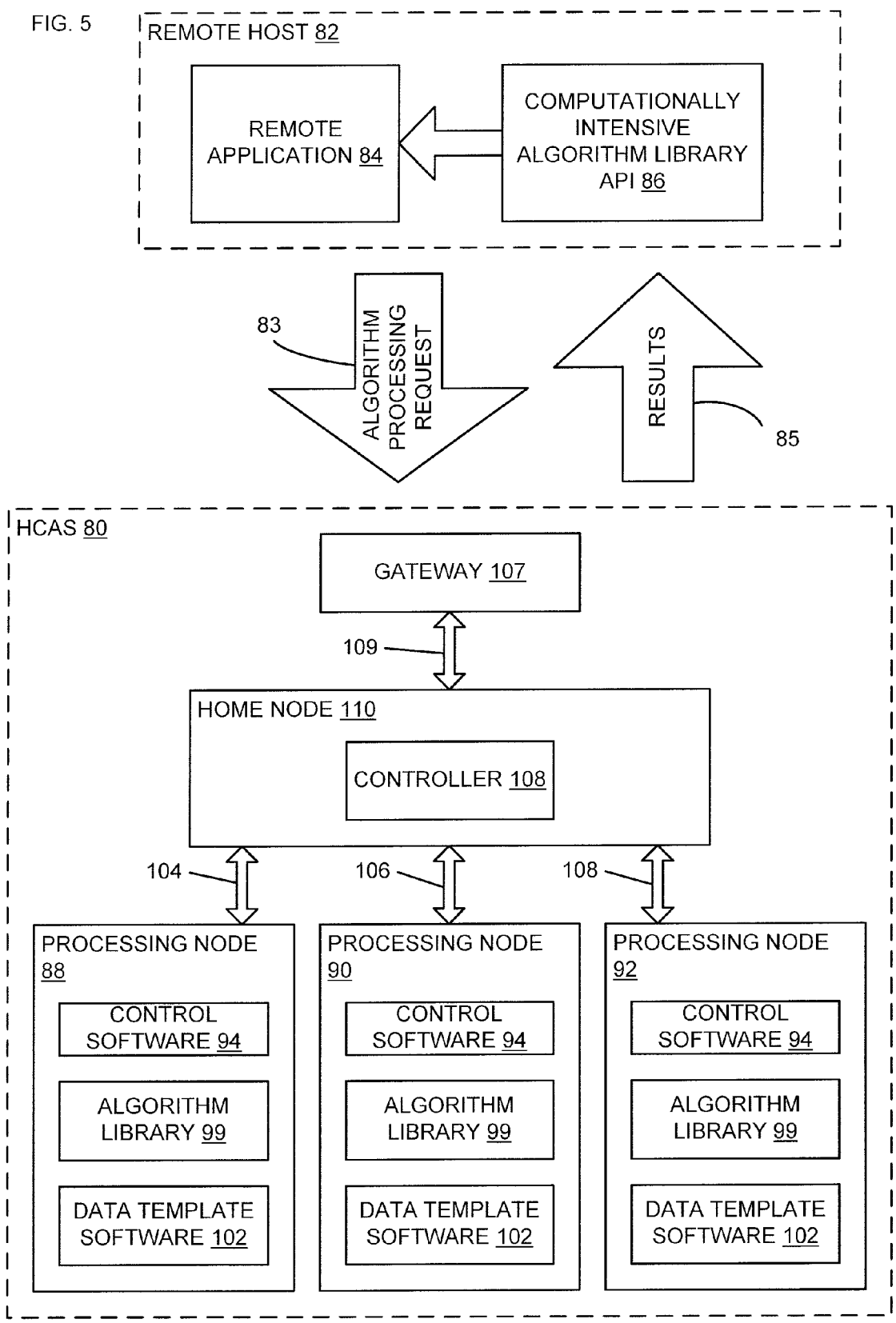
FIG. 5 is a block diagram of one Howard Cascade Architecture System (HCAS) connected to a remote host.

FIG. 5 illustrates one HCAS 80 that provides algorithm-centric parallel processing. HCAS 80 has a gateway 107, a home node 110 and, illustratively, three processing nodes 88, 90 and 92. Those skilled in the art should appreciate that three nodes 88, 90, 92 are shown for purposes of illustration, and that many more nodes may be included within HCAS 80. Processing nodes 88, 90, 92 (and any other nodes of HCAS 80) are formulated into a HC, described in more detail below. Gateway 107 communicates with a remote host 82 and with home node 110; home node 110 facilitates communication to and among processing nodes 88, 90, 92.

Each processing node 88, 90 and 92 has an algorithm library 99 that contains computationally intensive algorithms; algorithm library 99 preferably does not contain graphic user interfaces, application software, and/or computationally non-intensive functions. A remote host 82 is shown with a remote application 84 that has been constructed using computationally intensive algorithm library API 86. Computationally intensive algorithm library API 86 defines an interface for computationally intense functions in the algorithm library 99 of processing nodes 88, 90 and 92.

In operation, remote host 82 sends an algorithm processing request 83, generated by computationally intensive algorithm library API 86, to gateway 107. Gateway 107 communicates request 83 to controller 108 of home node 110, via data path 109. Since the computationally intensive algorithms of libraries 99 are unchanged, and remain identical across processing nodes, "parallelization" within HCAS 80 occurs as a function of how an algorithm traverses its data set. Each of the algorithms, when placed on processing nodes 88, 90 and 92, is integrated with a data template 102. Controller 108 adds additional information to algorithm processing request 83 and distributes the request and the additional information to processing nodes 88, 90, 92 via data paths 104, 106, 108, respectively; the additional information details (a) the number of processing nodes (e.g., N=3 in this example) and (b) data distribution information. Each processing node 88, 90, 94 has identical control software 94 that routes algorithm processing request 83 to data template software 102. Data template software 102 computes data indexes and input parameters to communicate with a particular algorithm identified by algorithm processing request 83 in algorithm library 99.

Data template software 102 determines whether or not a particular computationally intensive algorithm requires data. If the algorithm requires data, data template 102 requests such data from home node 110. The algorithm in library 99 is then invoked with the appropriate parameters, including where to find the data, how much data there is, and where to place results. There is no need for remote host 82 to have information concerning HCAS 80 since only the data set is being manipulated. Specifically, remote host 82 does not directly send information, data, or programs to any processing node 88, 90, 92. HCAS 80 appears as a single machine to remote host 82, via gateway 107. Once HCAS 80 completes its processing, results from each node 88, 90, 92 are agglomerated (described in more detail below) and communicated to remote host 82 as results 85.

In one embodiment, the HCAS maximizes the number of nodes that can communicate in a given number of time units. The HCAS avoids the inefficiencies (e.g., collisions in shared memory environments, the bottle-neck of a central data source, and the requirement of N messages for an N node cluster) in the prior art by, for example, broadcasting the full data set to all processing nodes at once. Even though the same amount of data is transferred over the communication channel, the broadcasting eliminates the overhead of using N separate messages. An important advantage of the broadcasting is that the overhead of sending data is independent of the number of nodes in the HCAS. This is especially important in maintaining efficiency of a large cluster.

Figure 6:
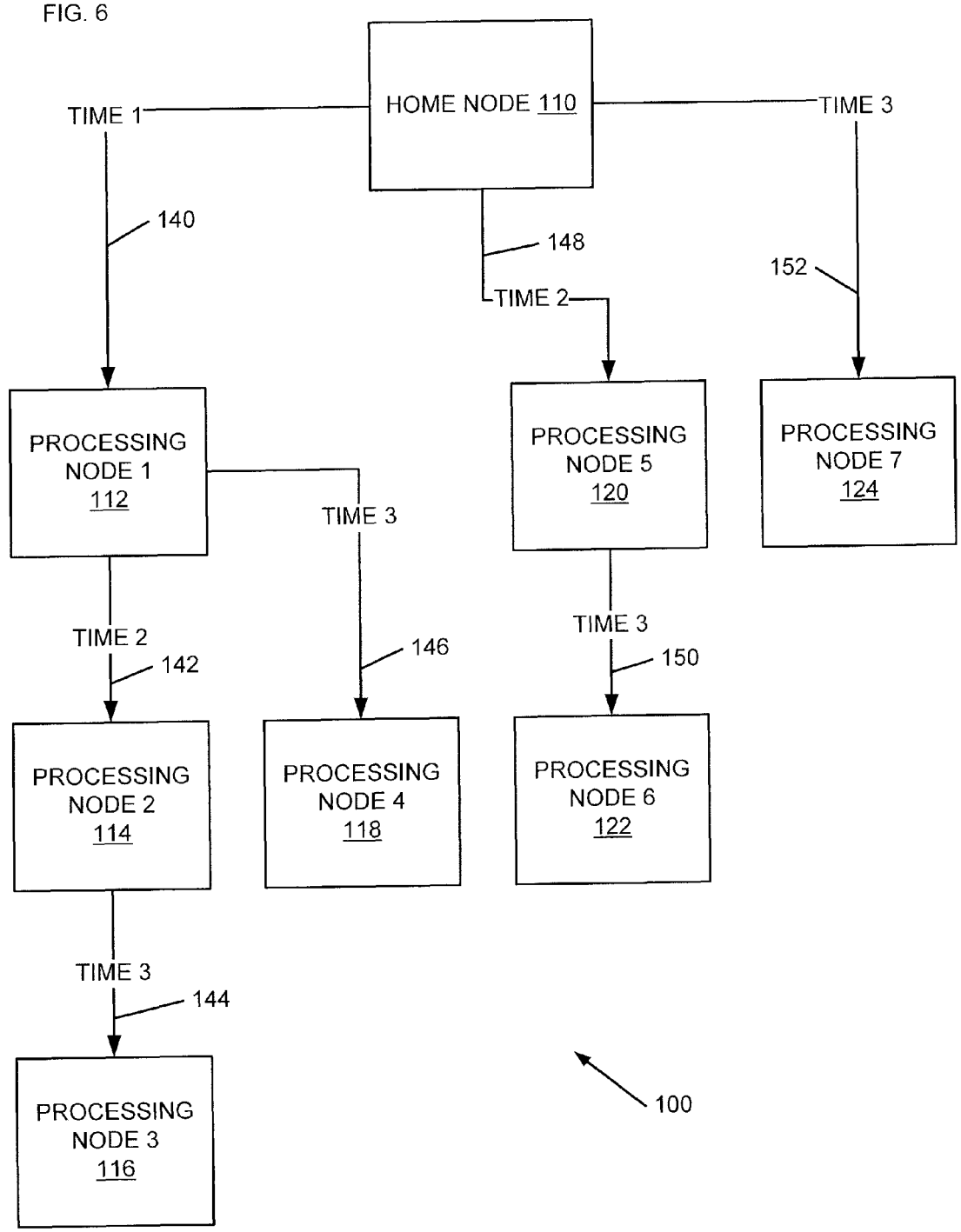
FIG. 6 is a block schematic of one Howard Cascade.

Each HCAS has at least one HC, such as HC 100 of FIG. 6. HC 100 is illustratively shown within seven processing nodes 112, 114, 116, 118, 120, 122 and 124. Algorithm processing requests 140, 142, 144, 146, 148, 150 and 152 are messages passed between nodes of HC 100. As shown, three time units (time 1, time 2, time 3) are used to expand HC 100 to all seven nodes. A time unit is, for example, the transmission time for one message in the HCAS, regardless of the transmission medium. For example, the message may be transmitted across any of the following media; LAN, WAN, shared bus, fiber-optic interface, etc.

HC 100 transmits the algorithm processing requests to an arbitrary group of nodes. Full expansion occurs when the problem set of all algorithm processing requests 140, 142, 144, 146, 148, 150 and 152 has been transmitted to all required processing nodes (nodes 112, 114, 116, 118, 120, 122 and 124 in this example). Home node 110 does not necessarily participate in parallel processing.

Figure 7:
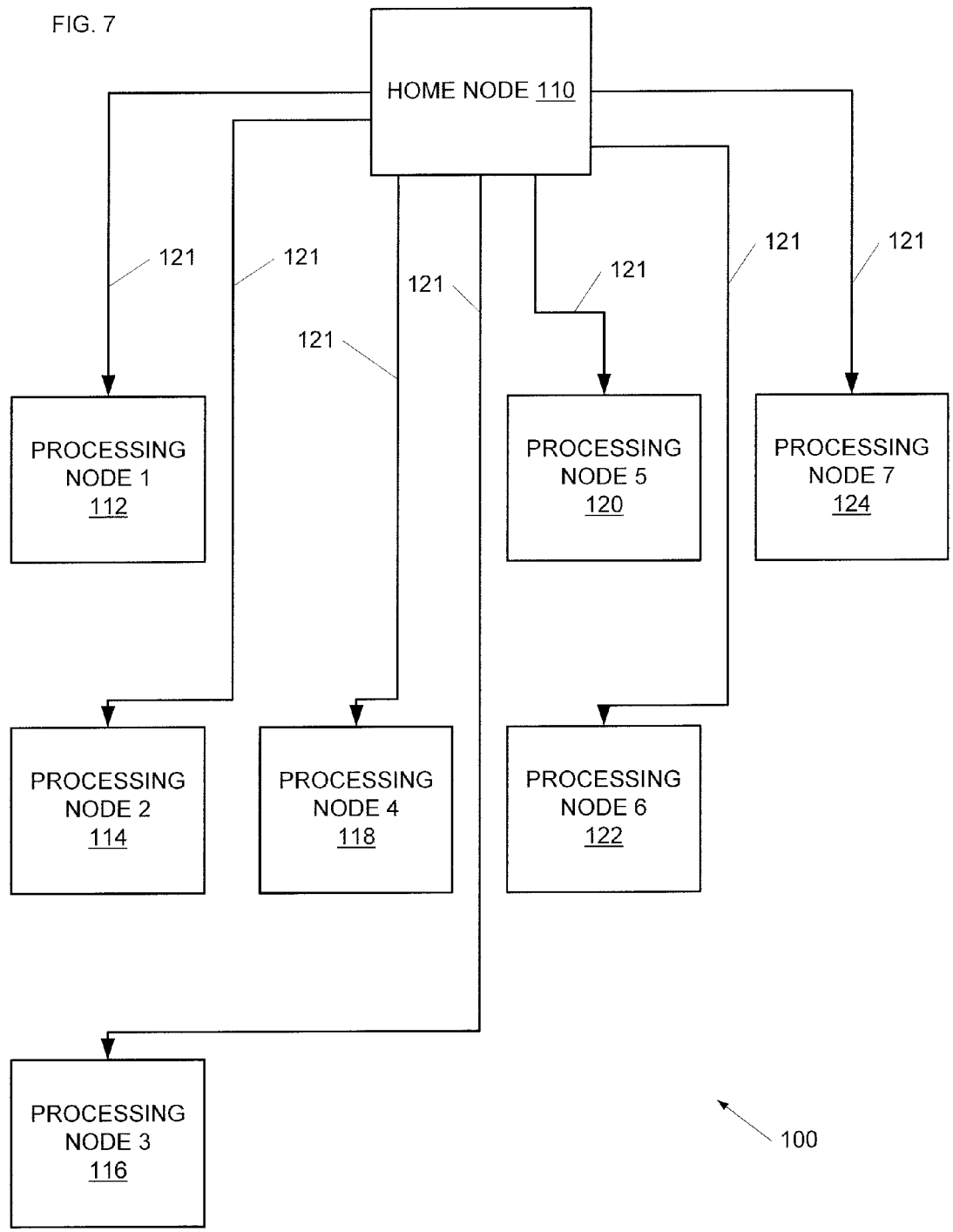
FIG. 7 is a block schematic illustrating broadcast messaging among the Howard Cascade of FIG. 6.

Once HC 100 is fully expanded, all nodes have received the algorithm processing request and are ready to accept associated data. Each processing node knows how much data to expect based upon information it received in its algorithm processing request message. Each processing node then prepares to receive the data by joining a multicast message group, managed by home node 110, and by listening on a broadcast communication channel. Through the multicast message group, home node 110 broadcasts a single message that is received by all nodes that are listening on the broadcast communication channel. Home node 110 waits for all nodes to join the multicast message group and then broadcasts the dataset to all nodes simultaneously. An example of the data broadcast on a broadcast communication channel 121 of HC 100 is shown in FIG. 7.

The data decomposition scheme used by HC 100 partitions the dataset based on node number. For example, processing node 112 receives the first piece of data, processing node 114 receives the second piece of data, and so on, until the last needed processing node of HC 100 receives the last piece of data. In this manner, the dataset is distributed such that the data for each processing node is adjacent to the data received by downstream processing nodes.

As each node of HC 100 receives data, it can choose to store the entire dataset or only the data it needs. If only the needed data is stored, the remaining data may be discarded when received. This inter-node choice reduces the amount of memory used to store data while maintaining flexibility that facilitates improved parallel-processing performance, as described below.

Once a processing node receives its data, it leaves the multicast message group. Home node 110 monitors which nodes have left the multicast message group, thereby providing positive acknowledgment that each node has received its data. Home node 110 can thereby detect failed processing nodes by noting whether a processing node remains in the multicast message group after a specified timeout; it may then open a discrete communication channel with the processing node to attempt recovery.

When the processing nodes have produced their results, an agglomeration process commences. Agglomeration refers to (a) the gathering of individual results from each of the processing nodes and (b) the formatting of these results into the complete solution. Each processing node sends its results to the processing node that is directly upstream. The flow of results thereby occurs in reverse sequence order of the initial expansion within HC 100. An example of an agglomeration process by HC 100 is shown in FIG. 8.

A direct result of agglomeration is that the results from each node maintain the same ordered relationship as the decomposition of the initial dataset. Each processing node knows how many downstream processing nodes it has; and the subsequent downstream results, from the downstream nodes, form a contiguous block of data. Each of the processing nodes has its results data, and the location and size information that enables the upstream processing node to properly position the results, when received. As the results are sent upstream through HC 100, the size of the result information expands contiguously until the entire result block is assembled at home node 110.

Figure 8:
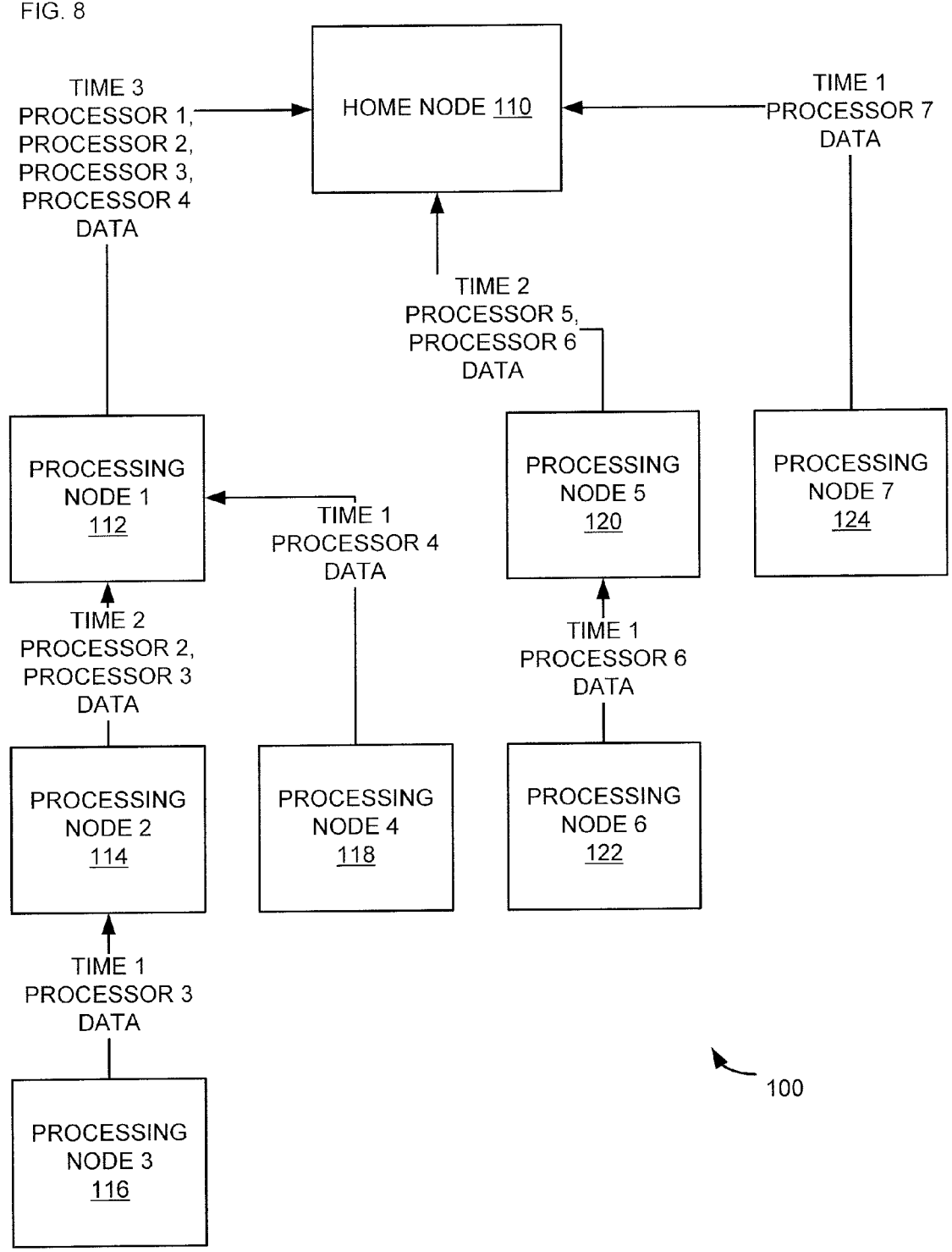
FIG. 8 illustrates agglomeration through the Howard Cascade of FIG. 6.

FIG. 8, for example, illustrates how agglomeration occurs through the nodes of HC 100. At a first time unit ("Time 1"), nodes 116, 118, 122, 124 communicate respective results (identified as "processor 3 data", "processor 4 data", "processor 6 data", and "processor 7 data", respectively) to upstream nodes (i.e., to node 114, node 112, node 120, and home node 110 (for node 124)). Data agglomerates at these upstream nodes such that, at a second time unit ("Time 2"), nodes 114 and 120 communicate respective results (including the results of its downstream nodes) to upstream nodes 112 and 110, respectively. At the third time unit ("Time 3"), agglomeration completes as the results from each downstream node has agglomerated at home node 110, as shown.

The agglomeration process may therefore be considered the "reverse flow" of data through HC 100. One important benefit of the reverse flow is that the communication network that connects the nodes is not saturated, as would be the case if all processing nodes attempt to simultaneously present results to home node 110. Many cluster architectures of the prior art experience network bottlenecks when results are returned to a single node; this bottleneck can be exacerbated when the computational load is evenly distributed among the processing nodes, which is desired to obtain maximum computational efficiency.

Context-based Algorithms for Parallel Processing Architectures

Certain context-based algorithms may be thought of as the work-defining elements of an algorithm. For example, a kernel is the work-defining element that is performed on a dataset involving a convolution algorithm. As described in more detail below, such context-based algorithms may be further distinguished with (a) internal or external contexts, and/or with (b) algorithmic data movement or no algorithmic data movement. Algorithmic data movement is data that moves as a natural process within the algorithm. An example of an algorithm with an internal requirement to move data is the matrix inversion algorithm, since data movement is intrinsic to the matrix inversion algorithm.

Accordingly, certain context-based algorithms distinguished by algorithm data movements defines five parallelization categories: Transactional, Internal Context No Algorithmic Data Movement ("ICNADM"), Internal Context with Algorithmic Data Movement ("ICADM"), External Context No Algorithmic Data Movement ("ECNADM"), and External Context with Algorithmic Data Movement ("ECADM"). These categories and their importance are discussed in more detail below, and are relevant to all types of parallel processing clusters, including HC 100.

Transactional Category

Both Beowulf clusters and SETI@Home parallel processing architectures, known in the art, work best when the problems being processed are transactional in nature. Transactional problems are those in which the problem space consists of a large number of independent problems. Each problem is thus solved separately and there is no cross-communication or synchronization between the problems. Almost any grouping of computers may be used for this class of problem; the only challenge is moving the data onto and off of the group of computers.

By way of example, the following applications have, by and large, transactional problem sets: analyzing star spectra, certain banking applications, and genetic engineering. Such applications share several common traits: there is no cross-communication, there is a high degree of parallel processing, and there is high scalability.

HC 100 may serve to process problem sets in the transactional category.

Internal Context No Algorithmic Data Movement (ICNADM) Category

Many logical and mathematical problems fall into the ICNADM category. By way of definition, the ICNADM category is one in which the final work to be accomplished, for the particular logical/mathematical algorithm, is intrinsic to the algorithm and the data being transformed does not have to be moved as part of the algorithm. The following examples have ICNADM problem sets: series expansions, Sobel edge detection, convolutions, matrix multiplications, correlations and cross-correlations, one-dimensional fast-Fourier transforms (1D-FFTs), 1D-wavelets, etc.

With regard to parallelization, numerical computations involving series expansions have inherent imbalances in the computational complexity of low order terms at the beginning of, and high order terms at the end of, a series. When algorithms based on a series expansion are converted to a parallel implementation for execution by parallel processing, this imbalance presents an obstacle to achieving parallel efficiency. More particularly, when the terms of the series expansion are distributed among nodes of a parallel processing architecture in consecutive intervals, (e.g. 1-10, 11-20, 21-30, . . . ), the nodes that are assigned the first intervals have less computation than the nodes that are assigned the last intervals. Disparity in the computational load leads to inefficiency in parallel computations.

In accord with one embodiment hereof, the computational load is distributed equally across all nodes in order to achieve maximum efficiency in parallel computations. This distribution enhances parallel processing within HC 100, or within existing parallel processing architectures of the prior art.

Given the diversity of series expansions, it is nonetheless difficult to predict the increase in computational complexity for each term. In accord with one embodiment hereof, every $n^{th}$ term is assigned to each node to equalize the computational loads. By making n equal to the number of nodes in the parallel processing architecture, each node's computational load has an equal number of low- and high-order terms. In cases where the total number of terms in a series is evenly divisible by the number of nodes, then each node will have an equal number of terms. An example of a forty-two term series expansion for a seven node array (e.g., HC 100, FIG. 6) is shown in Table 2.

For the evenly divisible case (Table 2), there is still a slight imbalance between the first and last node. This arises from the imbalance that exists across each $n^{th}$ interval. The first node in the array computes the first term in every $n^{th}$ interval, while the last node computes the last term. For most series expansions, however, where the complexity between succeeding terms does not increase rapidly, and the series is not too long, this level of balancing is sufficient.

Nonetheless, an additional level of balancing may be achieved by advancing the starting term, by one, for each node on successive intervals, and by rotating the node that computed the last term on the last interval to the first term, eliminating the computational imbalance across each $n^{th}$ interval. An example of this rebalancing is shown in Table 4, illustrating a forty-two term series expansion distributed on a seven node array.

TABLE 4

Rebalanced Example of 42-term Series Expansion in 7-Node Architecture

| Node # | Series terms | | | | | |
|---|---|---|---|---|---|---|
| 1 | 1 | 9 | 17 | 25 | 33 | 41 |
| 2 | 2 | 10 | 18 | 26 | 34 | 42 |
| 3 | 3 | 11 | 19 | 27 | 35 | 36 |
| 4 | 4 | 12 | 20 | 28 | 29 | 37 |
| 5 | 5 | 13 | 21 | 22 | 30 | 38 |
| 6 | 6 | 14 | 15 | 23 | 31 | 39 |
| 7 | 7 | 8 | 16 | 24 | 32 | 40 |

TABLE 2

Example of 42-term Series Expansion in 7-Node Architecture

| Node # | Series terms | | | | | |
|---|---|---|---|---|---|---|
| 1 | 1 | 8 | 15 | 22 | 29 | 36 |
| 2 | 2 | 9 | 16 | 23 | 30 | 37 |
| 3 | 3 | 10 | 17 | 24 | 31 | 38 |
| 4 | 4 | 11 | 18 | 25 | 32 | 39 |
| 5 | 5 | 12 | 19 | 26 | 33 | 40 |
| 6 | 6 | 13 | 20 | 27 | 34 | 41 |
| 7 | 7 | 14 | 21 | 28 | 35 | 42 |

In cases where the total number of terms in a series is not equally divisible by the number of nodes, then, in accord with one embodiment, the series terms are divided as equally as possible. An example of a thirty-nine term series expansion with a seven node array (e.g., HC 100, FIG. 6) is shown in Table 3.

TABLE 3

Example of 39-term Series Expansion in 7-Node Architecture

| Node # | Series terms | | | | | |
|---|---|---|---|---|---|---|
| 1 | 1 | 8 | 15 | 22 | 29 | 36 |
| 2 | 2 | 9 | 16 | 23 | 30 | 37 |
| 3 | 3 | 10 | 17 | 24 | 31 | 38 |
| 4 | 4 | 11 | 18 | 25 | 32 | 39 |
| 5 | 5 | 12 | 19 | 26 | 33 | |
| 6 | 6 | 13 | 20 | 27 | 34 | |
| 7 | 7 | 14 | 21 | 28 | 35 | |

As seen in Table 4, each node cuts off its terms when it exceeds the length of the series. This provides an efficient means of parallel distribution of any arbitrary length series on a multi-node array (e.g., within cluster 10, FIG. 2, and within HC 100, FIG. 6).

The distribution of Table 4 achieves near perfect balancing regardless of how fast the computational complexity of the series terms increases, or how many terms are computed.

Figure 9:
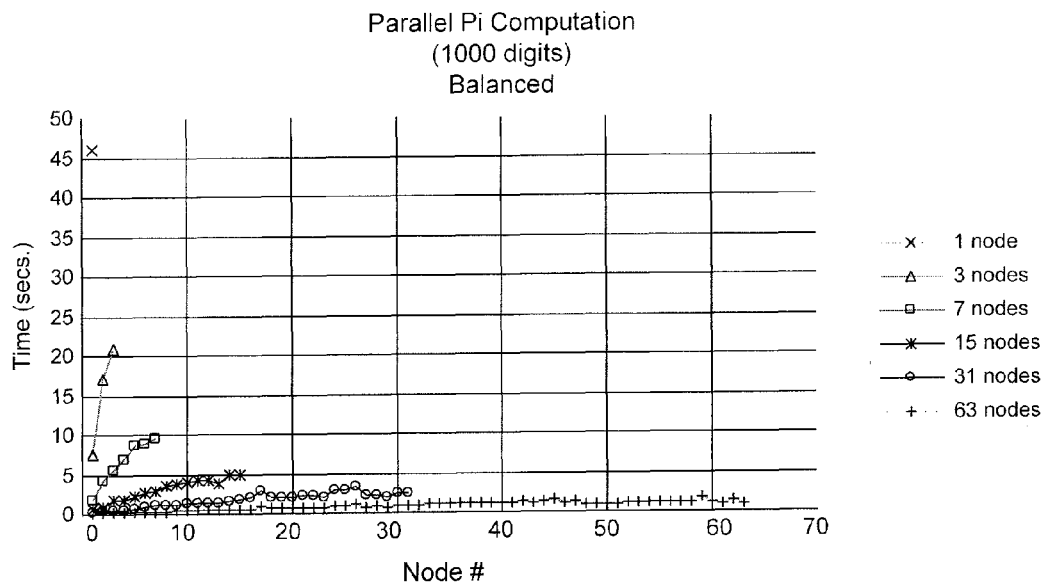
FIG. 9 is a graph illustrating processing times for nodes in an unbalanced algorithm for calculating Pi to 1000 digits for six different cluster sizes.
Figure 10:
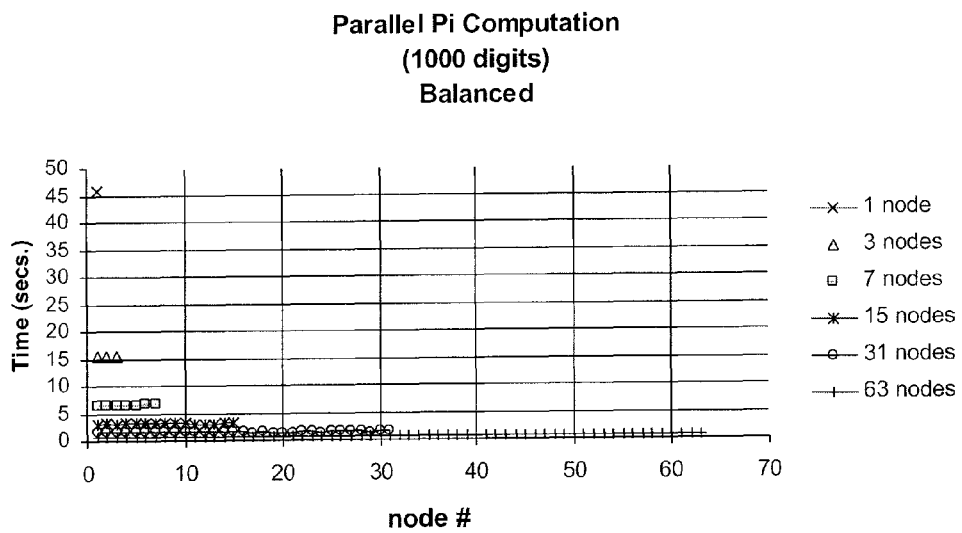
FIG. 10 is a graph illustrating processing times for nodes in a balanced algorithm for calculating Pi to 1000 digits for six different cluster sizes.

Examples of the effectiveness of these techniques are shown in FIG. 9 and FIG. 10. In each example of FIG. 9 and FIG. 10, one-thousand digits of PI were computed using a parallel algorithm. The parallel algorithm was based on Machin's formula which uses arctan(x), chosen because arctan(x) is computed using a power series expansion and because the computation of successive terms in the series is highly unbalanced. The computation was performed using 1, 3, 7, 15, 31, and 63 nodes in an array. Specifically, FIG. 9 illustrates the unbalanced case where the terms of the series expansion are distributed among the nodes in consecutive intervals, (e.g. 1-10, 11-20, 21-30, . . . ). The computational imbalance is evident from the disparity in the individual node compute times. FIG. 10 on the other hand illustrates the balanced case where the terms of the series expansion are distributed among the nodes as shown in Table 2. The dramatic improvement in balancing is evident by the nearly equal computation times for each of the individual nodes.

The example of computing PI using Machin's formula fits the ICNADM category since the ultimate work to be performed is Machin's formula and since that algorithm does not intrinsically move data.

A connected group of computers (e.g., the nodes of HC 100, FIG. 6) may be used to generate both computational scale-up and computational balance, such as provided for in Tables 2-4 and FIG. 9, FIG. 10.

In certain embodiments hereof, multiple functions within the ICNADM category can be chained together to build more complex functions. For example, consider Image$_{output}$=2D-CONVOLUTION (Kernel, 2D-SOBEL(image$_{input}$)) where image$_{input}$ is a base input image to a convolution process, 2-DSOBEL is a Sobel edge detection algorithm, Kernel is the convolution Kernel (e.g., an object to find in the image), 2D-CONVOLUTION is the convolution algorithm, and Image$_{output}$ is the output image. Since the output of the 2D-SOBEL edge detection algorithm produces an output image array that is compatible with the input requirements of the 2D-CONVOLUTION algorithm, no data translation needs to occur.

If however data translation were required, then the above equation may take the following form: Image$_{output}$=2D-CONVOLUTION (Kernel, TRANSLATE(2D-SOBEL(image$_{input}$))), where image$_{input}$ is the base input image, 2-DSOBEL is the Sobel edge detection algorithm, Kernel is the convolution Kernel (e.g., the object to find), 2D-CONVOLUTION is the convolution algorithm, Image$_{output}$ is the output image, and TRANSLATE is the hypothetical function needed to make the 2D-SOBEL output compatible with the input requirements of the 2D-CONVOLUTION function. In this form the following rules may thus apply:

Rule 1: If data movement is not required for the current TRANSLATE function then it can be treated as a ICNADM category function and no further effort is required.

Rule 2: If data movement is required for the current TRANSLATE function then the entire equation can be treated as either ICADM or ECADM category algorithms, discussed in more detail below.

In accord with one embodiment hereof, a number of functions are strung together in this manner to facilitate parallel processing. ICNADM class algorithms in particular may further scale as a function of the size of the largest dataset input to the algorithms. As such, the speed of a set of processors can be at or above 90% of the sum of the speeds of processors, provided there is sufficient data. To ensure overall end-to-end parallel processing performance, the I/O of the parallel processing architecture should be set so that the time it takes to move data onto and off of the nodes is a small percentage of the time it takes to process the data.

ICNADM category algorithms can be parallelized using a compiler or a run-time translation process. Preferably, a run-time translation process is used because it affords increased flexibility (i.e., compiled solutions do not dynamically allocate computational resources that maximally fit the work required for any given problem).

Internal Context with Algorithmic Data Movement (ICADM) Category

Certain logical and mathematical problems fall into this category. By way of definition, the ICADM category is one in which the final work to be accomplished, for a particular logical or mathematical problem, is intrinsic to the algorithm and the data being transformed requires data to be moved as part of the algorithm. Example algorithms in the ICADM category include the Matrix Transpose and Gaussian elimination algorithms.

ICADM category algorithms thus require the movement of data. This means that the faster the data movement occurs, the better the algorithm scales when applied to multiple nodes or processors. One approach to solving this dilemma is to focus on faster and faster point-to-point connection speeds, which is inherently expensive, but will work for the ICADM category of algorithm.

Nonetheless, in accord with one embodiment, data movement parallelism is used for ICADM category algorithms. The following model may be used to define a minimum time and maximum node expansion model for multiple processor communications within an array of connected nodes. This model is for example implemented as a logical overlay on top of a standard switch mesh or as a fixed connection model, the former (logical overlay) being preferred:

$$H_{(P,C,t)} = P*(C+1)^t - P$$
$$= P + (H_{(P,C,1)} + P) + (H_{(P,C,2)} + P) + \ldots + (H_{(P,C,t-1)} + P)$$
$$= P + (P*(C+1)^1 - P + P) + (P*(C+1)^2 - P + P) + \ldots +$$
$$(P*(C+1)^{t-1} - P + P)$$
$$= \sum_{x=0}^{t-1} P*(C+1)^x$$

where, H( ) represents a HC, P is the number of processors per motherboard, C is the number of communication channels per motherboard, t is the number of expansion time units, and x is the strip number (defined below) of the HC.

Equally the expansion time, t, for a given number of nodes with P processors per motherboard and C channels per motherboard can be expressed as:

$$t = \phi \log((N+P)/P)/\log(C+1)\kappa.$$

Figure 11:
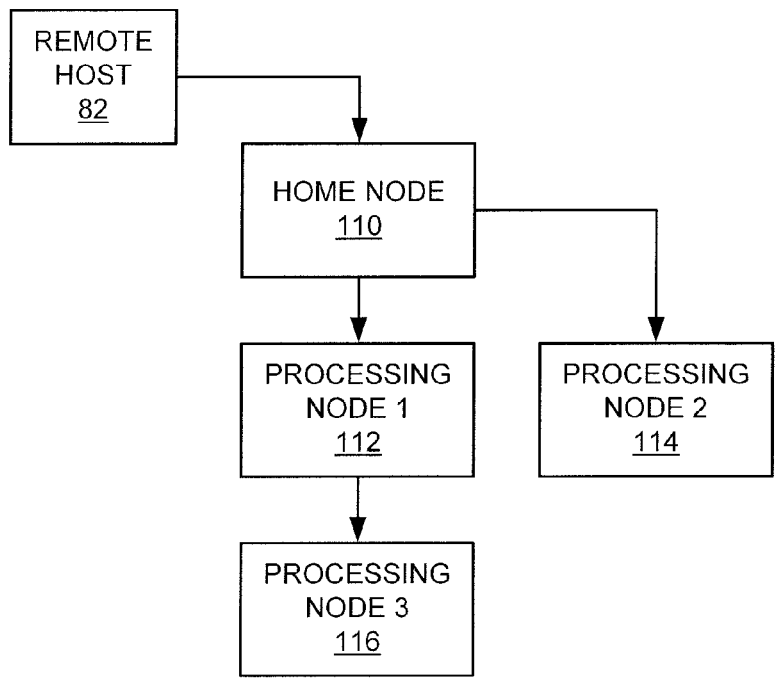
FIG. 11 is a block schematic illustrating expansion of a problem dataset in two time units among nodes of a Howard Cascade, each node including one processor and one communication channel.

Pictorially, if P=1, C=1, and t=2, then the expansion is shown as in FIG. 11.

Figure 12:
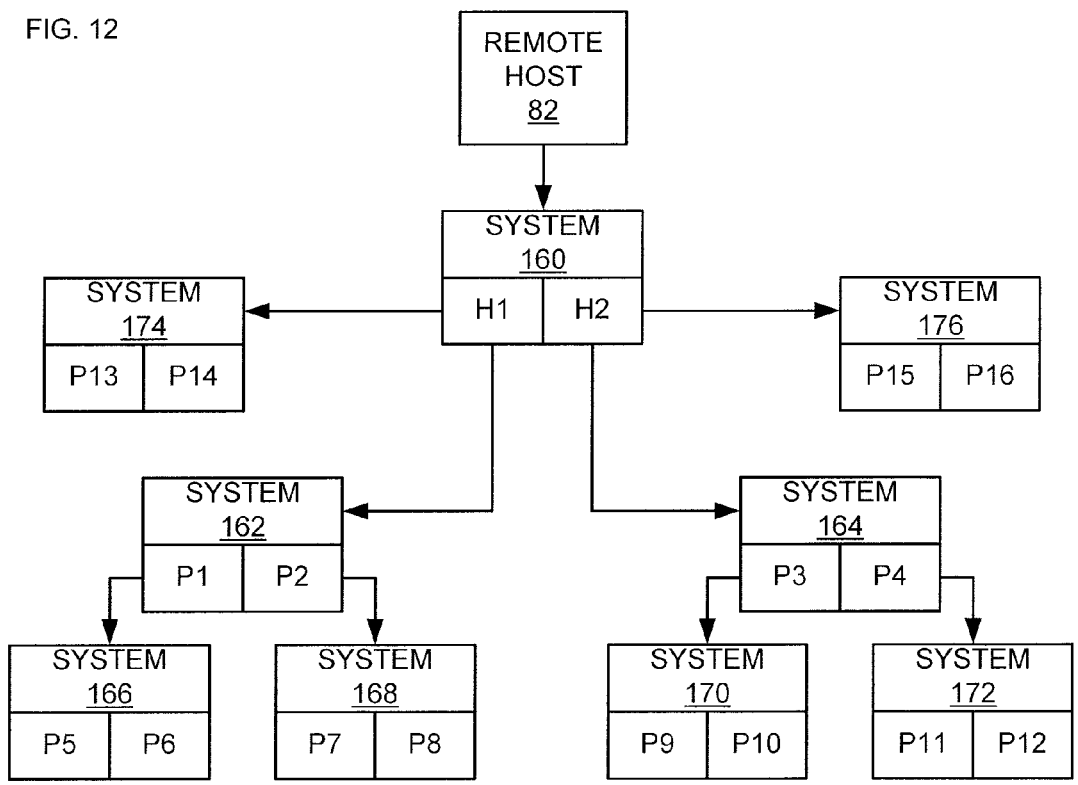
FIG. 12 is a block schematic illustrating expansion of a problem dataset in two time units among nodes of a Howard Cascade, each node including two processors and two communication channels.

Data communication as a logical overlay may occur in one of three ways: (1) direct cascade communication for problem-set distribution and agglomeration; (2) one-to-many of initial data to all nodes (using the cascade position to allow for the selection of the requisite data by each node); and (3) secondary one-to-many of intermediate data to all relevant nodes required sharing data. If P=2, C=2, and t=2, then the expansion is shown in FIG. 12. Systems 160, 162, 164, 166, 168, 170, 172, 174, and 176 represent a unit containing two processors and two communication channels (P=2, C=2), whereby each system represents two nodes in a HCAS. System 160, in this example, represents two home nodes, H1 and H2. System 162 represents two processing nodes, P1 and P2. System 164 represents two processing nodes, P3 and P4, and so on. Table 5 illustrates a comparison of a binary tree expansion rate to an expansion rate for a HC (with select numbers of processors P and communication channels C, per node), illustrating that even moderately constructed nodes (e.g., a motherboard with one processor and one network interface card (NIC), i.e., P=1, C=1) generates almost twice the expansion rate as a binary expansion.

TABLE 5

| | | HCSA | | | |
|---|---|---|---|---|---|
| Time Units | Binary | P = 1, C = 1 | P = 2, C = 2 | P = 3, C = 3 | P = 4, C = 4 |
| 1 | 1 | 1 | 4 | 9 | 16 |
| 2 | 2 | 3 | 16 | 45 | 96 |
| 3 | 4 | 7 | 52 | 189 | 496 |
| 4 | 8 | 15 | 160 | 765 | 2496 |

As above, ICADM category algorithms may be parallelized using a compiler or a run-time translation process. Preferably, the run-time translation process is used because of its flexibility (compiled solutions cannot dynamically allocate computational resources that maximally fit the work required for any given problem). Scaling, on the other hand, is a function of the effective bandwidth connecting the group of nodes (e.g., via point-to-point communications or via parallel data movement speeds).

External Context No Algorithmic Data Movement (ECNADA) Category

Certain logical and mathematical problems fall into this category. By way of definition, the ECNADA category is one in which the final work to be accomplished, for a given logical or mathematical problem, is intrinsic to another algorithm and the data being transformed does not require data to be moved as part of the collective algorithms. An example of an ECNADA category algorithm is the Hadamard Transform. In accord with one embodiment herein, an ECNADA category algorithm is treated like an ICNADM category algorithm.

External Context with Algorithmic Data Movement (ECADM) Category

Many logical and mathematical problems fall into this category. By way of definition, the ECADM category is one in which the final work to be accomplished, for a given logical or mathematical problem, is intrinsic to another algorithm and the base algorithm requires data movement. An arbitrary 2D dataset for an ECADM category algorithm is illustratively shown in FIG. 64 as an array of m rows and n columns. The 2D dataset of FIG. 64 is for example a bitmap image consisting of m rows and n columns of pixels, such as generated by a digital camera. When computing a two-dimensional FFT on such an array, it is done in two stages. First, a one-dimensional (1D) FFT is computed on the first dimension (either the m rows or n columns) of the input data array to produce an intermediate array. Second, a 1D FFT is computed on the second dimension of the intermediate array to produce the final result. The row and column operations are separable, so it does not matter whether rows or columns are processed first.

Then, the m rows are distributed over the P parallel processing nodes. The rows assigned to a node are defined by the starting row, referred to as a row index, and a row count. Rows are not split across nodes, so the row count is constrained to whole numbers. The distribution is done such that equal quantities of rows are assigned to nodes 1 through P−1, and the remainder rows are assigned to node P. A remainder is provided to handle cases where the number of rows does not divide equally into P nodes. The remainder may be computed as the largest integer, less than the row count, such that the sum of the row count times the number of nodes and the remainder equals the total number of rows. This adjustment achieves an equalized row distribution.

This step of distributing m rows over P nodes is illustrated in FIG. 65. Processor nodes 1 through P−1 are assigned $M_r$ rows, and processor node P is assigned the remaining $R_r$ rows. Each processor node, i, is assigned a row index, $IR_i$, equal to (i−1) times the row count $M_r$. This mapping of node numbers to row indices makes the data partitioning simple and efficient.

The next step evenly distributes the n columns over the P parallel processing nodes. Again, columns are not split across nodes, so the distribution is constrained to whole numbers. The column assignments are done in the same manner as for the rows. This step of distributing n columns over P nodes is illustrated in FIG. 66. Processor nodes 1 through P−1 are assigned $M_c$ columns, and processor node P is assigned the remaining $R_c$ columns. Each processor node, i, is assigned a row index, $IR_i$, equal to (i−1) times the column count $M_c$.

Figure 67:
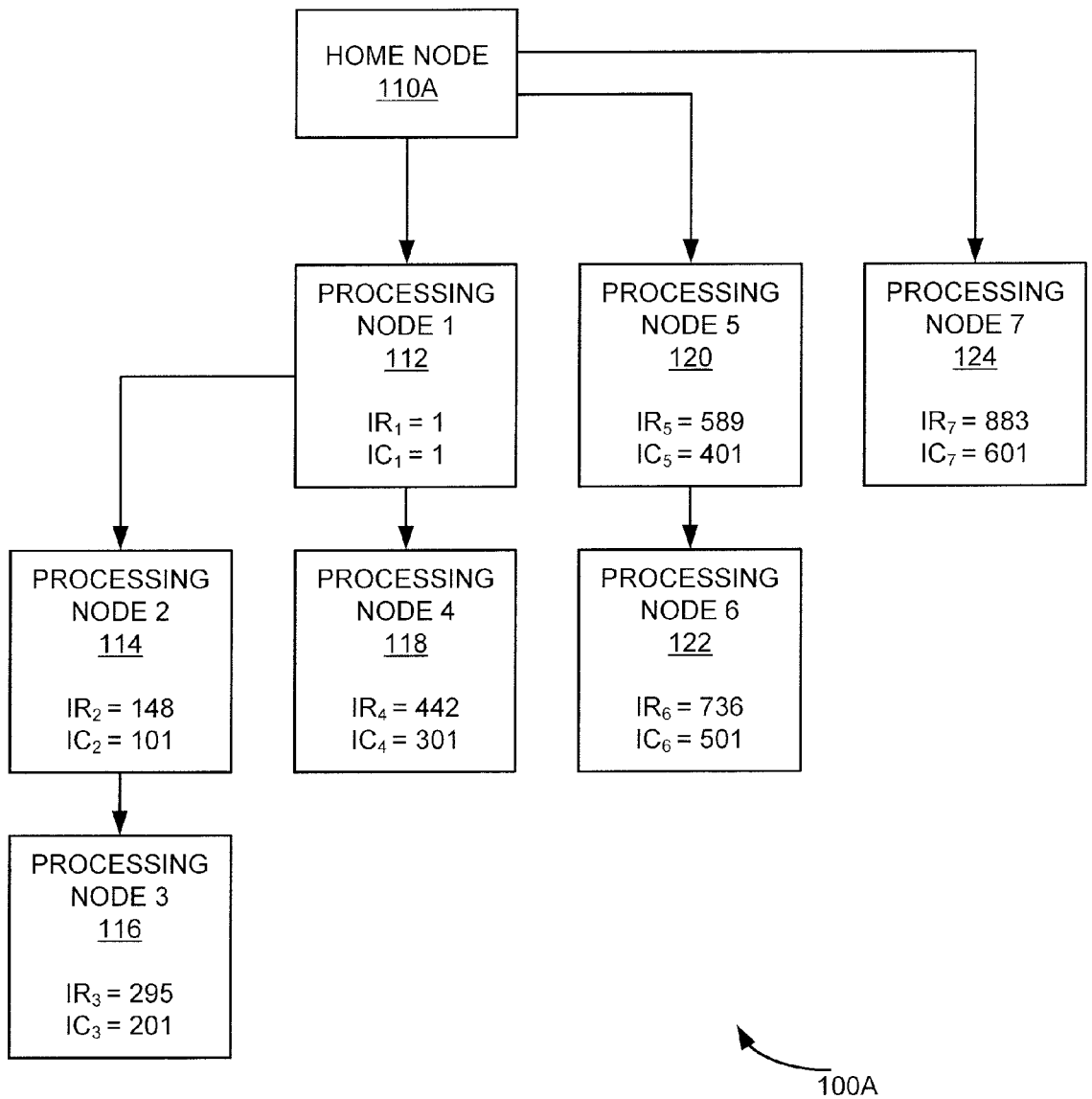
FIG. 67 is a block diagram illustrating one Howard Cascade processing a 2D dataset as in FIG. 64.

The relationship between row and column indices, row and column counts, and node numbers is further illustrated in the context of a 7-node HC 100A of FIG. 67, which distributes an image bitmap array consisting of 1024 rows and 700 columns on HC 100A. In this case, the row count, $M_r$, is 147 and the row remainder, $R_r$, is 142. Processing node 1 is assigned rows 1 through 147, processing node 2 is assigned rows 148 through 294, and so on, up to processing node 7, which is assigned the remainder rows 883 through 1024. As a check, 147 times 6 plus 142 equals the total row count of 1024. The column count, Mc, is 100 and the column remainder, $R_c$, is 0, since the number of columns evenly divides into the number of processing nodes. Processing node 1 is assigned columns 1 through 100, processing node 2 is assigned columns 101 through 200, and so on, up to processing node 7 which is assigned columns 601 through 700.

Home node 110A performs data partitioning as described above in connection with FIG. 6. Messages describing the command and data partitioning (in this case a 2D FFT) are sent out to processing nodes 112, 114, 116, 118, 120, 122, 124 (i.e., processing nodes 1-7, respectively). These messages are sent as illustrated by the arrows in FIG. 67. Once processing nodes 1-7 have received their command messages, each processing node waits for home node 110A to send data. The data is broadcast such that all processing nodes in HC 100A receives the data at the same time. Each node also receives the entire dataset, which is much more efficient than sending each individual node a separate message with only a portion of the dataset, particularly with large numbers of parallel processing nodes in the array.

Once a node receives its data, it proceeds with computing 1D FFTs on the columns independent of other nodes. When the column FFT results are ready, they are accumulated upstream to home node 110A, in agglomeration. Home node 110A then broadcasts the intermediate results to the processing nodes to compute the 1D FFTs on the rows. The individual column results are then accumulated upstream to home node 110A, in agglomeration, and into the final result to complete the process. Accordingly, data distribution through HC 100A can accommodate arbitrary sized 2D datasets in a simple and efficient manner. In an analogous fashion, 2D FFT are parallelized for any group of processors.

These techniques thus mitigate the difficulties of cross-communication normally found with this category of algorithm. Consider for example the following algorithm: $Image_{output}$=2D-CONVOLUTION (Kernel, (1D-FFT$_{columns}$ (TRANSLATE$_{fft\text{-}Transpose}$(1D-FFT$_{row}$(image$_{input}$))))), where image$_{input}$ is the base input image, 1D-FFT$_{column}$ is the column form 1D FFT, 1D-FFT$_{row}$ is the row form 1D FFT, Kernel is the convolution Kernel (e.g., an object to find in the input image), 2D-CONVOLUTION is the convolution algorithm, Image$_{output}$ is the output image, and TRANSLATE$_{fft\text{-}Transpose}$ is the Matrix Transpose for FFT. Since the work to be accomplished is not part of the 2D-FFT (i.e., the algorithm operates to translate data to the frequency domain), the work unit of the associated function may be used to limit cross-communication. The work unit in this example is defined by the Kernel parameter of the 2D-CONVOLUTION. As long as lowest frequency per node of the 2D-FFT is at least twice the lowest frequency of the Kernel parameter, then that defines the minimum size that the image$_{input}$ can be split into without cross-communicate between processors. This occurs because the TRANSLATE$_{fft\text{-}Transpose}$ function need not retain lower frequency data (the purpose of cross-communication) when it performs its matrix Transpose. In this rendition of a 2D-FFT, the FFT is broken into three parts: 1D-FFT$_{row}$, TRANSLATE$_{fft-Transpose}$, and 1D-FFT$_{column}$. This functional breakup allows for the insertion of the required Transpose, but also allows that function to determine whether or not to move data between processors. Accordingly, the translation between an algorithm such as ALG(A) to ALG(B), below, may occur automatically.

ALG(A)=Image$_{output}$=2D-CONVOLUTION (Kernel, (2D-FFT$_{columns}$ (image$_{input}$))), where image$_{input}$ is the base input image, 1D-FFTcolumns is the column form 1D FFT, 1D-FFTrow is the row form 1D FFT, Kernel is the convolution Kernel (e.g., the object to locate), 2D-CONVOLUTION is the convolution algorithm, and Image$_{output}$ (ALG(A)) is the output image. ALG(B)=Image$_{output}$=2D-CONVOLUTION (Kernel, (1D-FFTcolumns (TRANSLATE$_{fft-Transpose}$ (1D-FFT$_{row}$ (image$_{input}$))))), where, image$_{input}$ is the base input image, 1D-FFT$_{columns}$ is the column form 1D FFT, 1D-FFT$_{ro}$ is the row form 1D FFT, Kernel is the convolution Kernel (e.g., the object to locate), 2D-CONVOLUTION is the convolution algorithm, Image$_{output}$(ALG(B)) is the output image, and TRANSLATE$_{fft-Transpose}$ is the matrix Transpose for the FFT.

ECADM category algorithms can be parallelized using a compiler or a run-time translation process. Scaling is primarily a function of work that binds the cross-communication. Preferably, the run-time translation process is used because of its flexibility (compiled solutions cannot dynamically allocate computational resources that maximally fit the work required for any given problem).

The above discussion of ICNADM, ICADM, ECNADM and ECADM category processing may be used to enhance parallel processing of algorithms through parallel processing architectures, including the HC.

Large Scale Cluster Computer Network Switch Using HC

Figure 13:
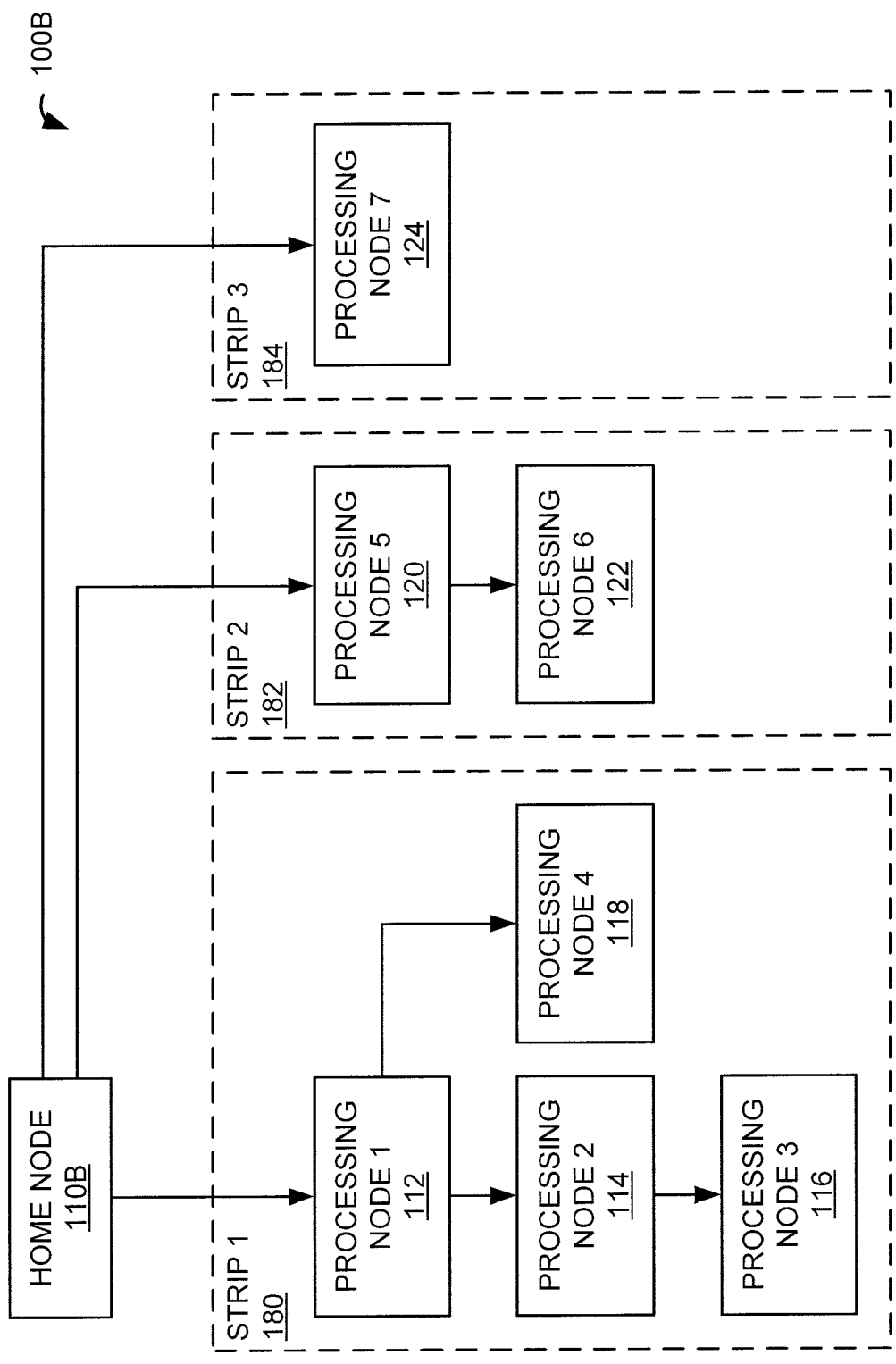
FIG. 13 illustrates one Howard Cascade segregated into three levels among three strips.
Figure 14:
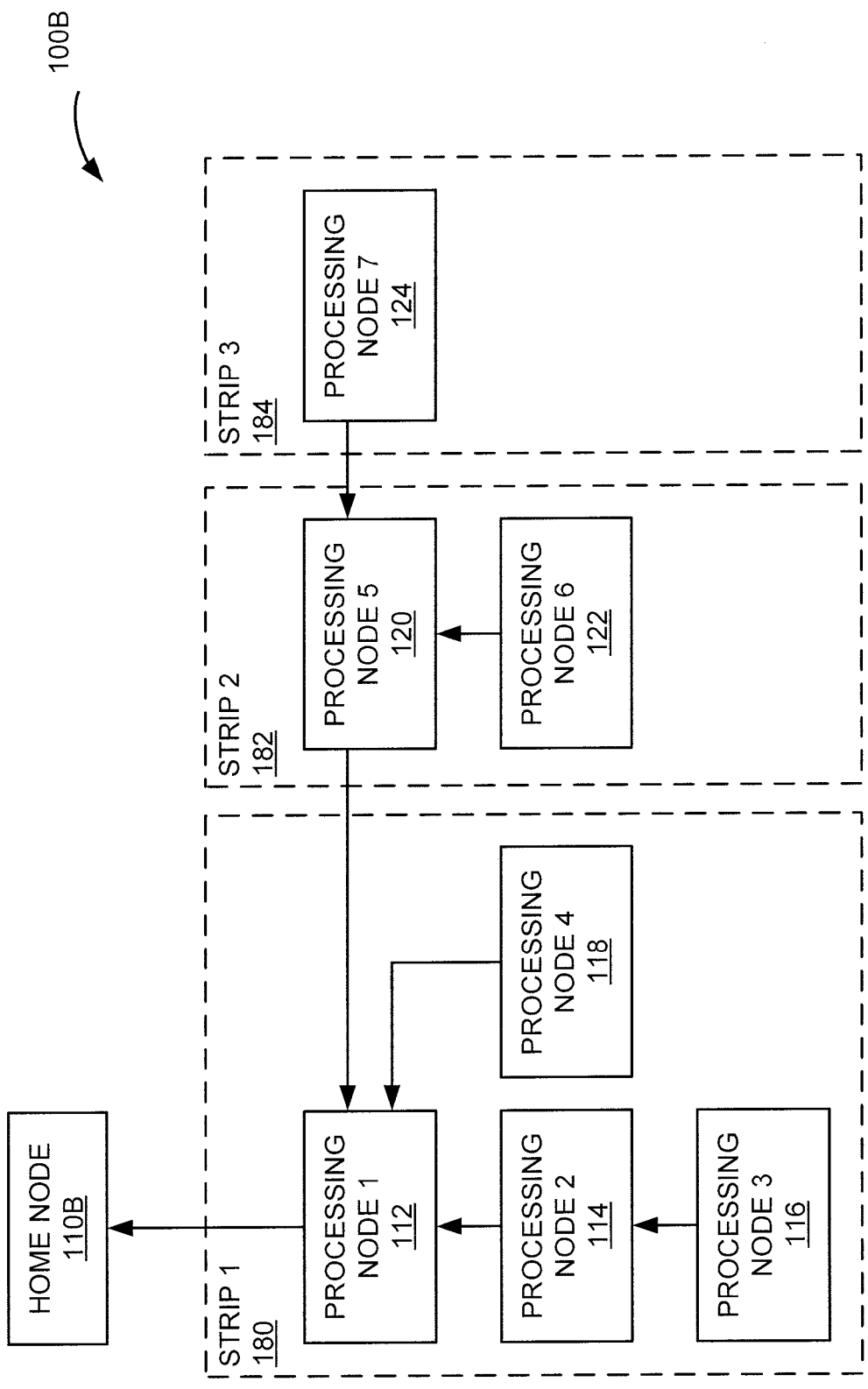
FIG. 14 illustrates the Howard Cascade of FIG. 13 during agglomeration.

The HC provides certain advantages over the prior art. By way of example, the HC decreases the constraints on cluster size imposed by the back plane of a switching network of a shared memory cluster. The logical form of a two dimensional, level three HC 100B is illustrated in FIG. 13. HC 100B is illustratively divided into sections labeled "strips." Each strip is connectively independent of other strips. This independency remains throughout processing, until agglomeration. During agglomeration, communication may occur between the strips, as illustrated in FIG. 14. More particularly, while distributing the problem dataset, home node 110B only communicates with top-level nodes 112, 120, 124, which in turn communicate with other processing nodes of each respective strip. However, during agglomeration, inter-node communication may occur in a single direction between strips and nodes 112, 120, 124 at the top level, as shown in FIG. 14. Accordingly, the strips of HC 100B are separable in terms of switch topology, as illustrated further in FIG. 15.

Figure 15:
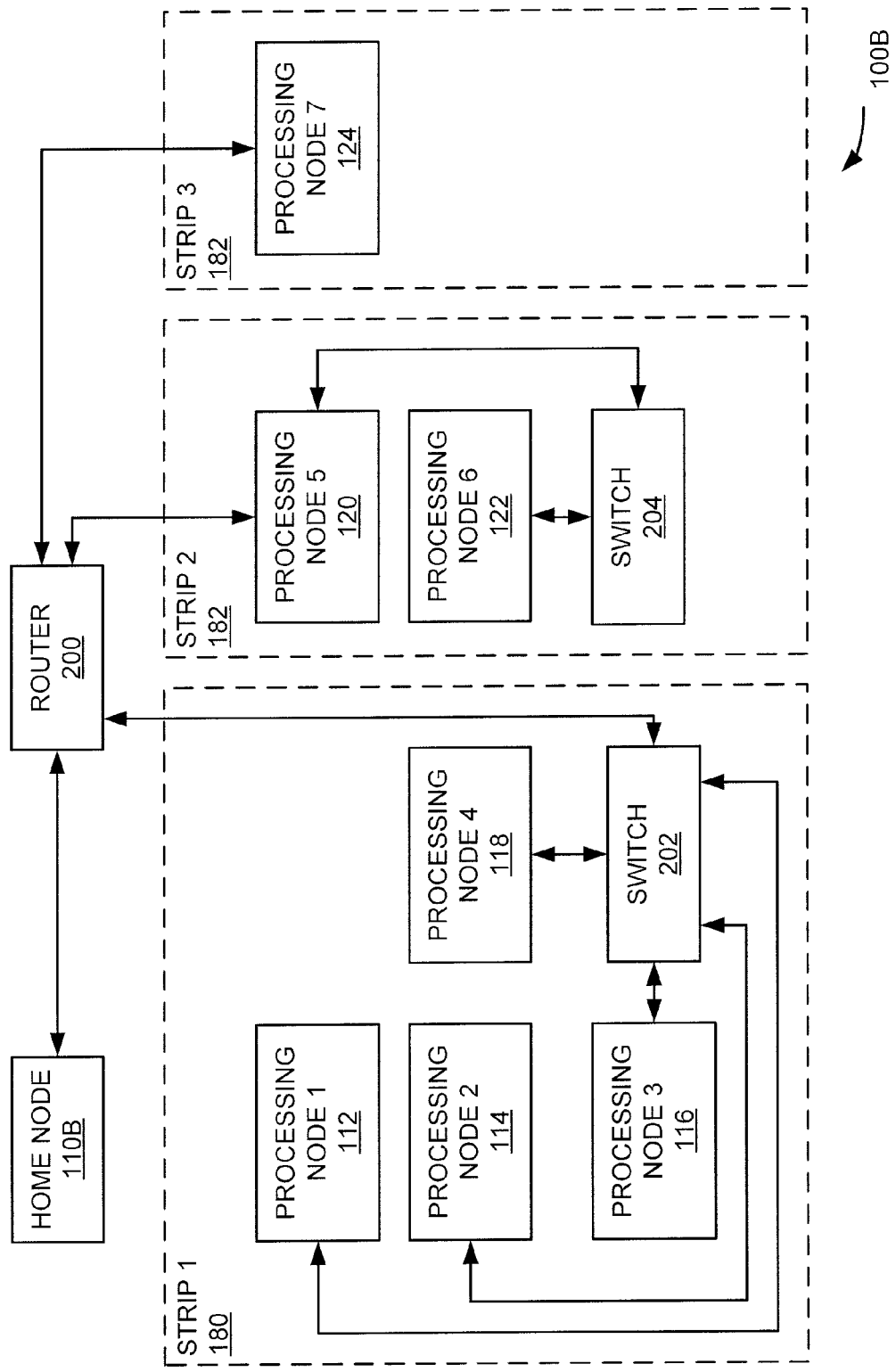
FIG. 15 illustrates further detail of the Howard Cascade of FIG. 13, including switches and routers.

In FIG. 15, a router 200 is used to communicate between home node 110B and the top nodes 112, 120, 124; this inter-strip communication may occur at problem distribution and/or agglomeration. Node connectivity within a strip is achieved by using switches that accommodate the number of nodes in the strip. In FIG. 15, switch 202 provides physical connectivity (i.e., inter-strip communication) between nodes 112, 114, 116, 118 in strip 1, and switch 204 provides physical connectivity (i.e., inter-strip communication) between nodes 120, 122 in strip 2. As strip 3 has only one node 124, connected to router 200, no additional switch is necessary. Since very little interaction occurs at the level of router 200, it has a negligible affect on performance. The topology of HC 100B thus allows for extremely large clusters with little cost.

Switches such as switch 202 or 204 have a limitation on the number of nodes that can be chained together. For example, a Hewlett-Packard HP2524 switch has twenty-four ports, and can have up to sixteen switches chained together. The total number of switching ports available in this switching array is therefore 384. A strip utilizing the HP2524 as its switch within a switching array may therefore connect up to 384 nodes, for example. An example of a router suitable for router 200 is a Hewlett-Packard HD 9308m, which has a total of 168 ports. Using the HD9308m as router 200 may then connect (168×384) 64,512 nodes together.

Figure 16:
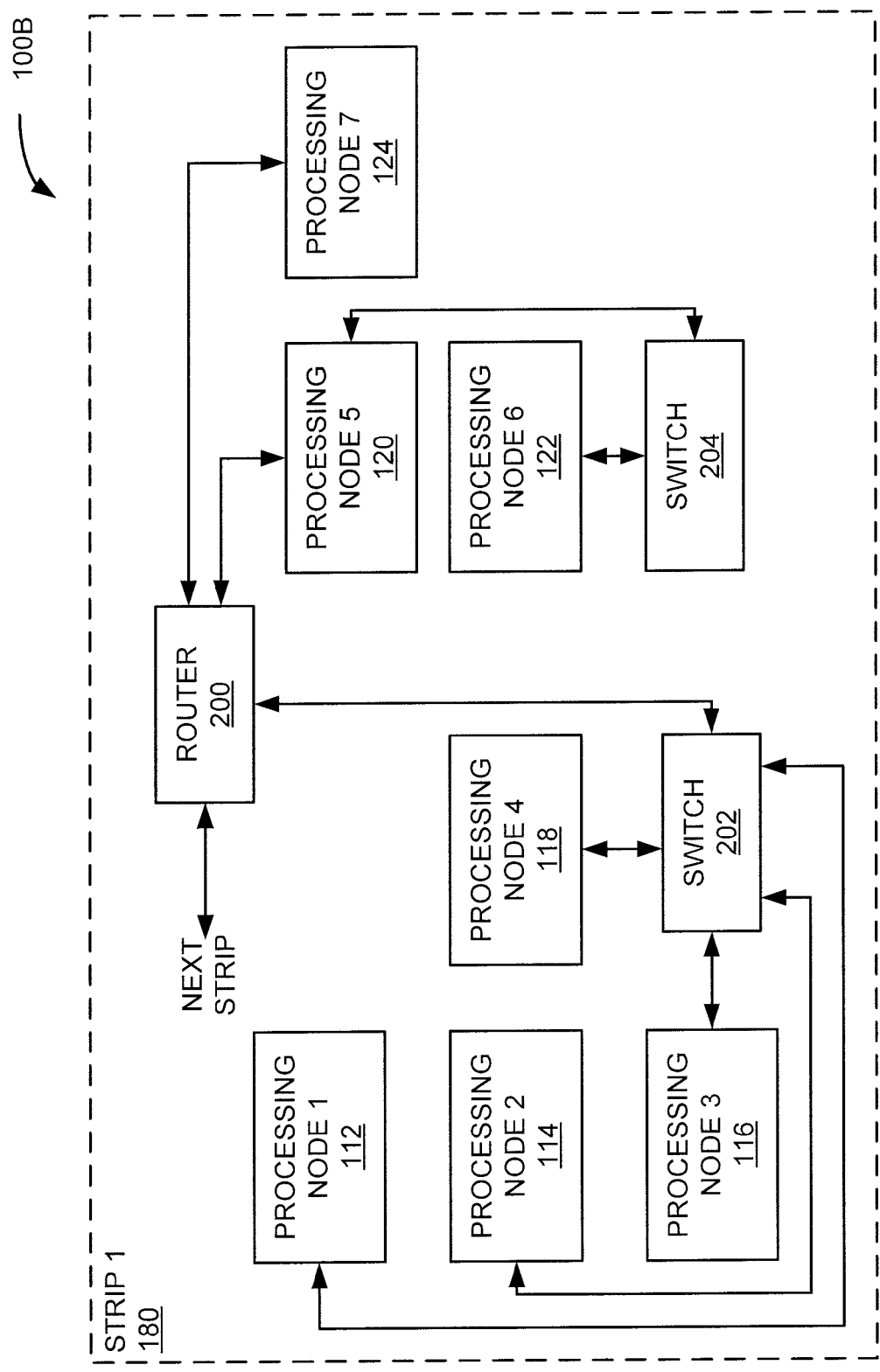
FIG. 16 illustrates reconfiguring of cascade strips within the Howard Cascade of FIG. 13, to accommodate boundary conditions.

The topology of HC 100B may be modified to break up a very large strip so that it can perform with a boundary condition such as the aforementioned 384-node boundary. Specifically, in one embodiment, the number of nodes (processors) within a strip may be limited according to the following: (a) a strip has at least one HC and (b) a HC consists of the sum of HCs plus a remainder function. That is, H=H(x)+H(y)+ . . . +R(z), where H( ) is a HC with a size no larger than H, and where R( ) is 0, 1, or 2 nodes. Thus, larger cascade strips may be broken into smaller groups with a switch associated with each group, as shown in FIG. 16. By decomposing the Howard cascade into its component cascades, and by properly associating the switching network, we maintain high switching speeds while minimizing the number of switches.

The Use of Multiple Expansion Channels in Cascading Computers

Computers connected as a HC, e.g., HC 100, FIG. 6, may utilize multiple parallel interfaces to increase the rate of problem set expansion. The general expansion rate for the HC can be expressed by the following:

$$N_1 = 2^t - 1 \quad \text{(Equation 1)}$$

where N is the number of nodes used in expansion, and t is the number of time units used in expansion. As can be seen, the expansion rate provides the following number of nodes: {0, 1, 3, 7, 15, 31, 63, 127, 255, 511, 1023, . . . }, which is a geometric expansion of base-2. Equation 1 can be generalized to:

$$N_2 = p*(p+1)^t - p \quad \text{(Equation 2)}$$

where N is the number of nodes used in expansion, t is the number of time units used in expansion, and p is the number of parallel channels of expansion.

A parallel channel of expansion equates to the number of bus connections (network cards, processors, etc.) which can operate simultaneously, per node. In the case of networked computers, this implies both a network interface card (NIC) and a parallel bus. For a single processor computer (which has a single internal bus), the number of channels of expansion is one and Equation 1 applies. For the case where there are two processors, per node, the following applies (per Equation 2).

$$N_3 = 2(2+1)^t - 2 \quad \text{(Equation 3)}$$

where N is the number of nodes used in expansion, and t is the number of time units used in expansion. Table 6 below sets forth the expansion rate, in nodes, for two parallel expansion channels.

TABLE 6

Expansion Rate in a HC for Two Parallel Expansion Channels

| Time Units | Nodes |
|---|---|
| 0 | 0 |
| 1 | 4 |
| 2 | 16 |

TABLE 6-continued

Expansion Rate in a HC for Two Parallel Expansion Channels

| Time Units | Nodes |
|---|---|
| 3 | 52 |
| 4 | 160 |
| 5 | 484 |
| 6 | 1456 |
| 7 | 4372 |
| 8 | 13120 |
| 9 | 39364 |
| 10 | 118096 |
| 11 | 354292 |

Comparing the computations of Equation 2 with Equation 3 generates Equation 4:

$$R = N_1/N_3 \quad \text{(Equation 4)}$$

where R is the ratio of number of nodes of expansion, $N_1$ is the number of nodes of expansion using Equation 1, and $N_3$ is the number of nodes of expansion using Equation 3. Table 7 sets forth the ratios of such expansion.

TABLE 7

Expansion Rates and Ratios

| Time Units | Nodes p = 1 | Nodes p = 2 | Ratio |
|---|---|---|---|
| 0 | 0 | 0 | unknown |
| 1 | 1 | 4 | 0.250000 |
| 2 | 3 | 16 | 0.187500 |
| 3 | 7 | 52 | 0.134615 |
| 4 | 15 | 160 | 0.093750 |
| 5 | 31 | 484 | 0.064049 |
| 6 | 63 | 1456 | 0.043269 |
| 7 | 127 | 4372 | 0.029048 |
| 8 | 255 | 13120 | 0.019435 |
| 9 | 511 | 39364 | 0.012981 |
| 10 | 1023 | 118096 | 0.008662 |
| 11 | 2047 | 354292 | 0.005777 |

Table 7 illustrates that the first expansion provides one fourth of the expansion efficiency, as compared to the second expansion. The foregoing also illustrates that by increasing the number of dimensions of expansion using the HC, the cluster efficiency is further enhanced.

Figure 31:
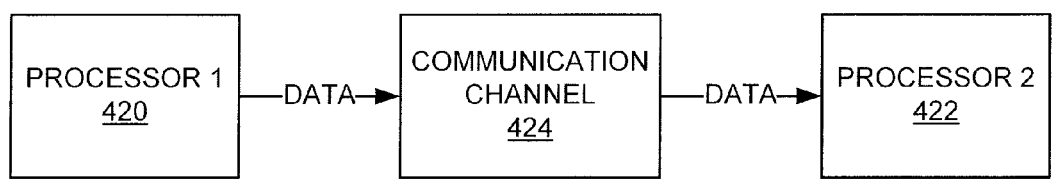
FIG. 31 illustrates two single-processor nodes of a Howard Cascade utilizing a single communication channel.
Figure 32:
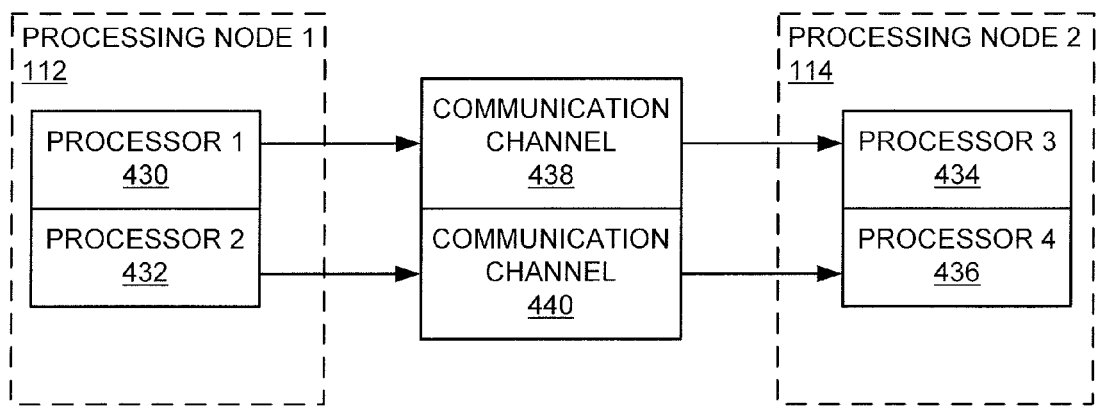
FIG. 32 illustrates two two-processor nodes of a Howard Cascade utilizing a double communication channel.

FIG. 31 and FIG. 32 illustrate representative hardware configurations for parallel channel communication; each parallel channel of expansion consists of a computer processor and a communication channel. FIG. 31 shows a first processor 420 connected to a second processor 422 via a single communication channel 424. Multiple parallel channels of expansion, on the other hand, consist of multiple computer processors and multiple communication channels, as shown in FIG. 32. Processor 430 and processor 432 of processing node 112 are connected to processor 434 and processor 436 of processing node 114 by two communication channels 438 and 440, respectively. Other parallel channel configurations follow and may be implemented such that a HC moves data as efficiently as desired.

The HC and Node Number

An n-dimensional HC may consume a fixed number of processing nodes for each expansion level. For example, a 2-Dimensional HC may consume a number of nodes set forth by Table 8.

TABLE 8

Node Expansion for N-dimensional HC

| Expansion Level | Number of nodes |
|---|---|
| 1 | 1 |
| 2 | 3 |
| 3 | 7 |
| 4 | 15 |
| 5 | 31 |
| 6 | 63 |
| ... | ... |
| N | $(p + 1)^{expansion\ level} - 1$ |

To be able to consume, for example, 4, 5, or 6 nodes in a two-dimensional HC, an extension to the above node expansion algorithm for the HC may be used, as described below.

More particularly, the expansion of a HC in time may be shown in the sets defined below. The natural cascade frequency of the HC is the expansion rate of Set 1: $\{1, 3, 7, 15, 31, \ldots, 2^{t}-1\}$, where t is the number of time units. In the more general case, Set 1 takes the form of Set 2: $\{d^1-1, d^2-1, d^3-1, d^t-1\}$, where d is the number of dimensions of expansion (=(p+1)), p is the number of parallel channels of expansion, and t is the number of time units. It is advantageous to obtain an expansion number that lies between the elements of Set 2. For example consider Set 3: $\{d^1-1+1, d^1-1+2, d^1-1+3, \ldots d^2-2\}$, where d is the number of dimensions of expansion (=p+1), and p is the number of parallel channels of expansion. Set 3 more specifically shows the set of values that lie between the first and second natural expansion terms. In the case of Set 1, this translates into Set 4: $\{2\}$. The general set for an in-between number of nodes is given in Set 5: $\{d^t-1+1, d^t-1+2, d^t-1+3, \ldots, d^t-1+t, d^{(t+1)}-2\}$, where d is the number of dimensions of expansion (=p+1), p is the number of parallel channels of expansion, and t is the number of time units. The general HC construction series is then given below:

$$N = H_{(P,t)}$$
$$= P * (P+1)^t - P$$
$$= P + (H_{(P,1)} + P) + (H_{(P,2)} + P) + \ldots + (H_{(P,t-1)} + P)$$
$$= P + (P*(P+1)^1 - P + P) + (P*(P+1)^2 - P + P) + \ldots + (P*(P+1)^{t-1} - P + P)$$
$$= \sum_{x=0}^{t-1} P * (P+1)^x$$

As can be seen, each term of the expansion is equal to the sum of all preceding terms. Since each term corresponds to a cascade strip, the HC is balanced by adding additional nodes starting with the next highest term and continuing until all empty potential slots are filled, or by evenly spreading extra-nodes among the strips. Keeping the HC balanced by evenly spreading nodes among the cascade strips is accomplished by level-spreading among the nodes, as illustrated in Table 9 and Table 10:

TABLE 9

A Three-level, Seven-Node HC with Strip Boundaries

|  | Strip 1 | Strip 2 | Strip 3 |  |
|---|---|---|---|---|
| Node 1 | | Node 5 | Node 7 | Level 1 |
| Node 2 | Node 4 | Node 6 | | Level 2 |
| Node 3 | | | | Level 3 |

TABLE 10

A Three-level, Eight-Node HC with Strip Boundaries

| Strip 1 | Strip 2 | Strip 3 | Strip 4 |  |
|---|---|---|---|---|
| Node 1 | Node 5 | Node 7 | Node 8 | Level 1 |
| Node 2 Node 4 | Node 6 | | | Level 2 |
| Node 3 | | | | Level 3 |

Since each strip boundary and level represents a time unit, and since the position of the nodes in a strip and on a level represents the distribution that may occur in that time slot, adding an additional node 8 in Table 10 increases the overall processing time (as compared to Table 9) because of the additional time unit. Unlike Table 10, where the additional node 8 was added to the top-most level, Table 11 illustrates how additional nodes may be added without the additional time cost.

TABLE 11

Four-Level, Four-Strip HC

| Strip 1 | Strip 2 | Strip 3 | Strip 4 |  |
|---|---|---|---|---|
| Node1 | Node9 | Node13 | Node15 | Level 1 |
| Node2 Node5 Node8 | Node 10 Node12 | Node14 | | Level 2 |
| Node3 Node6 Node7 | Node11 | | | Level 3 |
| Node4 | | | | Level 4 |

One way to balance the HC is to fill node spaces by level, to ensure that the nodes are aligned in time. Table 12 illustrates one technique for adding nodes with reference to the HC of Table 11:

TABLE 12

Adding Nodes to a Balanced HC

| Number of Added Nodes | Which Nodes are added |
|---|---|
| 1 | Node 15 (A) |
| 2 | Node 15 (A) and Node 8 (B) |
| 3 | Node 15 (A) and Node 8 (B) and Node 12 (B) |
| 4 | Node 15 (A) and Node 8 (B) and Node 12 (B) and Node 14 (B) |
| 5 | Node 15 (A) and Node 8 (B) and Node 12 (B) and Node 14 (B) and Node 6 (C) |
| 6 | Node 15 (A) and Node 8 (B) and Node 12 (B) and Node 14 (B) and Node 6 (C) and Node 11 (C) |
| 7 | Node 15 (A) and Node 8 (B) and Node 12 (B) and Node 14 (B) and Node 6 (C) and Node 11 (C) and Node 7 (D) |
| 8 | Node 15 (A) and Node 8 (B) and Node 12 (B) and Node 14 (B) and Node 6 (C) and Node 11 (C) and Node 7 (D) and Node 4 (D) |

In Table 12, any of the nodes shown in the same type (A, B, C or D, respectively) can replace any other node of the same type in placement order. By ensuring that the nodes are added in a time efficient manner, HC system overhead is reduced.

Pre-building Agglomeration Communication Paths

Figure 68:
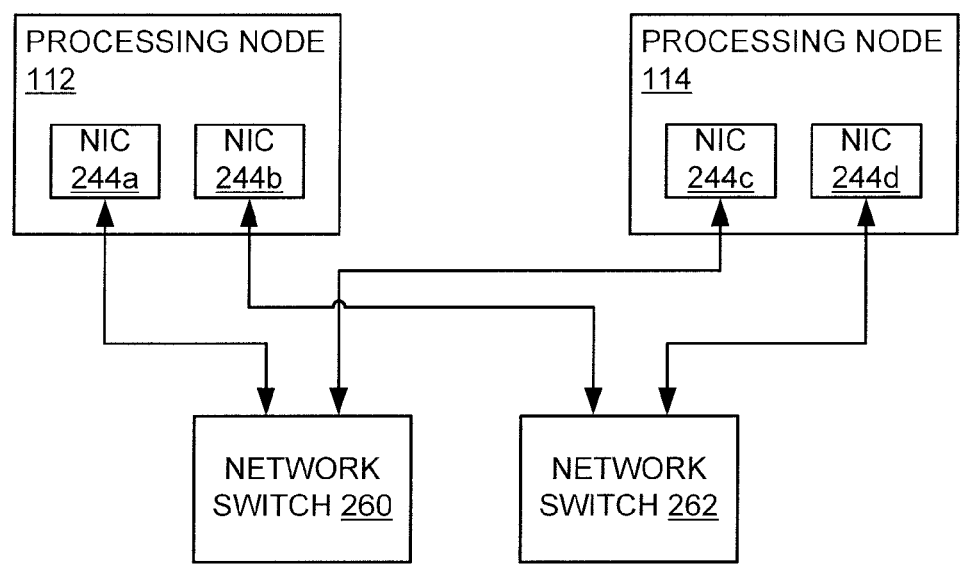
FIG. 68 illustrates one example of two processing nodes each utilizing two communication channels to connect to two network switches.

Typically in the prior art, implementations using multiple network interface cards ("NICs") require that the NICs are bonded at the device driver level. This makes off-the-shelf device driver upgrades unavailable, and removes the ability to use the NICs independently of each other to create multiple communication channels. By allowing the software application level to control the NICs independently, multiple communication channels can be created and used in different ways, giving greater communication flexibility. For example, multiple communication channels can be made between two nodes for increasing the communication bandwidth, or the communication channels can be used independently to allow one node to communicate with many other nodes concurrently. Another advantage is obtained as a result of the requirement to have a physically separate switch network for each parallel communication channel. This requirement provides channel redundancy commensurate with the number of parallel communication channels implemented. FIG. 68 shows an example of connectivity between two processing nodes, 112 and 114, each with two NICs 244a, 244b, 244c and 244d, respectively. Each parallel communication channel has an independent network switch, 260 and 262. Processing node 112 has two possible communication channels with processing node 114; a) using NIC 244a that connects to network switch 260 and thus to NIC 244c in processing node 114, and b) using NIC 244b that connects to network switch 262 and thus to NIC 244d in processing node 114. It is preferable, but not necessary, that each node in the cluster have the same number of NICs, and hence parallel communication channels, and thereby connection to all switch networks for optimal communication throughput.

Figure 69:
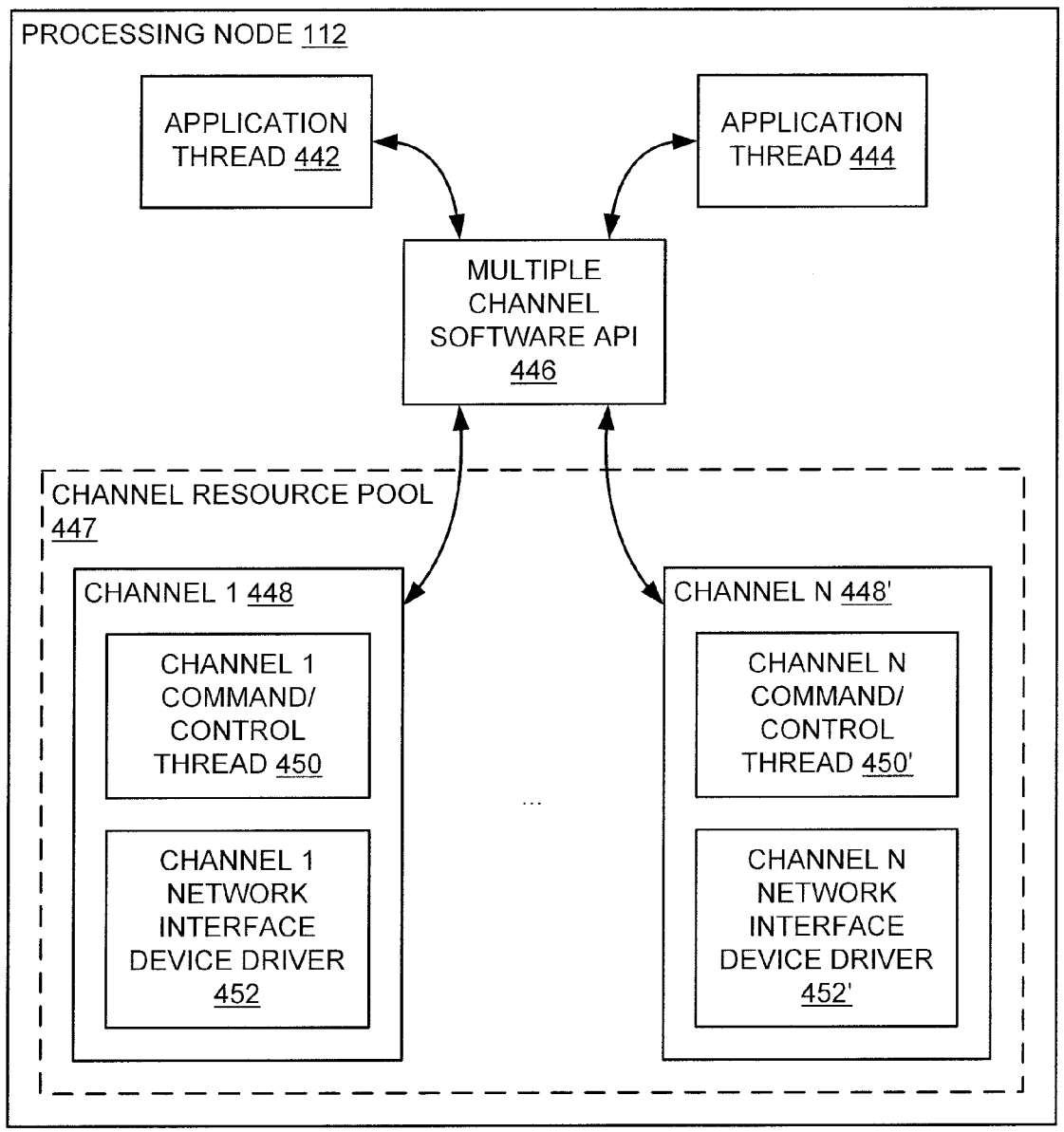
FIG. 69 illustrates one example of application threads running on a processing node utilizing a multiple channel software API for managing multiple communication channels.

FIG. 69 illustrates how multiple communication channels, 448 and 448' in this example, may be implemented on a processing node 112. A software application (for example, control software 94 of FIG. 5) may consist of multiple threads. Each thread uses a multiple channel software API 446, to facilitate communication with other nodes. API 446 consists of a library of thread-safe subroutines that coordinate use of communication channels 448 and 448' in a channel resource pool 447. In this example, each channel, 448, 448', utilizes a command/control thread, 450, 450', respectively, to communicate with the specific network interface device drivers, 452 and 452'. Command/control threads 450, 450', use network interface device drivers 452, 452', respectively, for handling specific communication protocols. API 446 decouples application threads 442 and 444 from specific network hardware and protocol knowledge. API 446 allows application threads to use one or more channels for a communication, and manages the data distribution and reconstruction across selected channels as necessary. API 446 may also handle channel protocols, detecting and recovering from channel failures.

Figure 70:
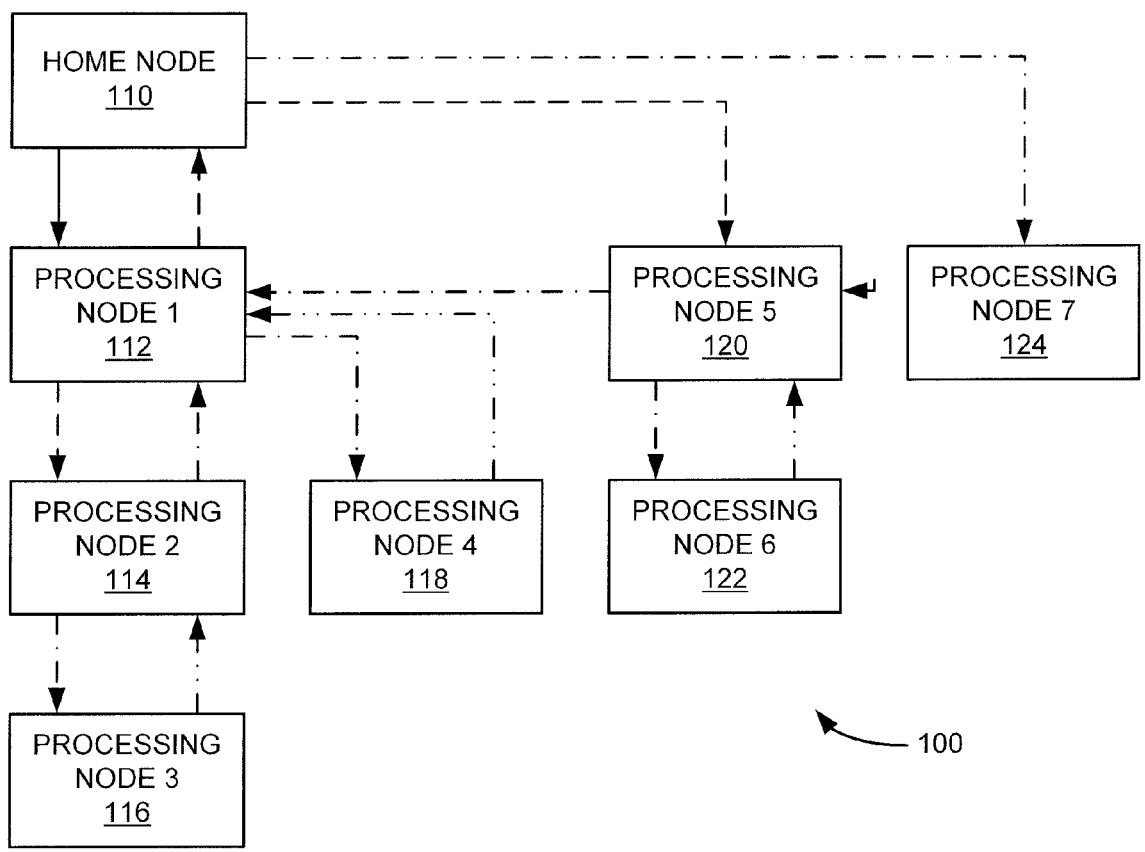
FIG. 70 illustrates one advantage of using two communication channels per node in an HCAS.

FIG. 70 illustrates how multiple communication channels may be used to gain additional efficiency when utilized on an HCAS. In this example, HC 100 consists of one home node 110 and seven processing nodes 112, 114, 116, 118, 120, 122, 124 and 126. Each processing node, 112, 114, 116, 118, 120, 122, 124 and 126, has two parallel communication channels. One channel is used for problem expansion on HC 100, and the other channel is used for agglomeration on HC 100. The connecting lines in FIG. 70 represent messages being passed between nodes. The style of the line indicates the time unit during which the message is passed, as shown in key 456. Home node 110 sends a processing request to processing node 112, during time unit 1. During time unit 2, home node 110 sends the processing request to processing node 120. Processing node 112 sends the processing request to processing node 114 and configures its second communication channel back to home node 110, ready for agglomeration. During time unit 3, home node 110 sends the processing request to processing node 124. Processing node 112 sends the processing request to processing node 118 using its first communication channel. Processing node 114 sends the processing request to processing node 116 using its first communication channel and configures its second communication channel back to processing node 114 ready for agglomeration. Processing node 120 sends the processing request to processing node 122 using its first communication channel, and configures its second communication channel to processing node 112, ready for agglomeration. During time unit 4, processing node 116 configures its second communication channel to processing node 114 ready for agglomeration. Processing node 118 configures its second communication channel to processing node 112 ready for agglomeration. Processing node 112 configures its second communication channel to processing node 120 ready for agglomeration. Processing node 124 configures its second communication channel to processing node 120, ready for agglomeration.

As shown, after three time units, the processing request has been sent to all seven processing nodes. During time unit 4, the processing nodes, if expecting data, configure their first communication channel to receive the data broadcast. After four time units, the full data agglomeration communication path has been established, thus saving channel configuration overhead normally incurred prior to data agglomeration, as in the case when only one communication channel is available to the processing nodes.

Processing Nodes as a Home Node

If each processing node contains an additional NIC associated with the home node switch network, then a processing node can be used in place of a home node. For example, if a home node fails, either processing nodes or other home nodes will detect the lack of communication. In one embodiment, the lowest numbered communicating home node selects one of its processing nodes to reconfigure as a new home node by terminating the active processing node software and by starting new home node software through a remote procedure call. The failed home node's assigned processing nodes are then reassigned to the new home node, and processing continues. This is discussed further in connection with FIG. 17, FIG. 20-FIG. 24.

Multiple Home Nodes in Cascading Cluster Systems

A HC may have multiple home nodes operating in tandem. Such a HC may further automate detection and mitigation of failed home nodes. In particular, each HC cluster within a HCAS may reconfigure itself in the event of a dropped out node, and without human intervention. Since the replacement home node operates like the failed node, the HC functions fully for parallel processing. Moreover, multiple home nodes facilitate access by multiple remote hosts.

Figure 17:
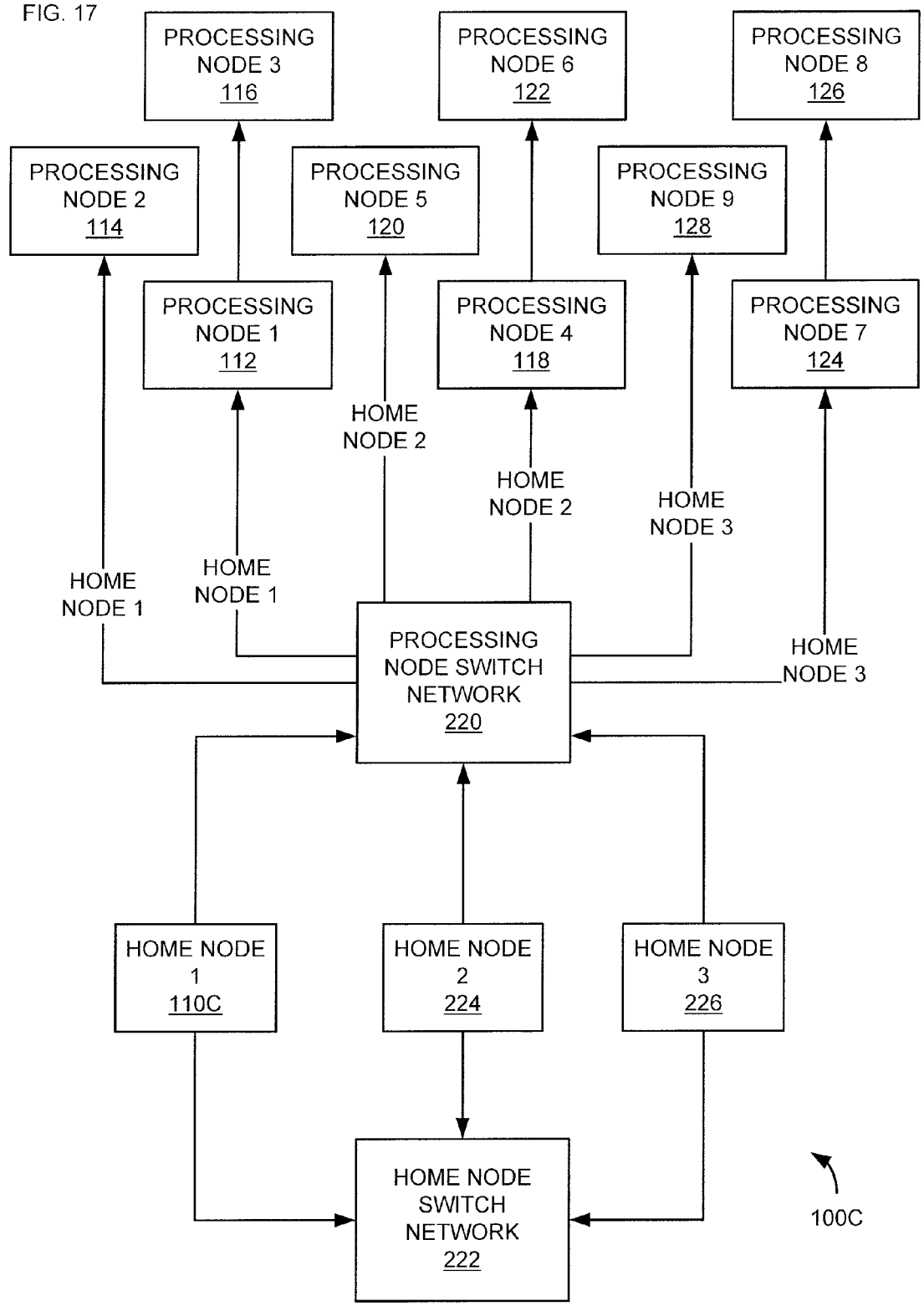
FIG. 17 shows one Howard Cascade with multiple home nodes.

In order to have multiple home nodes allocating processing nodes at the same time, the home nodes share data. FIG. 17 shows the communication paths for multiple gateway nodes in one HC 100C. FIG. 17 illustratively has nine processing nodes 112, 114, 116, 118, 120, 122, 124, 126, 128 with three home nodes 110C, 224, 226. Each home node can communicate with each of the other home nodes. At system startup, each home node has a list of processing nodes for which it is responsible; this is indicated in FIG. 17 by identifying the home node on the communication line between a processing node switch network 220 and the processing nodes. For example, processing nodes 118, 120, 122 are under control of home node 224 as part of the same cluster network. Table 13 sets forth all associations of HC 100C.

If any of home nodes 110C, 224, 226 require additional processing nodes, then it looks to the list of processing nodes for any other home node to see if a free processing node exists; switch 220 then reconfigures to bring the new processing node under control of the requesting home node. In another embodiment, a home node needing processing power can broadcast a request for additional processing nodes to each of the other home nodes; these nodes respond and, if a free processing node exists, HC 100C reconfigures to adjust the nodes processing for a particular home node.

TABLE 13

One Multi-Home Node HC with Processing Node Associations

| home node | processing node list |
|---|---|
| home node 1 | Processing Node 1, Processing Node 2, Processing Node 3 |
| home node 2 | Processing Node 4, Processing Node 5, Processing Node 6 |
| home node 3 | Processing Node 7, Processing Node 8, Processing Node 9 |

In one example of operation of HC 100C, FIG. 17, all nodes in home node 1 (110C) and home node 2 (224) are idle and home node 3 (226) needs seven processing nodes. Home node 3 issues a request for four more processing nodes in a single multi-cast message to both home node 2 and home node 1. The request also contains the total number of home nodes addressed by the message. When home node 1 receives the multi-cast message and determines that the total number of home nodes addressed is two, it calculates that it should return two free processing nodes by dividing the total number of nodes requested by the total number of home nodes addressed by the message, and sends a return message identifying processing node 1 and processing node 2. When home node 2 receives the multi-cast message, it sends a return message identifying processing nodes 4 and 5.

In another example of operation of HC 100C, home node 3 requires only one additional processing node. Home node 3 issues a multi-cast message request for one processing node to home node 1 and home node 2. The message also contains the total number of home nodes addressed by the multi-cast message. When home node 1 receives the multi-cast message, it sends a return message identifying only processing node 1, as it is the lowest numbered home node and the request was for a single processing node. When home node 2 receives the multi-cast message, it recognizes that it does not need to send a return message to home node 3 because it will recognize that home nodes with lower numbers have fulfilled the request.

Figure 18:
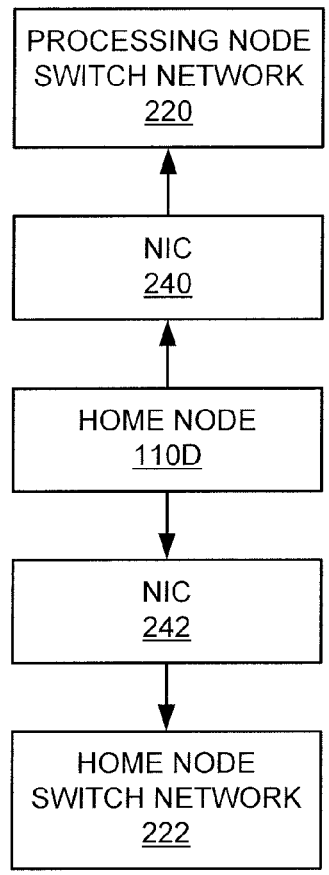
FIG. 18 shows one home node network communication configuration for a home node within the Howard Cascade of FIG. 17.
Figure 19:
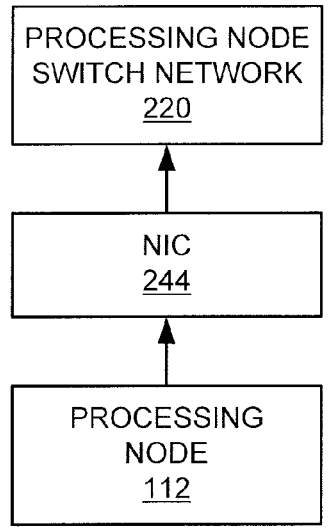
FIG. 19 shows one processing node network communication configuration for a processing node within the Howard Cascade of FIG. 17.

FIG. 18 shows one NIC configuration for a home node 110D. Home node 110D has two network interface cards, NIC 240 and NIC 242. NIC 240 is connected to processing node switch network 220, FIG. 17, and NIC 242 is connected to home node switch network 222, FIG. 17. FIG. 19 shows further connectivity of the NIC configuration relative to a processing node 112. Processing node 112 has a single network interface card NIC 244 connected to processing node switch network 220. One difference between the home node configuration of FIG. 18 and the processing node configuration of FIG. 19, in terms of network connections, is that processing node 112 does not have a NIC connected to home node switch network 222. Home nodes and processing nodes contain different software; however, a remote procedure call ("RPC") may be used to change the software configuration of a node. Therefore, if processing node 112 contains a second network interface card connected to home node switch network 222, it may reconfigure to operate as a home node by the RPC.

The Use of Overlapped Data to Decrease I/O Accesses in Clustered Computers

In one embodiment, the HC serves to eliminate the large number of data transfers common in shared memory clusters of the prior art; such a HC provides computing efficiencies in the 40% to 55% range, as compared to the 3% to 7% range of the prior art. With decreased coupling transfers, the HC efficiency is in the 80% to 95% range. In one example, an algorithm runs on two processing nodes of the HC, processing node 1 and processing node 2. A 5×6 element matrix is divided into two 5×3 element matrices for parallel processing by the two processing nodes. The data for the processing node 1 is shown in Table 14, and the data for processing node 2 is shown in Table 15.

TABLE 14

Example 5 × 3 Matrix

| 01 | 02 | 03 | 04 | 05 |
|----|----|----|----|----|
| 11 | 12 | 13 | 14 | 15 |
| 21 | 22 | 23 | 24 | 25 |

TABLE 15

Example 5 × 3 Matrix

| 06 | 07 | 08 | 09 | 10 |
|----|----|----|----|----|
| 16 | 17 | 18 | 19 | 20 |
| 26 | 27 | 28 | 29 | 30 |

In this example it is assumed that processing node 1 and processing node 2 need to share data items 5, 6, 15, 16, 25, and 26. The sequence for processing and transferring the shared data items is shown in Table 16.

TABLE 16

Sequence and Transfers in Example HC

| Processing Node 1 | Processing Node 2 |
|---|---|
| Process Data Item - 05 | Process Data Item - 06 |
| Transfer Data Item - 05 to Node 2 | Receive Data Item - 05 from Node 1 |
| Receive Data Item - 06 from Node 2 | Transfer Data Item - 06 to Node 1 |
| Process Data Item - 06 | Process Data Item - 05 |
| Process Data Item - 15 | Process Data Item - 16 |
| Transfer Data Item - 15 to Node 2 | Receive Data Item - 15 from Node 1 |
| Receive Data Item - 16 from Node 2 | Transfer Data Item - 16 to Node 1 |
| Process Data Item - 16 | Process Data Item - 16 |

TABLE 16-continued

Sequence and Transfers in Example HC

| Processing Node 1 | Processing Node 2 |
|---|---|
| Process Data Item - 25 | Process Data Item - 26 |
| Transfer Data Item - 25 to Node 2 | Receive Data Item - 25 from Node 1 |
| Receive Data Item - 26 from Node 2 | Transfer Data Item - 26 to Node 1 |
| Process Data Item - 26 | Process Data Item - 25 |

As can be seen in Table 16, the processing by the HC generates twelve data transfer/receives for only six boundary data processes. By changing the boundary data such that the shared data is overlapped (to provide the shared data on the required nodes when needed), the number of required data transfers decreases. This is important as processing speed is compromised with a large number of data transfers. Using the data from the above example, the 5×6 element matrix is divided into two 6×3 element matrices, as shown in Tables 17 and 18.

TABLE 17

Example 6 × 3 Matrix

|    |    |    |    |    | a  |
|----|----|----|----|----|----|
| 01 | 02 | 03 | 04 | 05 | 06 |
| 11 | 12 | 13 | 14 | 15 | 16 |
| 21 | 22 | 23 | 24 | 25 | 26 |

TABLE 18

Example 6 × 3 Matrix

| b  |    |    |    |    |    |
|----|----|----|----|----|----|
| 05 | 06 | 07 | 08 | 09 | 10 |
| 15 | 16 | 17 | 18 | 19 | 20 |
| 25 | 26 | 27 | 28 | 29 | 30 |

Column a of Table 17 and column b of Table 18 represent overlapped data. The overlapping area is a one-dimensional overlap area. The overlap area is treated as an overlap but without the current need to transfer data. The resulting processing sequence of processing node 1 and processing node 2 in the HC is shown in Table 19.

TABLE 19

Example Processing Sequence of the HC

| Processing Node 1 | Processing Node 2 |
|---|---|
| Process Data Item - 05 | Process Data Item - 06 |
| Process Data Item - 06 | Process Data Item - 05 |
| Process Data Item - 15 | Process Data Item - 16 |
| Process Data Item - 16 | Process Data Item - 16 |
| Process Data Item - 25 | Process Data Item - 26 |
| Process Data Item - 26 | Process Data Item - 25 |

By way of comparison, consider the number of parallel activities. Where there is an overlap area, processing node 1 and processing node 2 process data in parallel. Thus, six time units are consumed. Where the data is not overlapped, the processing is serialized whenever data is transferred between the processing nodes, thus twelve time units are consumed (assuming that both the data transfer and the data processing consume one time unit). This effect is exacerbated when multiple overlapping dimensions exist. For example, Table 20 shows a 9×15 element matrix divided between nine processing nodes, with overlap between the data items for each node.

TABLE 20

Example 9 × 15 Matrix Over Nine Processing Nodes, with Overlap

| 001 | 002 | 003 | 004 | 005 | 006 | 005 | 006 | 007 | 008 | 009 | 010 | 011 | 010 | 011 | 012 | 013 | 014 | 015 |
|---|---|---|---|---|---|---|---|---|---|---|---|---|---|---|---|---|---|---|
| 016 | 017 | 018 | 019 | 020 | 021 | 020 | 021 | 022 | 023 | 024 | 025 | 026 | 025 | 026 | 027 | 028 | 029 | 030 |
| 031 | 032 | 033 | 034 | 035 | 036 | 035 | 036 | 037 | 038 | 039 | 040 | 041 | 040 | 041 | 042 | 043 | 044 | 045 |
| 046 | 047 | 048 | 049 | 050 |  |  | 051 | 052 | 053 | 054 | 055 |  |  | 056 | 057 | 058 | 059 | 060 |
| 031 | 032 | 033 | 034 | 035 |  |  | 036 | 037 | 038 | 039 | 040 |  |  | 041 | 042 | 043 | 044 | 045 |
| 046 | 047 | 048 | 049 | 050 | 051 | 050 | 051 | 052 | 053 | 054 | 055 | 056 | 055 | 056 | 057 | 058 | 059 | 060 |
| 061 | 062 | 063 | 064 | 065 | 066 | 065 | 066 | 067 | 068 | 069 | 070 | 071 | 070 | 071 | 072 | 073 | 074 | 075 |
| 076 | 077 | 078 | 079 | 080 | 081 | 080 | 081 | 082 | 083 | 084 | 085 | 086 | 085 | 086 | 087 | 088 | 089 | 090 |
| 091 | 092 | 093 | 094 | 095 |  |  | 096 | 097 | 098 | 099 | 100 |  |  | 101 | 102 | 103 | 104 | 105 |
| 076 | 077 | 078 | 079 | 080 |  |  | 081 | 082 | 083 | 084 | 085 |  |  | 086 | 087 | 088 | 089 | 090 |
| 091 | 092 | 093 | 094 | 095 | 096 | 095 | 096 | 097 | 098 | 099 | 100 | 101 | 100 | 101 | 102 | 103 | 104 | 105 |
| 106 | 107 | 108 | 109 | 110 | 111 | 110 | 111 | 112 | 113 | 114 | 115 | 116 | 115 | 116 | 117 | 118 | 119 | 120 |
| 121 | 122 | 123 | 124 | 125 | 126 | 125 | 126 | 127 | 128 | 129 | 130 | 131 | 130 | 131 | 132 | 133 | 134 | 135 |

As can be seen with the underlined data entries in Table 20, the processing node with that dataset has all sides of a 2-dimensional matrix containing an overlap area (thus representing a 2-dimensional overlap.) This may be extended from 1- to N-dimensions analogously. The overlap methodology decreases the overhead of cluster transfers and allows for efficient use of separate processors in problem solving, as compared to continuously sharing data between nodes.

Processing Node Dropout Detection and Replacement

As previously discussed, the HC may be configured to detect non-functioning processing nodes and to reassign associated work for the non-functioning processing node to another processing node without human intervention. The clusters of the prior art have enormous difficulty in both detecting and ameliorating failed nodes; this difficulty is a function of how computer nodes are assigned to a problem. Typically, in the prior art (e.g., as shown in FIG. 1-FIG. 4), a remote host or some other computer external to the cluster compiles the application code that is to run on the cluster. A compile time parallel processing communication tool is used, such as MPI or PVM, known in the art, whereby the communication relationships between processing nodes is established at compile time. When the processing node relationships are formed at compile time, it is difficult to establish run time re-allocation of a parallel problem to other functioning processing nodes. If in the course of processing a job a node loses communication with other nodes in the cluster, the non-communication condition is not corrected without either specialized hardware and/or human intervention.

In one embodiment of the HC, on the other hand, node communications are determined at run time rather than at compile time. Further, the geometric nature of the HC fixes the run-time node communication relationships for the duration of the job. This makes it possible to both detect processing node communication failures and to reallocate problem sets to other processing nodes, thereby correcting for node failures at run time.

Figure 20:
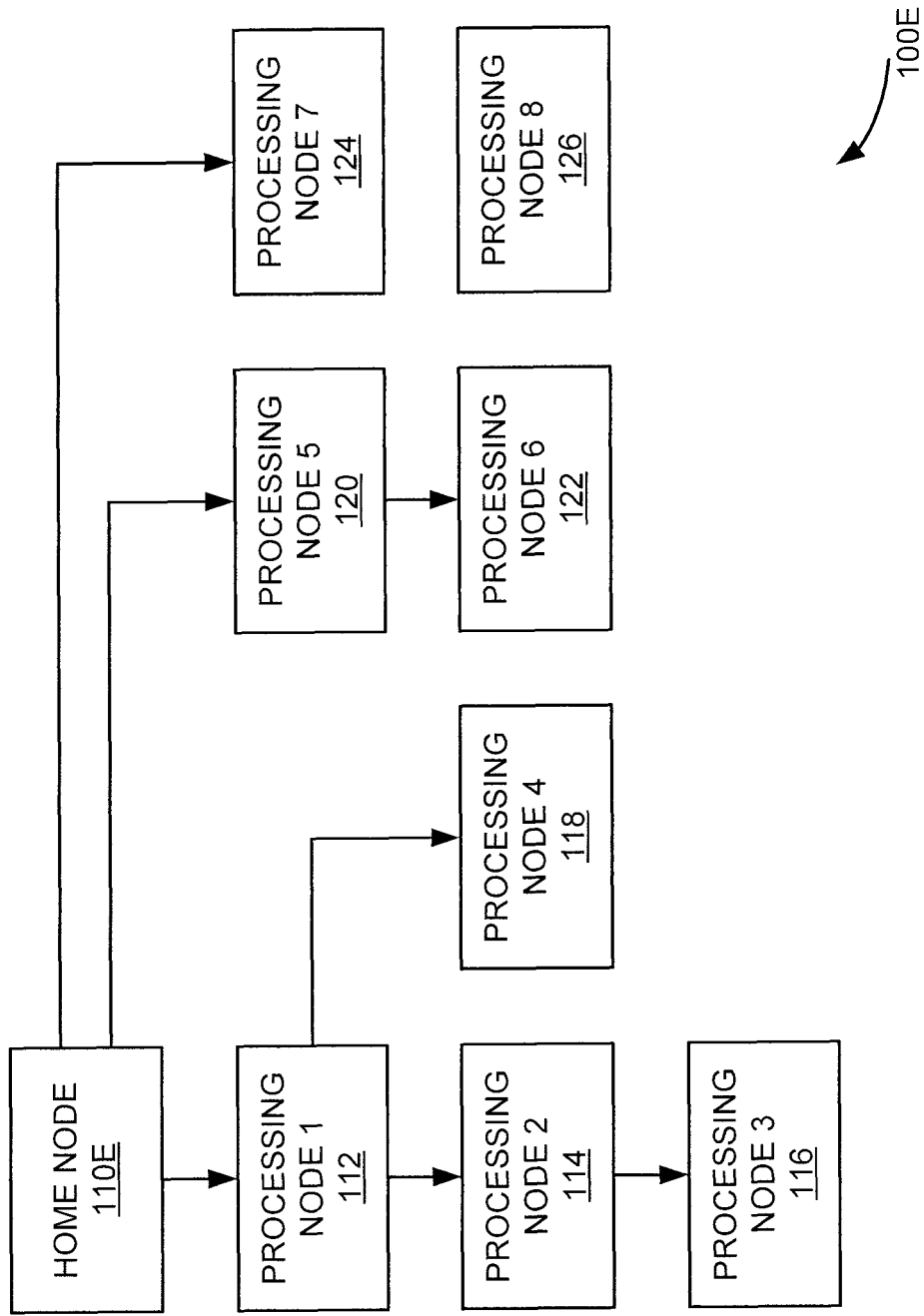
FIG. 20 shows one Howard Cascade with seven processing nodes and one unallocated processing node.
Figure 21:
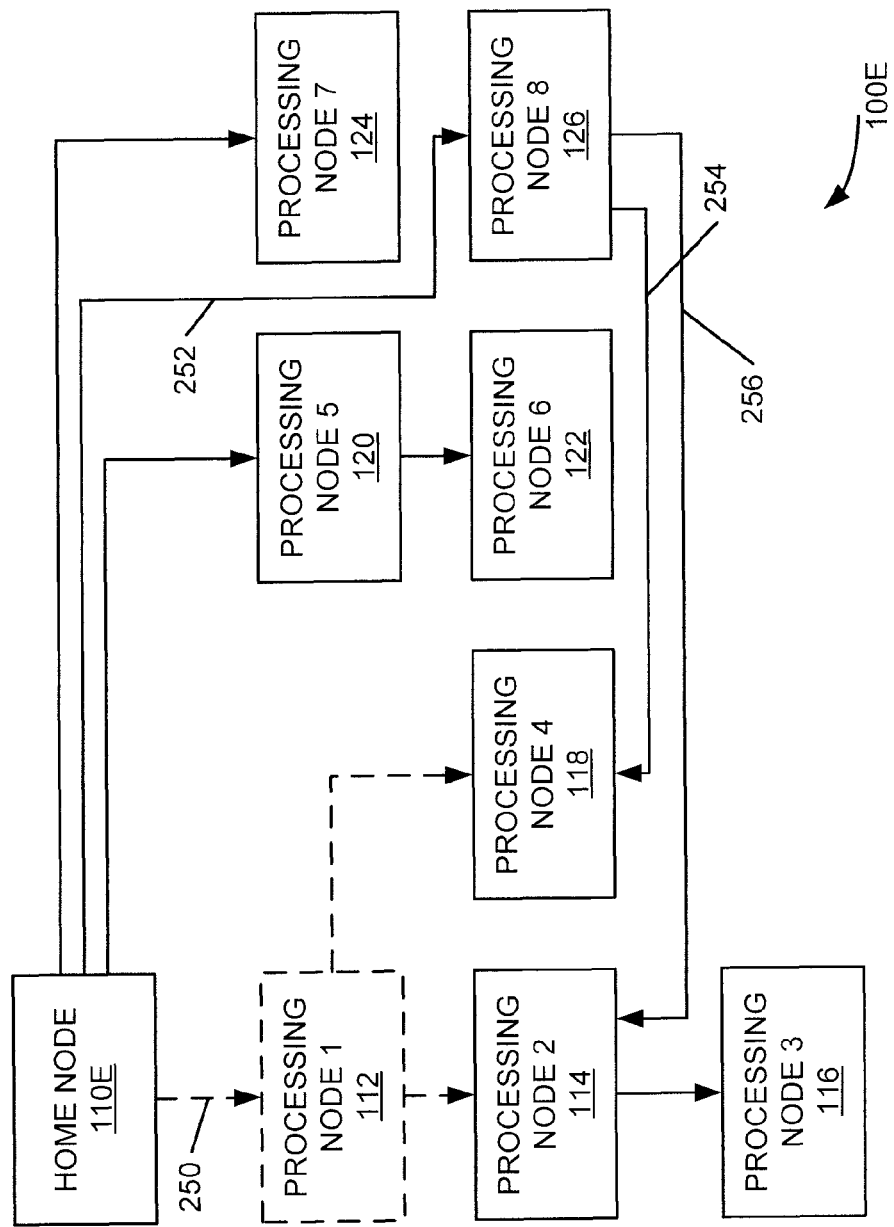
FIG. 21 shows the Howard Cascade of FIG. 20 reallocated upon failure of one of the seven processing nodes.

FIG. 20 illustrates one HC 100E with seven processing nodes 112, 114, 116, 118, 120, 122 and 124 configured in the cascade, and an eighth unallocated processing node 126. Home node 110E communicates with processing nodes 112, 114, 116, 118, 120, 122 and 124 during normal processing. If however home node 110E fails to contact processing node 112, for example after an appropriate number of retries, it places the address of processing node 112 onto the "not communicating" list and immediately allocates another processing node to take its place in HC 100E. FIG. 21 illustrates the connectivity of cluster HC 100E after reconfiguration. In this example, home node 110E detects the failure of communication path 250. Home node 110E then communicates with processing node 126 via data path 252, to inform processing node 126 of its position in HC 100E. Processing node 126 then establishes communication with its down level nodes (processing node 114 and processing node 118) via communication paths 254 and 256, respectively. Once completed, HC 100E is repaired and processing resumes using processing node 126 in place of processing node 112.

Figure 22:
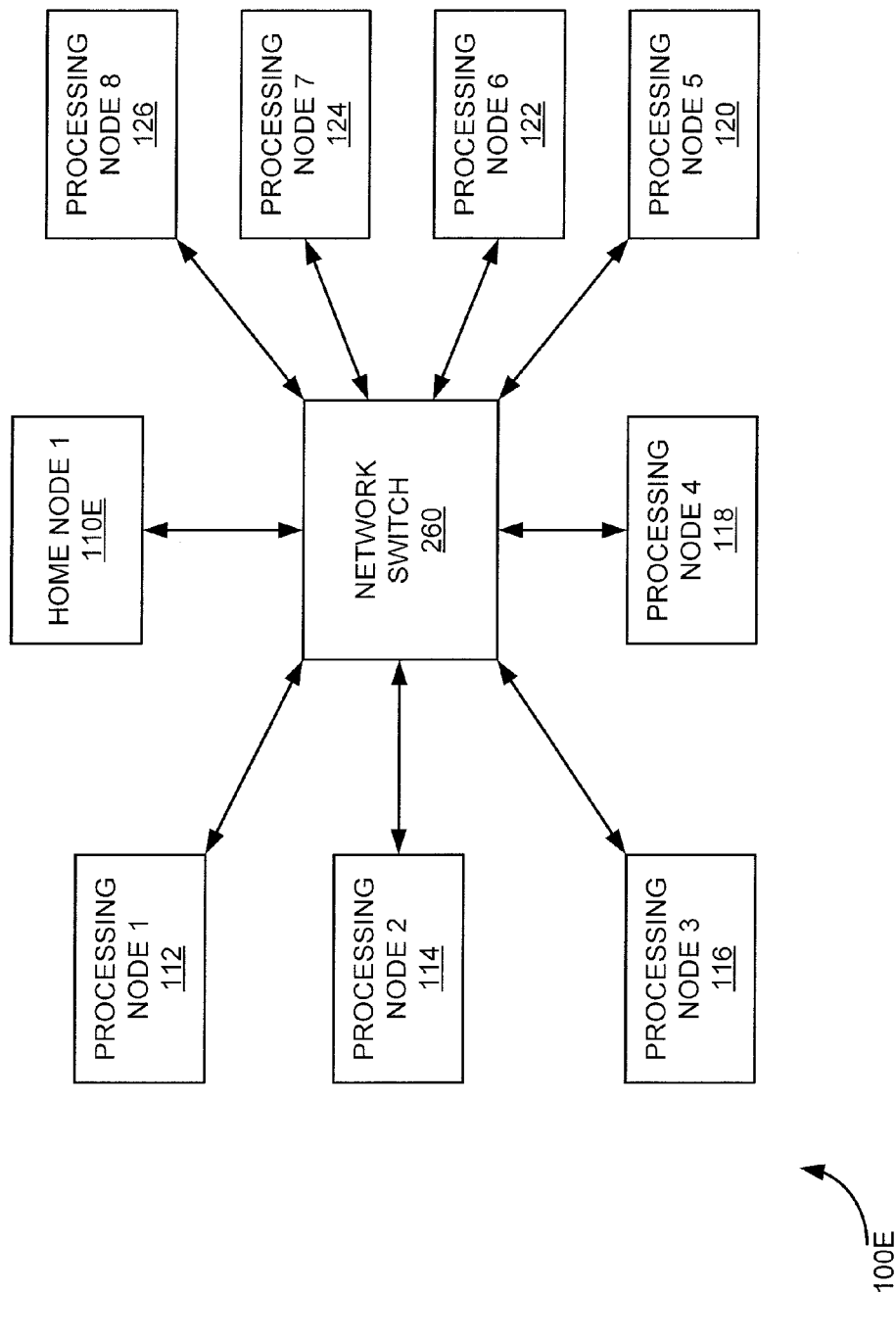
FIG. 22 shows further detail of the Howard Cascade of FIG. 20.

Non-communication is detectable because the communication protocol (e.g., TCP/IP) returns an error code when one networked node attempts to communicate with another node on the same network, but cannot. By way of example, FIG. 22 shows physical connections between the nodes of FIG. 20 and a network switch 260. If processing node 112 is no longer communicating with network switch 260, home node 110E selects the next available node, in this example node 126, as replacement. The physical connection topology of HC 100E allows any node to be positioned anywhere in the cascade without problem or overhead.

Figure 23:
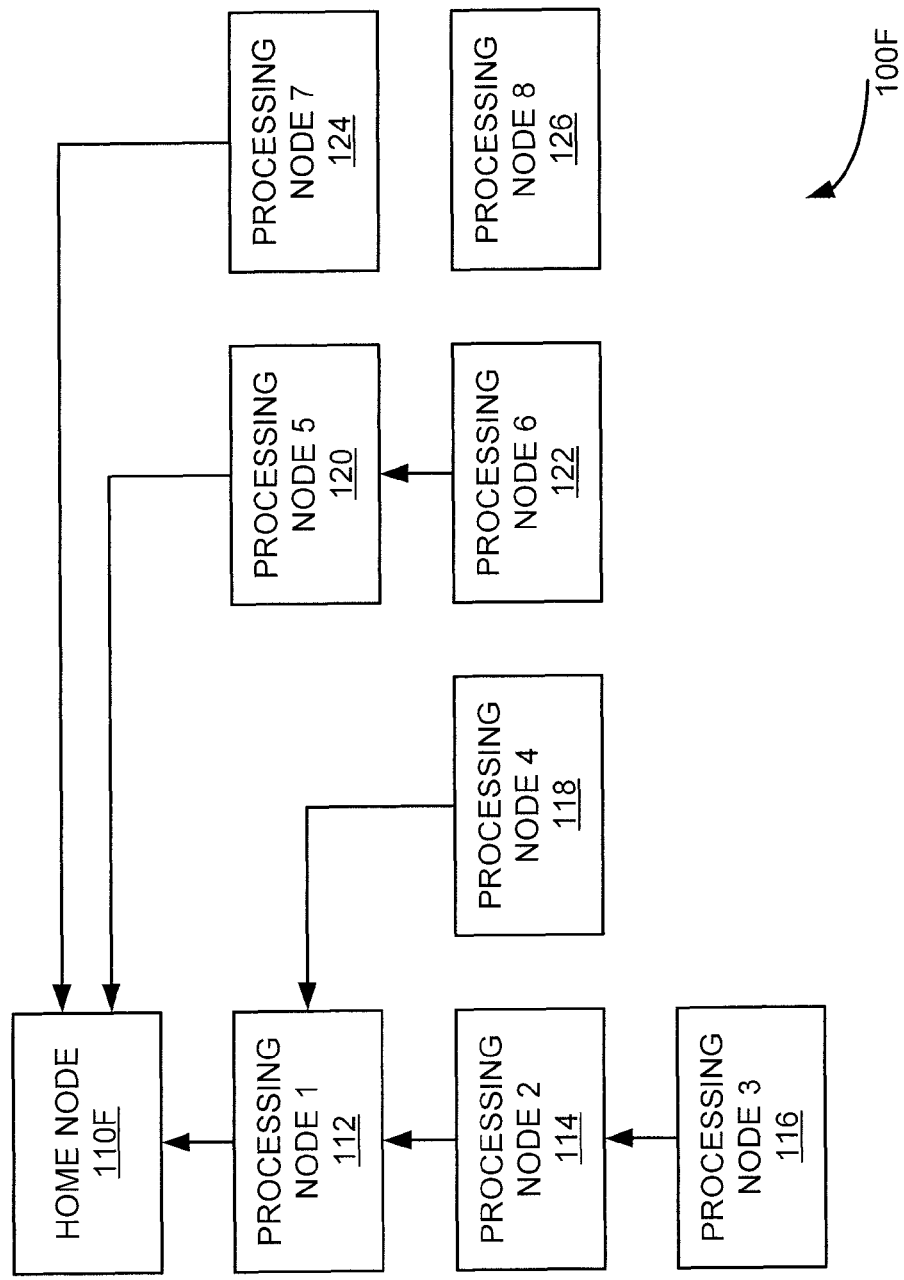
FIG. 23 shows one Howard Cascade during agglomeration.
Figure 24:
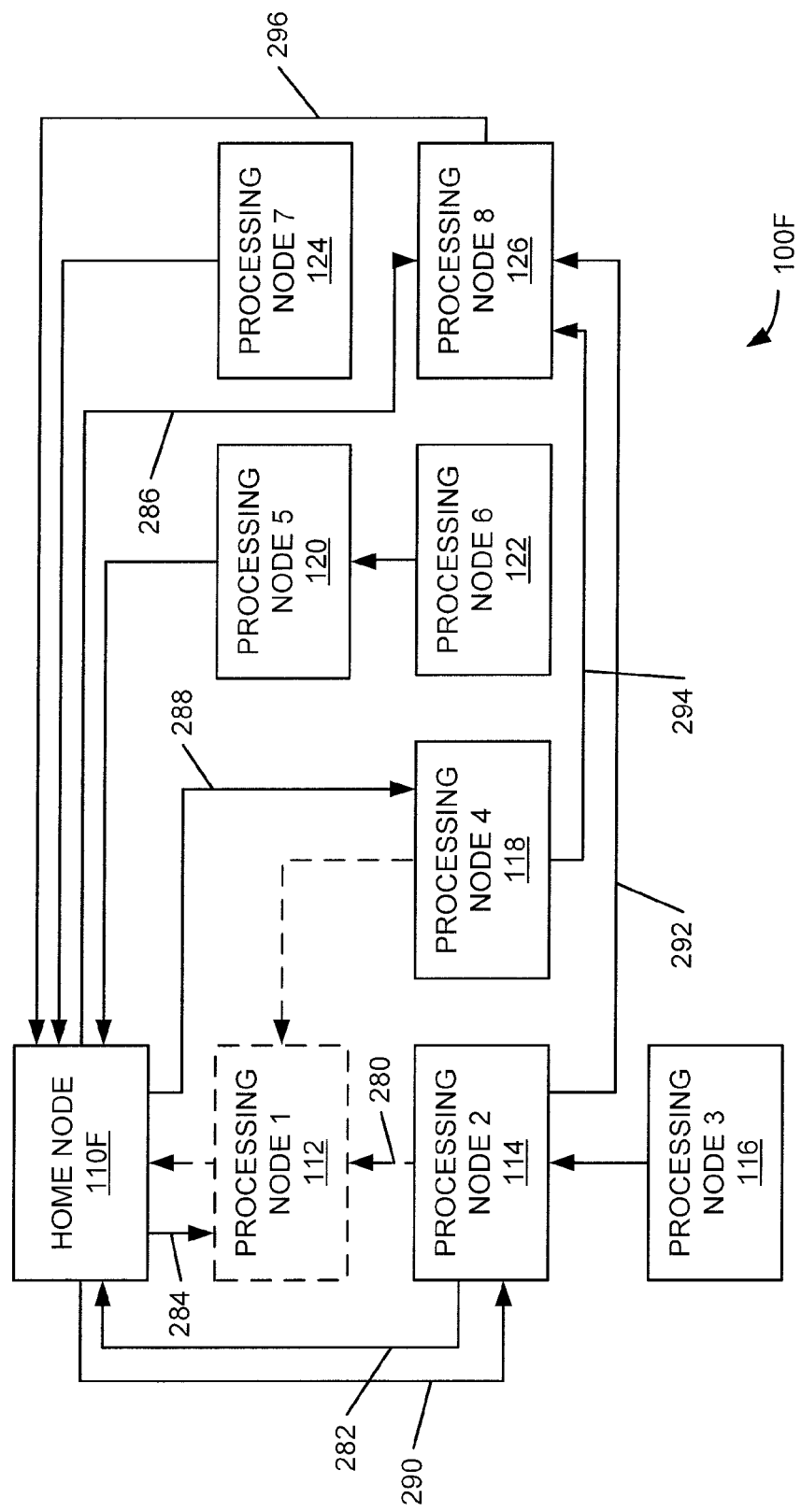
FIG. 24 shows the Howard Cascade of FIG. 23 reallocated to accommodate a failed processing node during agglomeration.

In another embodiment, FIG. 23 illustrates a HC 100F in a state where parallel processing through processing nodes 112, 114, 116, 118, 120, 122 and 124 has completed and HC 100F has configured to return agglomerated results to home node 110F. FIG. 24 illustrates an autonomous error recovery process resulting from the failure of processing node 112. When processing node 114 tries to communicate with processing node 112, via communication path 280, it receives an error. Processing node 114 then sends a message directly to home node 110F to inform home node 110F that processing node 112 is not communicating, via communication path 282. Home node 110F uses communication path 284 to verify that processing node 110 is no longer communicating. Home node 110F then allocates the next available processing node, in this case processing node 126, using communication path 286. All information required to allow processing node 126 to take the place of processing node 112 is transmitted to processing node 126. Home node 110F then informs processing node 114 and processing node 118 that a new up-level node (i.e., node 126) exists via communication paths 288 and 290, respectively. Processing node 114 and processing node 118 then send respective results to processing node 126 via communication paths 292 and 294, respectively. Processing node 126 then sends its agglomerated results upstream to home node 110F, via communication path 296.

Figure 25:
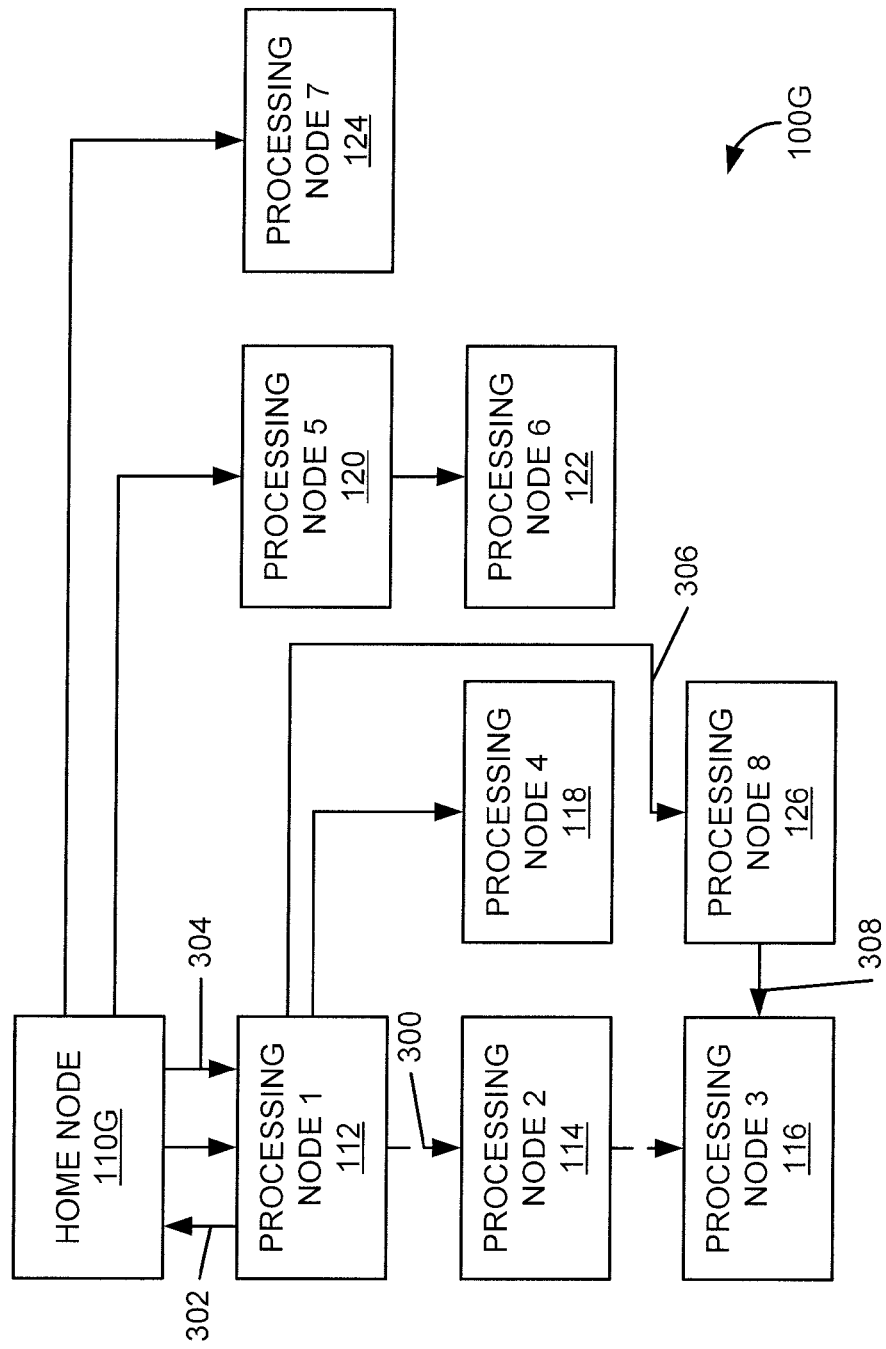
FIG. 25 shows one Howard Cascade during distribution of an algorithm processing request.

In another example, a HC 100G is configured similarly to HC 100E of FIG. 20. FIG. 25 illustrates the error recovery sequence that occurs when processing node 112 attempts to cascade the algorithm processing request to processing node 114 and communication path 300 fails. Processing node 112 informs home node 110G of the failure via communication path 302. Home node 110G then selects the next available processing node, processing node 126 in this example, and informs processing node 112 of the identity of the new node, via communication path 304. Processing node 112 then informs processing node 126 of its new position in HC 100G via communication path 306, to communicate the algorithm processing request originally destined for processing node 114. Processing node 126 then continues the cascade to processing node 116 via communication path 308.

Figure 26:
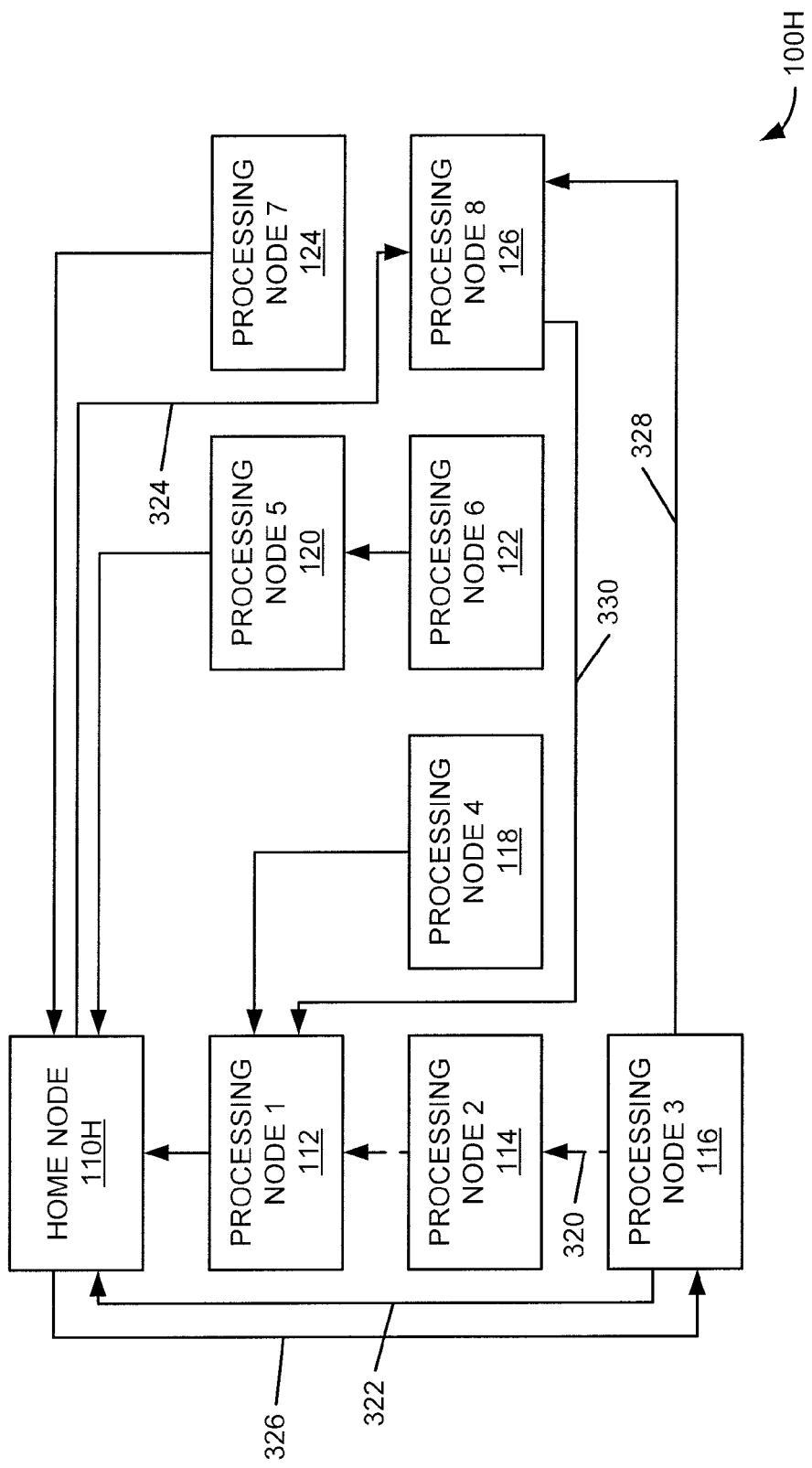
FIG. 26 shows the Howard Cascade of FIG. 25 reallocated to accommodate a failed processing node during distribution of the algorithm processing request.

In another error recovery example, a HC 100H, FIG. 26, recovers during agglomeration of results. FIG. 26 shows the error recovery sequence of HC 100H that occurs when communication path 320 between processing node 116 and processing node 114 fails. Processing node 116 informs home node 110H of the failure via communication path 322. Home node 110H selects the next available processing node, in this example processing node 126, via communication path 324. Home node 110H then informs processing node 116 of the identity of the new node via communication path 326. Processing node 116 then sends its results to processing node 126 via communication path 328. Processing node 126 then sends its agglomerated results to processing node 112 via communication path 330.

Figure 27:
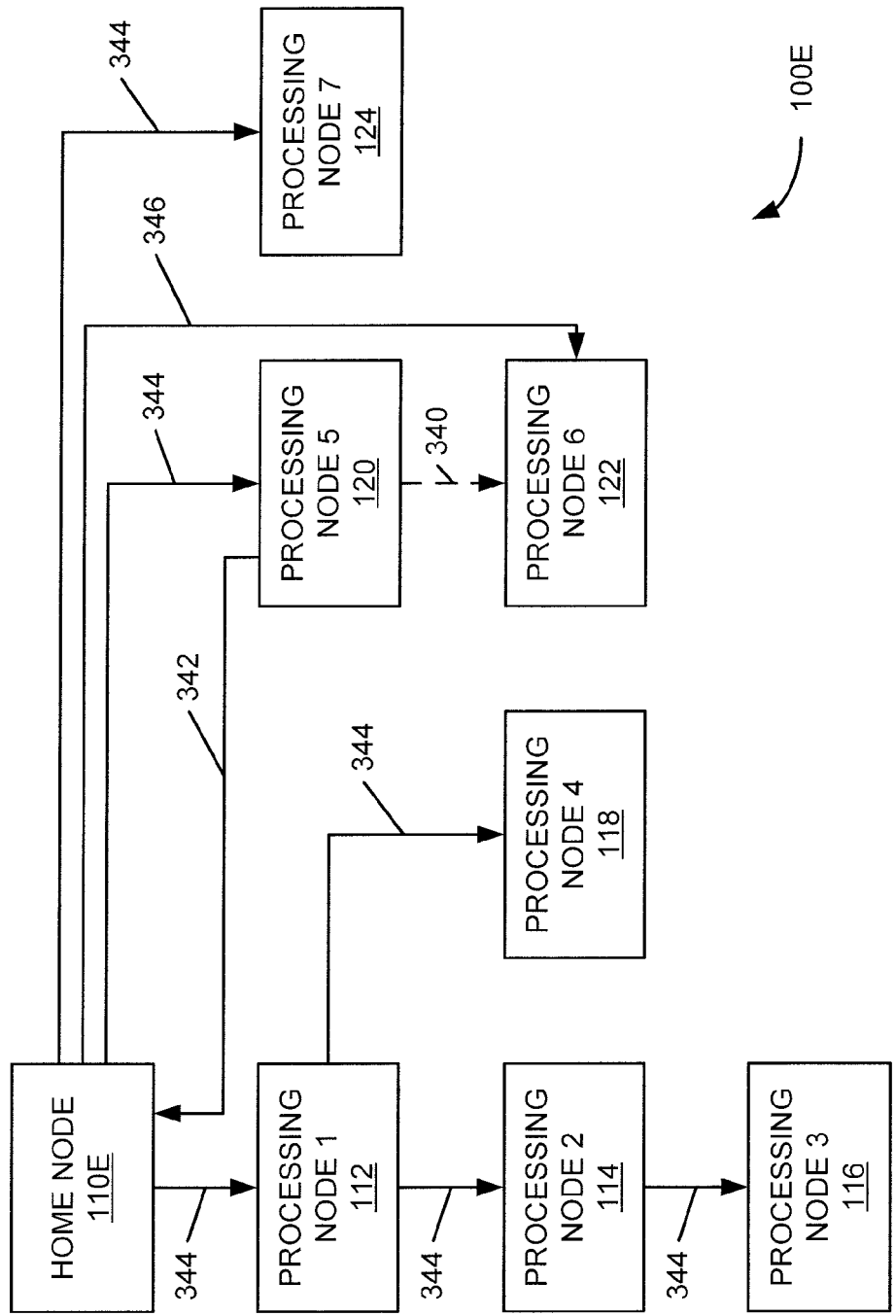
FIG. 27 shows one Howard Cascade configured to recast an algorithm processing request to acquire additional processing nodes at lower cascade levels.
Figure 28:
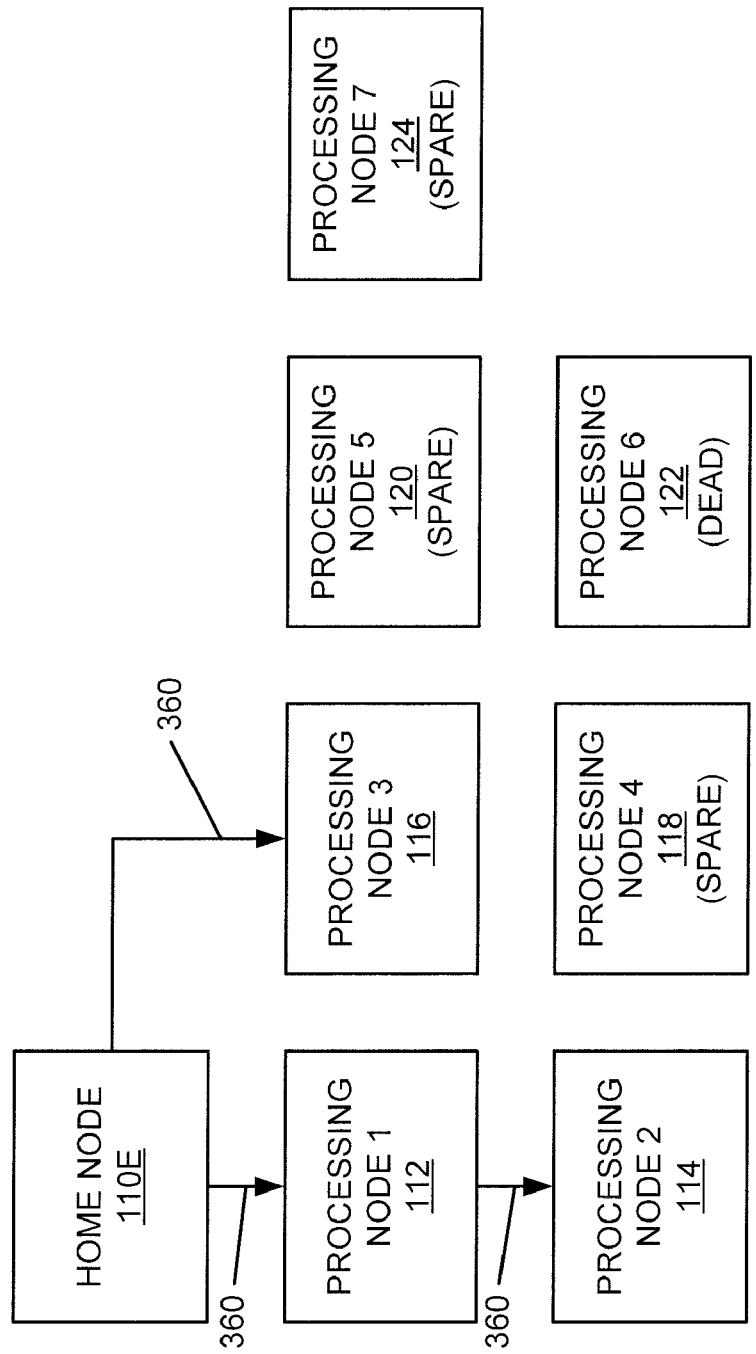
FIG. 28 shows the Howard Cascade of FIG. 27 recasting the algorithm processing request.

In the event there are no spare processing nodes, the HC may suspend the current processing cascades and recast the algorithm processing request at the next lower cascade level, where additional, free processing nodes may be used to restart processing. In this example, a HC 100E is configured as in FIG. 20, except that it is assumed that node 126 is unavailable. FIG. 27 illustrates the error recovery sequence that occurs when processing node 120 fails to communicate with processing node 122 via communication path 340. Processing node 120 informs home node 110E of the failure via communication path 342. Home node 110E determines that there are no spare processing nodes, and sends a command, via communication path 344, to stop processing of the current algorithm processing request on processing nodes 112, 120, 124. Processing node 112 stops algorithm processing on processing node 114, which in turn stops algorithm processing on processing node 116. Home node 110E adds processing node 122 to the failed list. FIG. 28 illustrates home node 110E retransmitting the current algorithm processing request to a smaller group of nodes via communication paths 360, leaving three unallocated processing nodes, processing node 118, processing node 120 and processing node 124. The algorithm processing request is thus completed among replacement nodes without human intervention and may be used at any inner-cluster location.

Figure 29:
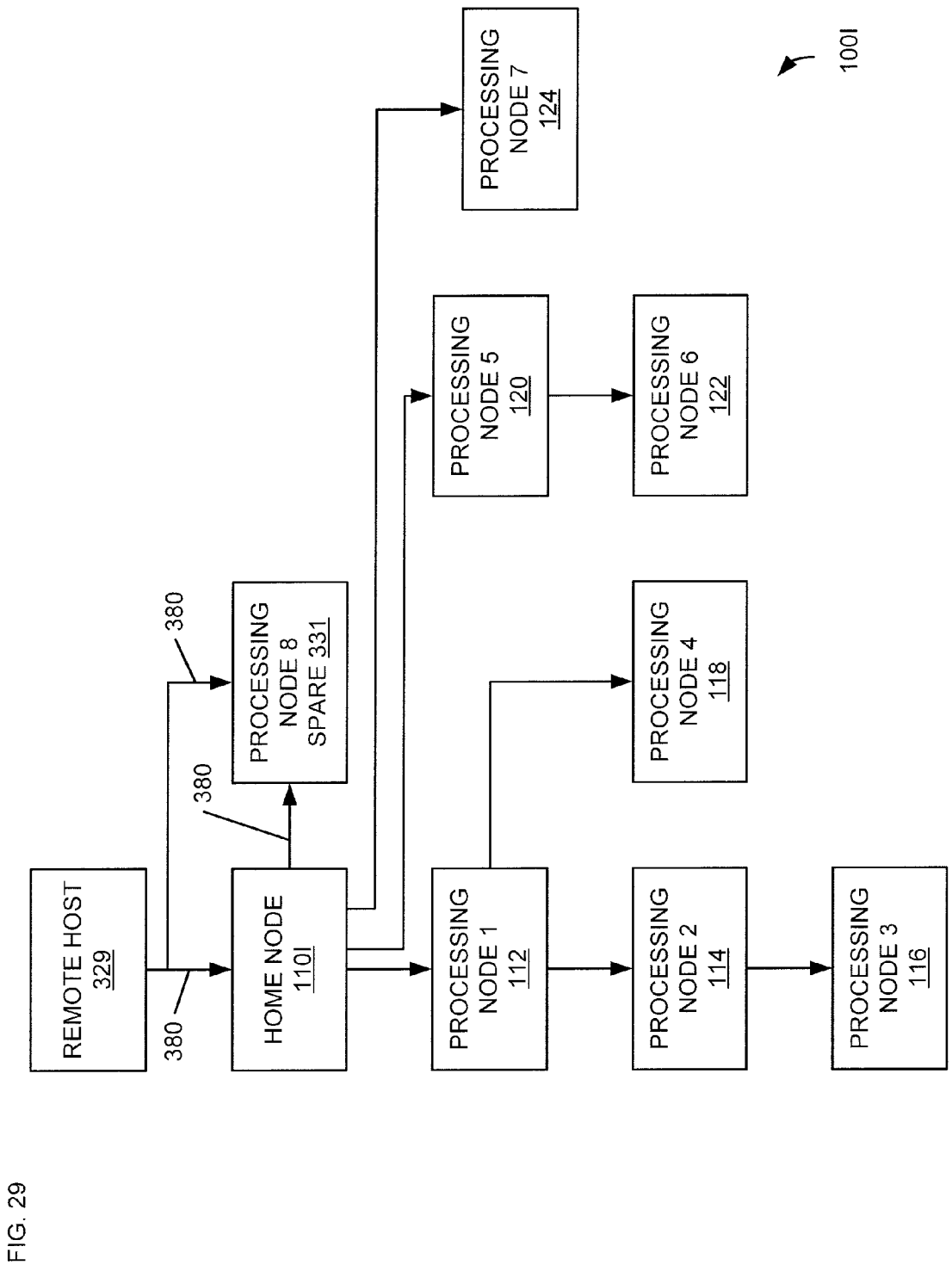
FIG. 29 shows one Howard Cascade with a spare home node.
Figure 30:
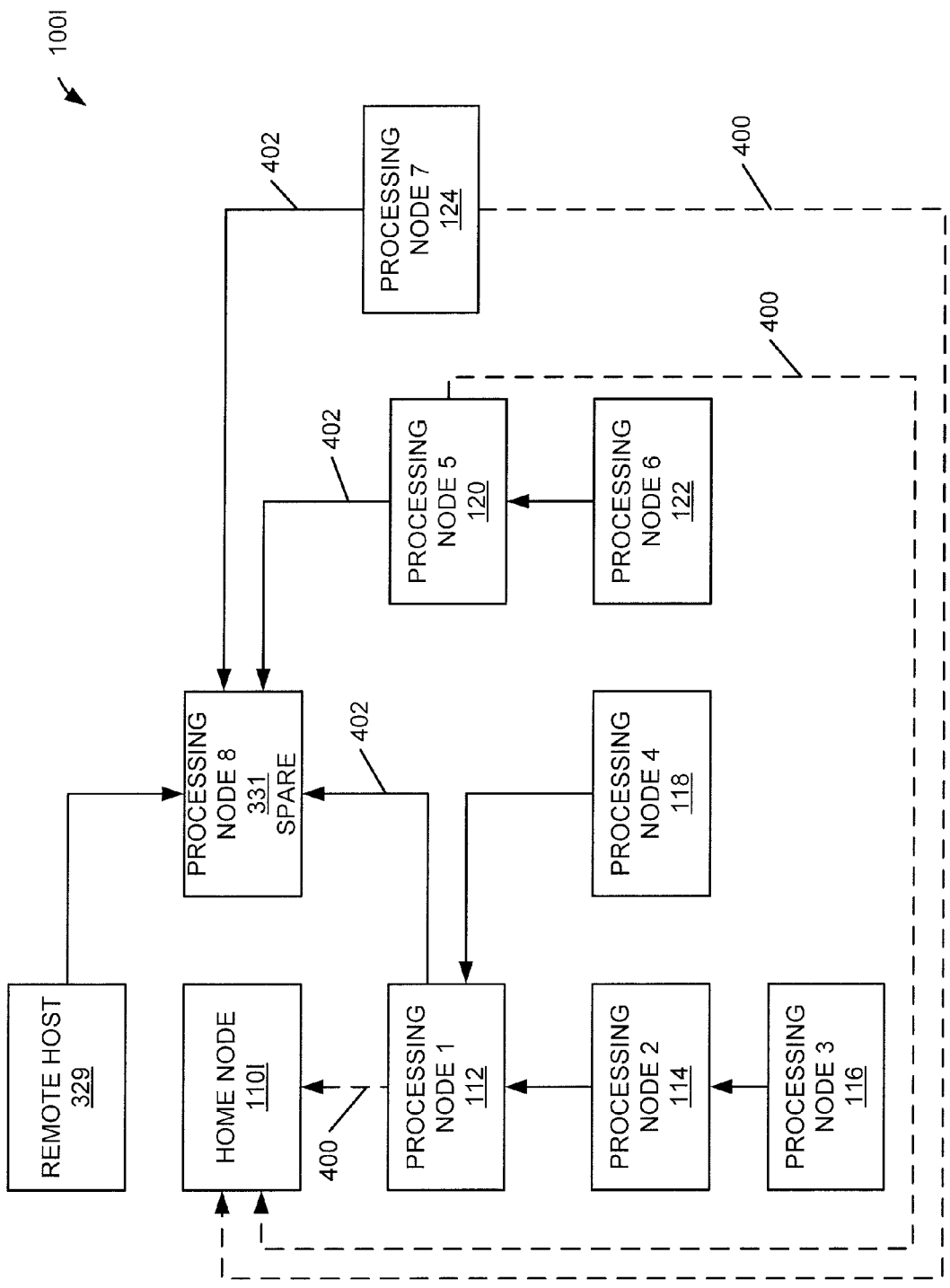
FIG. 30 shows the Howard Cascade of FIG. 29 reconfigured after a failed home node.

In one embodiment, each node in a HC may have the same computational power. Since the connection between a remote host and the home node does not stay open during job processing, it is possible to switch out and replace a failed primary home node without the need to inform the remote host. FIG. 29 shows information received from a remote host 329 being shared with spare nodes (node 331) in a HC 100I via additional communication paths 380. FIG. 30 further illustrates that if primary home node 110I fails, (e.g., communication path 400 fails), then the next available spare node is used to replace failed home node 110I; in this example, the spare processing node 331 is reconfigured by a RPC to become the new home node.

HC 100I need not utilize a client-server model, known to those skilled in the art, and thus the connection to the remote host may be rebuilt.

Hidden Function API for Blind Function Calling

Figure 33:
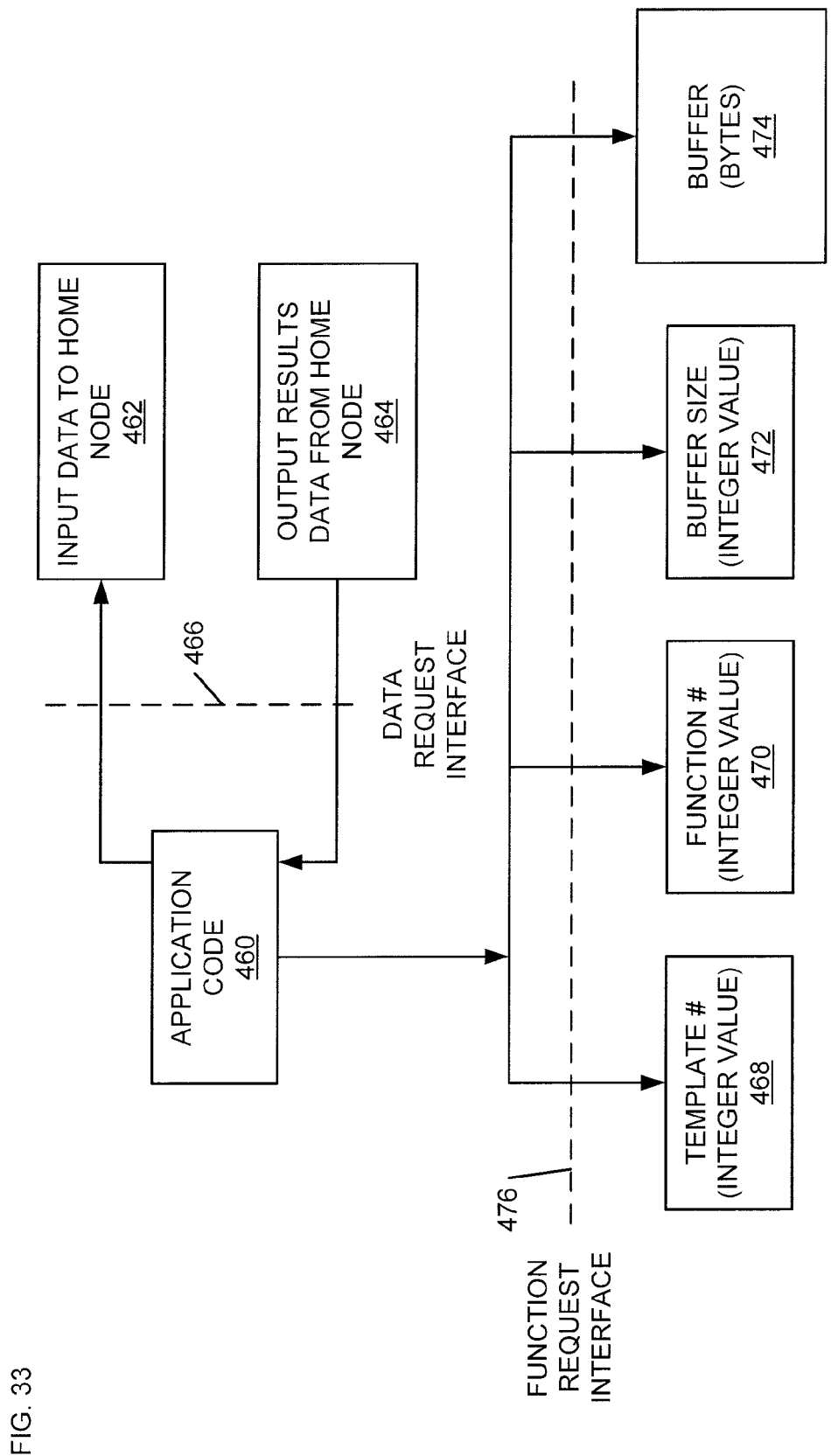
FIG. 33 shows one interface between proprietary algorithms and one Howard Cascade Architecture System.
Figure 34:
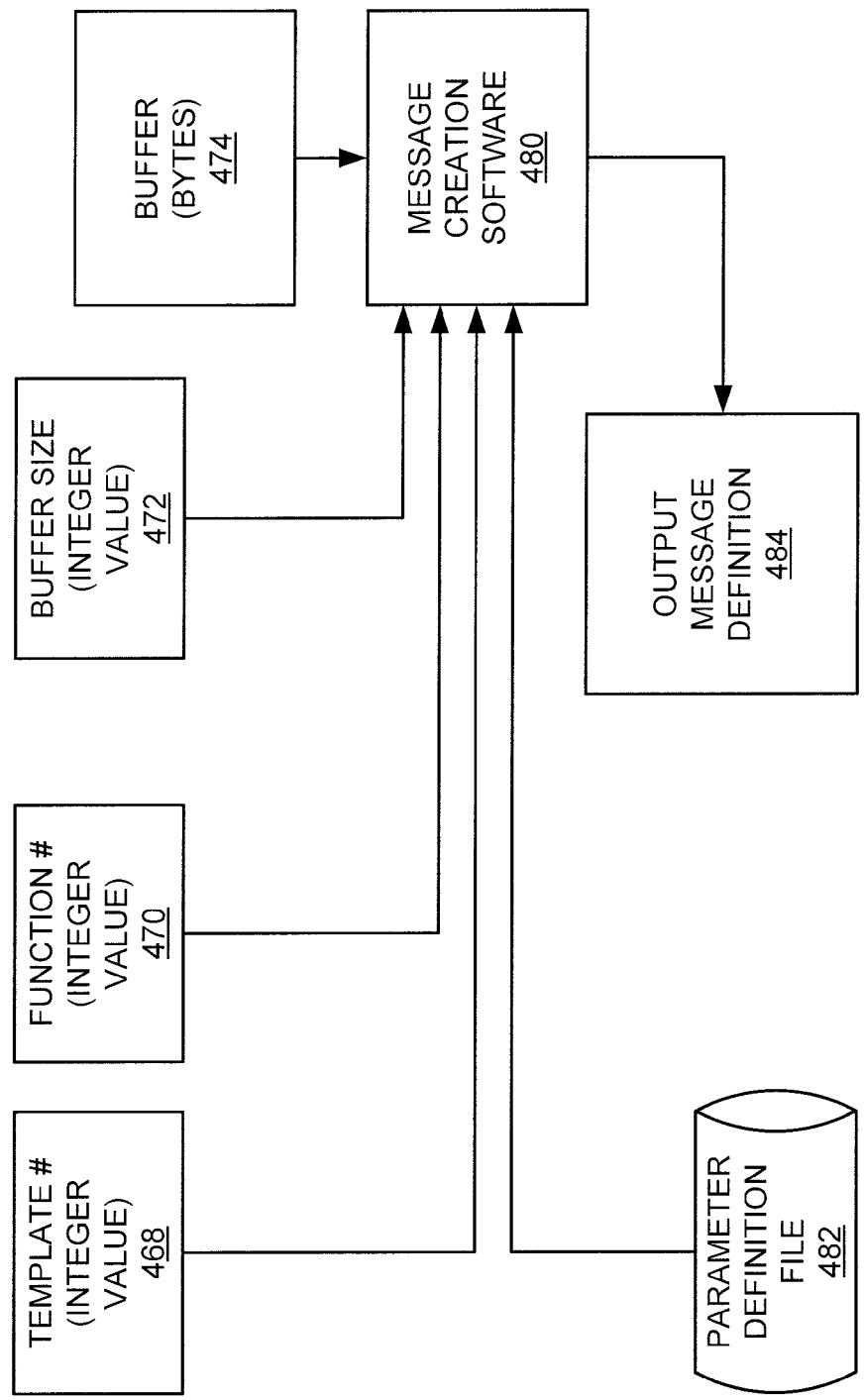
FIG. 34 illustrates further definition associated with the interface of FIG. 33.

A HCAS may also be constructed with interface methodology that avoids third-party access to proprietary algorithms, overcoming one problem of the prior art. FIG. 33 illustrates two interfaces between the application code 460 and a HCAS. The first interface is function request interface 476; the second interface is the data request interface 466. Through the function request interface 476, application code 460 may invoke a function in computationally intensive algorithm library 99, FIG. 5, with a parameter list without having a complex application program interface ("API"). Prior to calling message creation software using the API, a template number 468, a function number 470, a data definition of buffer size 472, and a buffer 474 are created. Template number 468 defines the data template for the function (in computationally intensive algorithm library 99) selected by function number 470. This information is stored in a parameter definition file 482, FIG. 34. Parameter definition file 482 is read into message creation software 480 at run time as part of the initialization sequence of application code 460. The message creation software is a static dynamic link library ("DLL") called by application code 460. When application code 460 uses a function (of computationally intensive algorithm library 99), the requirement is triggered and template number 468 and function number 470 are sent to the message creation software along with buffer size 472 and buffer 474, containing function parameters. Template number 468 and function number 470 are used to find the definition of the parameters, contained in buffer 474, and of the output data structure definition of application code 460. Message creation software 480 uses all of this data to create an output message definition 484 that is sent to the home node of the HCAS. The home node uses the template number 468 and parameter data contained in buffer 474, which defines the data types, number of dimensions, and the size of each dimension, to determine the number of processing nodes to use.

Figure 35:
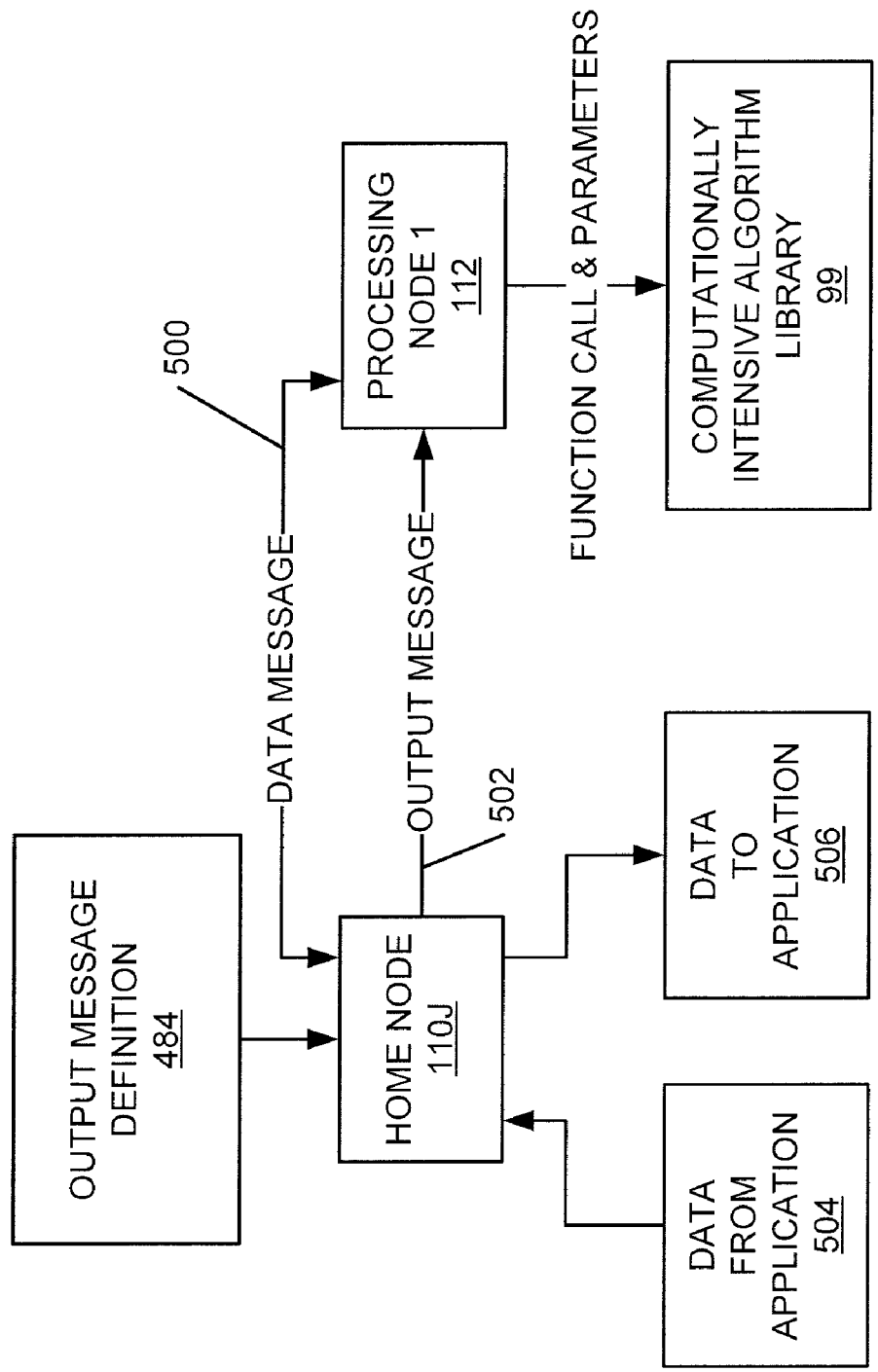
FIG. 35 shows one Howard Cascade utilizing the interfaces of FIG. 33 and FIG. 34.

More particularly, FIG. 35 shows one home node 110J initiating distribution of the algorithm processing request to processing node 112 via output message 502. Only one processing node 112 is shown for purposes of illustration. Processing node 112 then waits for data as required by the invoked function. Home node 110J then requests and receives the data from application code 460 via the data request interface 466. Home node 110J is shown receiving data from application 504 in FIG. 35. Home node 110J then broadcasts the data to processing node 112 using a data broadcast message 500. Control software 94, FIG. 5, within processing node 112, then makes a function call to the selected function within the computationally intensive algorithm library 99 using parameters translated from the output message definition 484 contained in output message 502. The invoked function processes the data, returning the results. The agglomeration process then returns the results to home node 110, which sends the results back to application code 460 as data to application 506. Home node 110J then sends the results back to application code 460.

Some parameter types passed to the message creation software 480 by application code 460 may contain special values. One such value is a storage type for pointers to specific data areas used for input parameters to the requested function, where the pointer value can only be resolved within the processing node control software at run time. This allows flexibility and efficiency in parameter passing.

In summary, the function request interface 476 and data request interface 466 of FIG. 33 allow functions to be "parallelized" at the data level without application code 460 requiring access to sensitive functions. It also provides for a simple yet highly extensible API to application programs.

Complex Algorithms on an HCAS

A complex algorithm is defined as an algorithm that contains one or more branching statements. A branching statement is a statement that compares one or more variables and constants, and then selects an execution path based upon the comparison. For example:

```
IF (variable_a > 10) then
{
    Execution-Path-A
}
else
{
    Execution-Path-B
}
```

In the above branching statement one of two execution paths is selected based upon whether or not the contents of variable a is greater than 10. The execution paths may contain further branching statements and computational algorithms.

Computational algorithms can always be represented as one or more subroutines or library function calls. In the HCAS, code that can be represented as either a subroutine or a library function can be installed into algorithm library 99 on an HCAS. Thus the computational algorithm parts of a branching statement can be processed on a HCAS.

Each branching statement represents a serial activity. All parallel processes executing a complex algorithm make the same decision at the same point in their processing. There are primarily two ways to accomplish this. A first method is for each process executing the complex algorithm (e.g., a processing node in an HCAS) to send messages to every other process executing the complex algorithm, such that each process has sufficient information to make the same decision. This first method maximizes the amount of cross-communication required and thus is unacceptable as a solution. A second method uses a central location to evaluate the branching statement. For example, this central location may be on the remote host or on a home node in an HCAS. The conditional variable data is the only information that has to be transmitted from each process executing the complex algorithm to the central location, thus keeping data transfers to a minimum.

A branching statement may be represented by a conditional function with the following attributes:

```
FUNCTION_NAME ((Variable|constant)₁ <comparison attribute>
                (Variable|constant)₂)
{true path}
else
{false path}
    where:
        FUNCTION_NAME = the condition type, for example:
                        IF, While, Until, etc.
        Variable|constant = either the name of a variable or a constant
value
        Comparison attribute = a logical or mathematical statement, for
example:
                        AND, OR, <, >, =, NOR, NAND, etc
                        Which compares (Variable|constant)₁ with
                        (Variable|constant)₂
```

Note:
If the comparison is true then the true path is taken otherwise the false path is taken.

Thus, each branching statement in a complex algorithm becomes a function call. The only difference between a conditional function and all other HCAS functions is that the conditional data is sent to a central location for evaluation at each branching statement in the complex algorithm.

Figure 62:
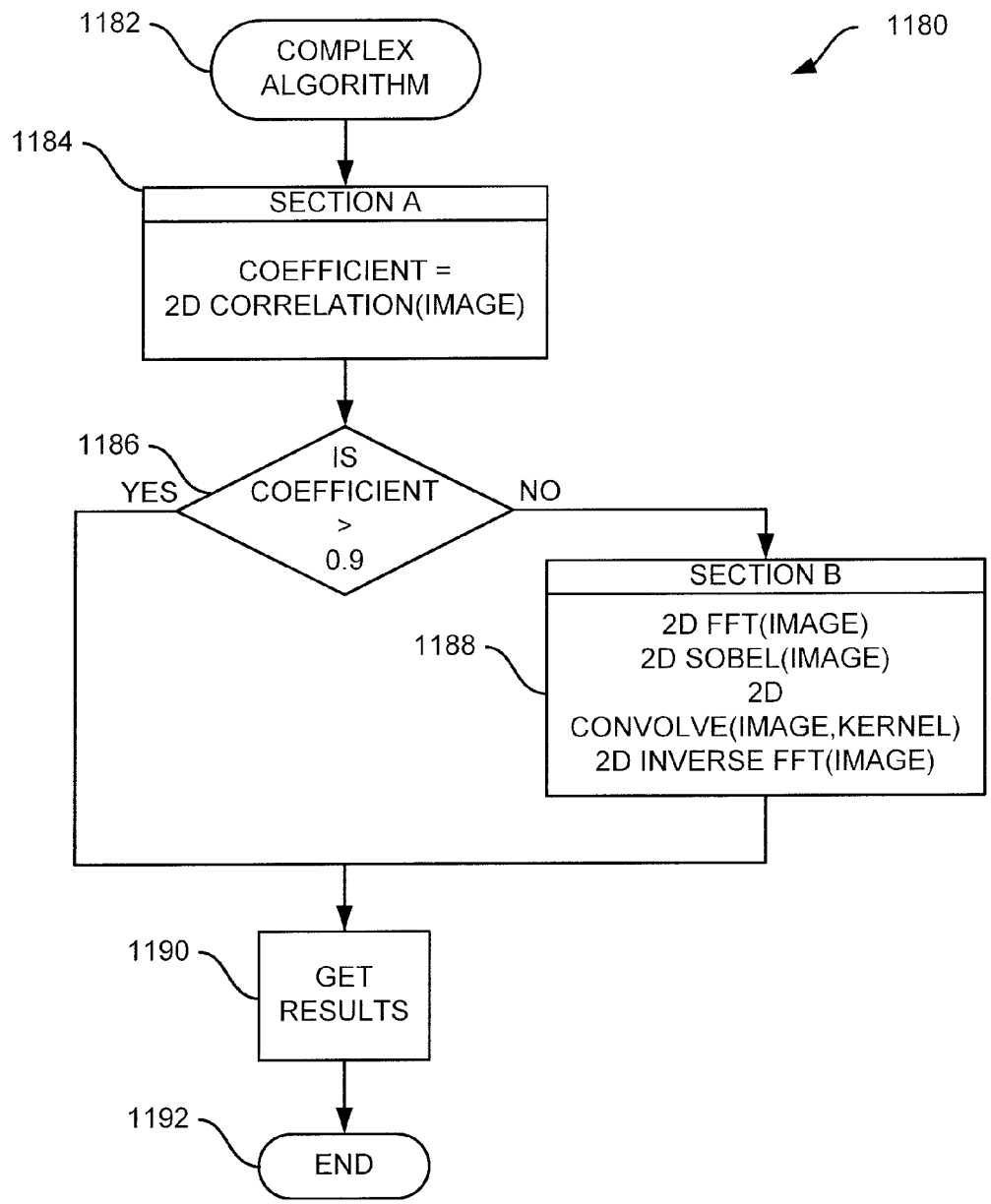
FIG. 62 illustrates one example process of a complex algorithm.

FIG. 62 is a flow chart illustrating one process 1180 as an example of a complex algorithm containing a branching statement. Process 1180 starts at step 1182, and continues with step 1184. Step 1184 represents a section of code, section A, that computes a coefficient using a 2d correlation function on image data. Step 1186 represents a branching statement that uses the coefficient computed in step 1184. If the coefficient is greater than 0.9, process 1180 continues with step 1190; otherwise process 1180 continues at step 1188. Step 1188 represents a second section of code, section B, that performs additional image processing in this example. After computing section B, process 1180 continues with step 1190. Step 1190 gets the results of the complex algorithm computation and process 1180 terminates at step 1192. As can be seen in this example, the complex algorithm may be broken down into computable sections, section A 1184 and section B 1188, and a conditional function, as in step 1186.

Figure 63:
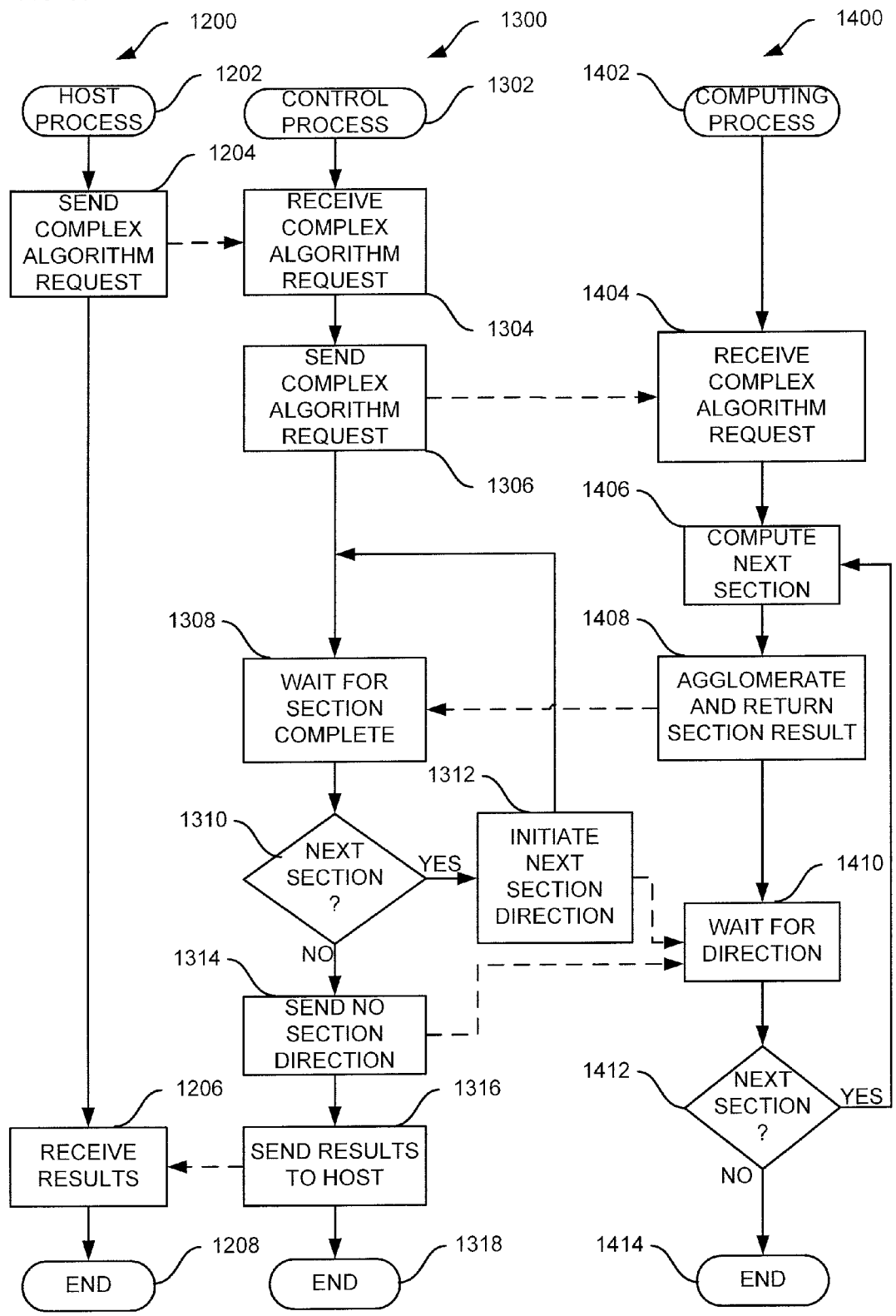
FIG. 63 illustrates one method of implementing complex algorithms in an HCAS.

FIG. 63 illustrates one embodiment for implementing complex algorithms on an HCAS. FIG. 63 shows three flow charts for three interacting processes: host process 1200, control process 1300 and computing process 1400. Host process 1200 represents a process running on a remote host computer that initiates a complex algorithm processing request and receives the results. Control process 1300 represents a process that arbitrates conditional branching statements in the complex algorithm. Control process 1300 may run on a remote host computer or within an HCAS. Computing process 1400 represents a process for computing complex algorithm sections on an HCAS.

Host process 1200 starts at step 1202 and continues with step 1204. Step 1204 sends a complex algorithm processing request control process 1300. Host process 1200 continues at step 1206 where it waits to receive the computed results.

Control process 1300 starts at step 1302 and continues with step 1304. Step 1304 receives the complex algorithm processing request from remote process 1200 and continues with step 1306. Step 1306 sends the complex algorithm processing sections to computing process 1400, indicating the first section to be computed. Control process 1300 continues with step 1308. Step 1308 waits for computing process 1400 to return results after completing a section of the complex algorithm.

Computing process 1400 starts at step 1402 and continues with step 1404. Step 1404 receives the complex algorithm processing sections from control process 1300. Computing process 1400 continues with step 1406 where the indicated section of the complex algorithm processing request is computed. Computing process 1400 continues with step 1408. Step 1408 agglomerates the results of the computed section and sends them to control process 1300. Computing process 1400 continues with step 1410 where it waits for direction from control process 1300.

Control process 1300 receives the results of the computed section from computing process 1400 in step 1308 and continues with step 1310. If no further computing of the complex algorithm processing request is required, control process 1300 continues with step 1314; otherwise, step 1310 evaluates the respective conditional branch in the complex algorithm processing request using results returned from computing process 1400 and continues with step 1312.

Step 1312 initiates the computation of the next section of complex algorithm processing request by sending a direction messages to computing process 1400. Control process 1300 then continues with step 1308 where it waits for the computation of the initiated section to be completed by computing process 1400.

Step 1410 of computing process 1400 receives direction from control process 1300 indicating if, and which, section to compute next. If there is no section to compute next, computing process 1400 terminates at step 1414; otherwise computing process 1400 continues with step 1406 where the next section is computed.

In step 1314 of control process 1300, a direction message is sent to computing process 1400 indicating that there are no further sections for computing. Control process 1300 continues with step 1316 where it sends the final results received from computing process 1400 in step 1308 to host process 1200. Control process 1300 then terminates at step 1318.

Host process 1200 receives the results from control process 1300 in step 1206. Host process 1200 then terminates at step 1208.

As can be seen in the above example, the decomposition of complex algorithm into computable sections and conditional functions, data is only moved as necessary. By evaluating the branching statement in a central location, the inherent serial nature of the branching statement is maintained, and a HCAS handles complex algorithms efficiently.

Algorithm Development Toolkit

This section (Algorithm Development Toolkit) describes select processes for implementing algorithms within a HC. Such processes may be automated as a matter of design choice.

Figure 36:
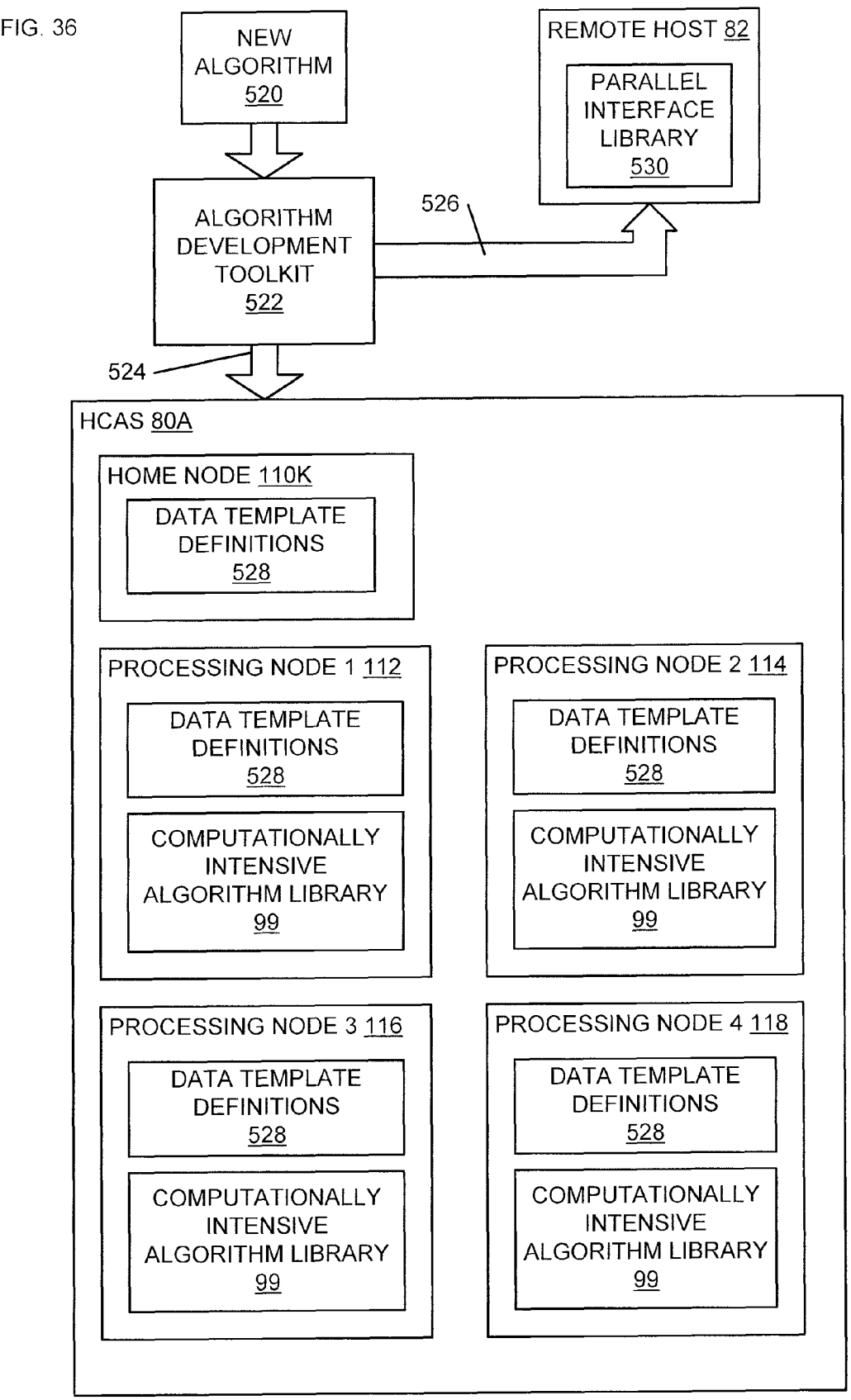
FIG. 36-FIG. 61 illustrate processes for implementing algorithms for one Howard Cascade Architecture System.

FIG. 36 is a block schematic illustrating how an algorithm development toolkit 522 is used to add a new algorithm 520 to algorithm library 99 such that new algorithm 520 will operate on HCAS 80A. Algorithm development toolkit 522 includes a set of routines that may be added to new algorithm 520 to enable it to operate in parallel on processing nodes 112, 114, 116 and 118 of HCAS 80 with a minimum amount of development work. The added routines make new algorithm 520 aware of the processing node on which it is running, and the data structure that it has to process.

Home node 110K, processing node 112, processing node 114, processing node 116, and processing node 118 contain data template definitions 528 that define the data and parameters for functions in the computationally intensive algorithm library 99. All processing nodes in HCAS 80A contain identical copies of the data template definitions 528 and computationally intensive algorithm library 99. Algorithm development toolkit 522 facilitates the addition of new algorithm 520 to data definitions 528 and computationally intensive algorithm library 99, via data path 524, and to a parallel interface library 530 used by the application running on remote host 82, via data path 526.

Figure 37:
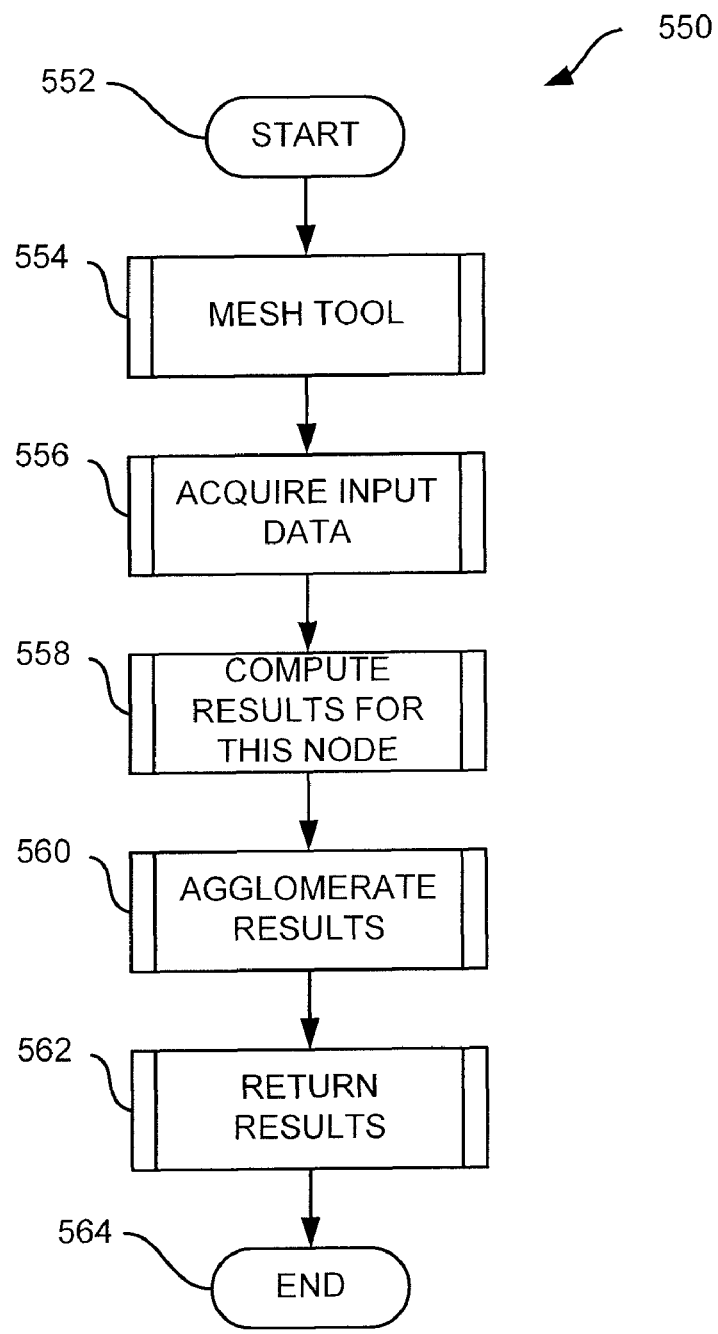

FIG. 37 is a flow chart illustrating one process 550 of new algorithm 520 as augmented by routines from algorithm development toolkit 522. Process 550 starts at step 552 and continues with step 554.

Figure 38:
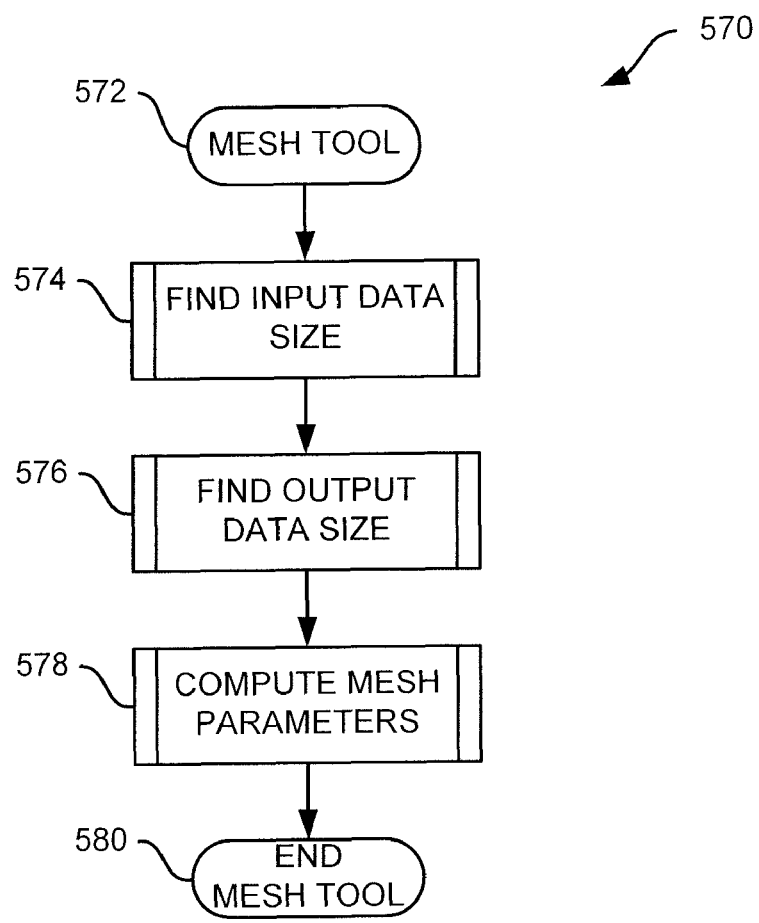

Step 554 is a function call to the mesh tool function, described in FIG. 38, which extracts the input and output data descriptions for the new algorithm. Process 550 continues with step 556.

Figure 51:
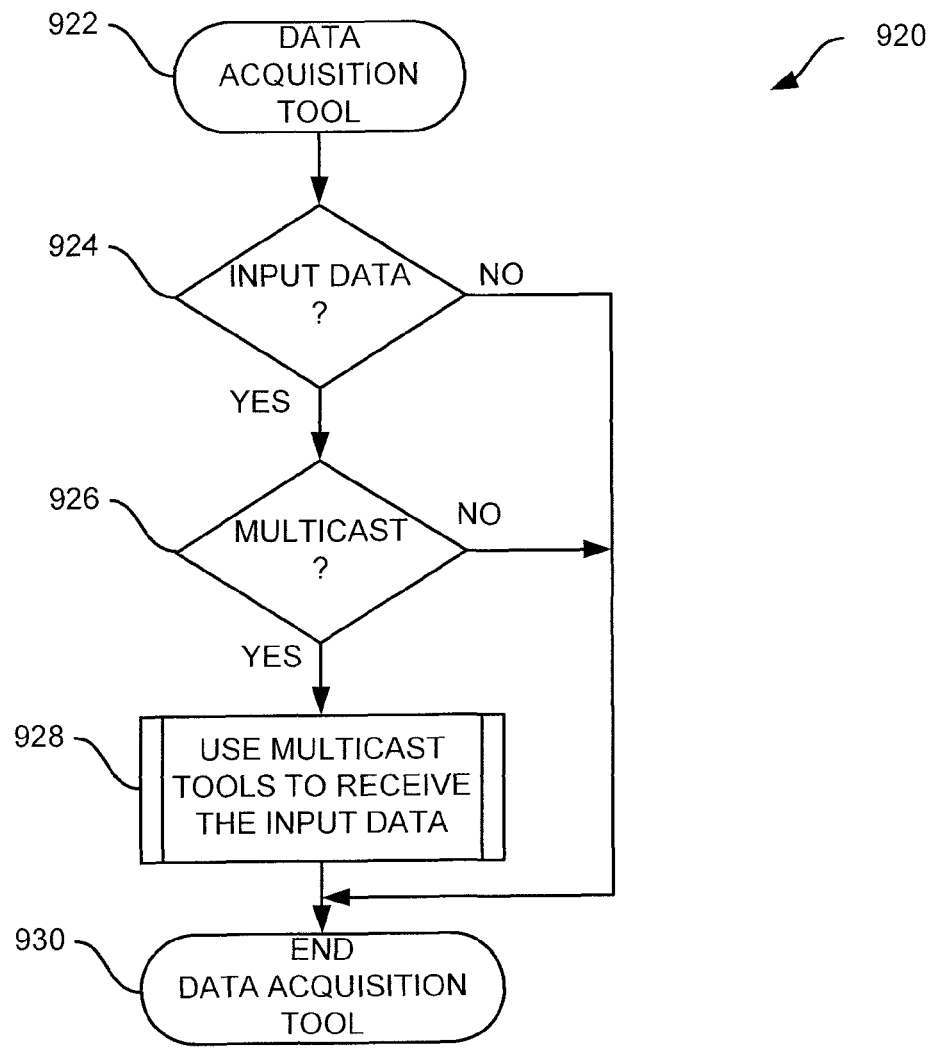

Step 556 is a function call to acquire input data function described in FIG. 51, which acquires the data for the new algorithm. Process 550 continues with step 558.

Step 558 is a function call to compute the results for a processing node, and is the invocation of the new algorithm on the data set acquired in step 556 for the processing node on which this function is to run. Process 550 continues with step 560.

Figure 53:
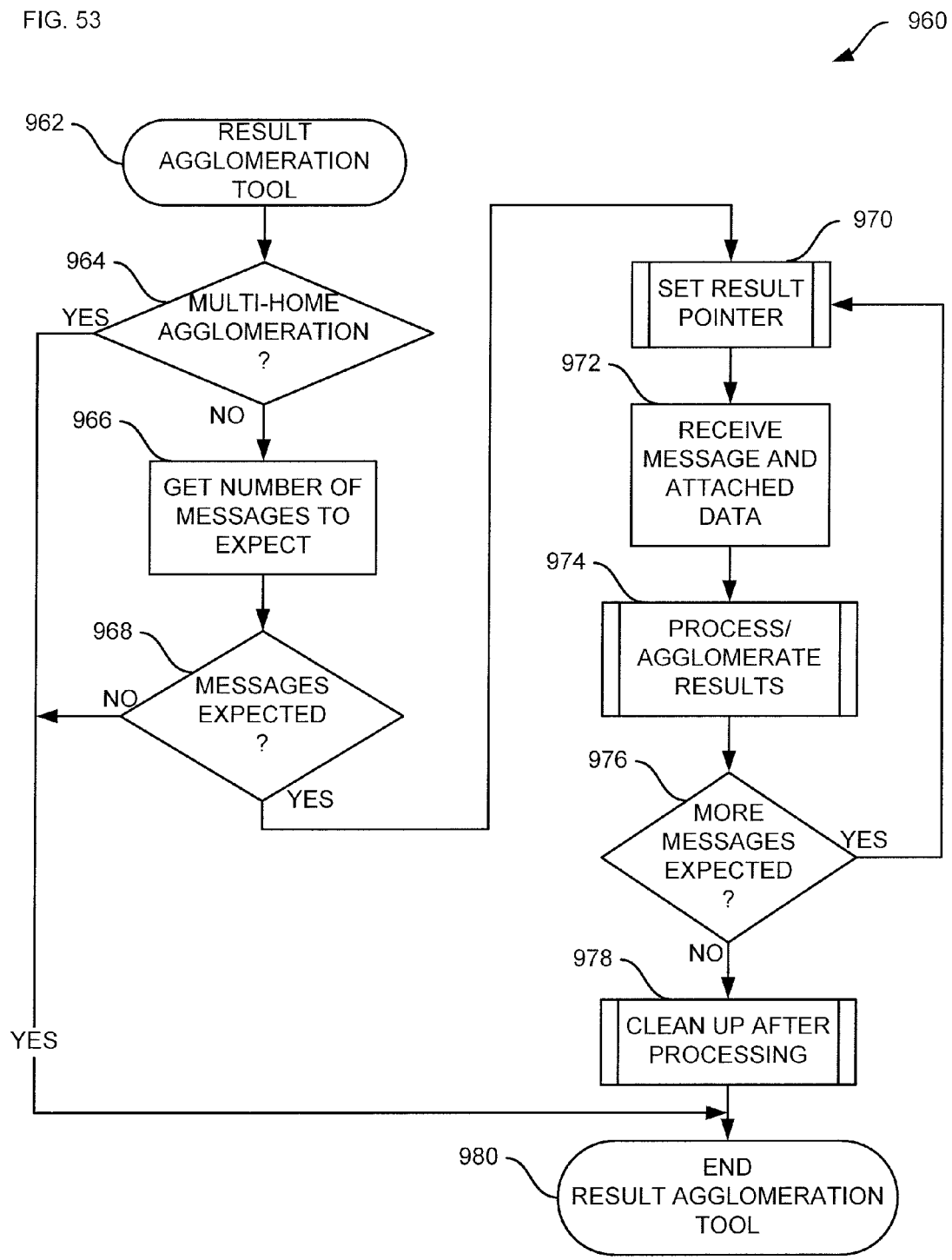

Step 560 is a function call to an agglomerate result function described in FIG. 53, which receives results from downstream processing nodes during the agglomeration phase of the HC. Process 550 continues with step 562.

Figure 57:
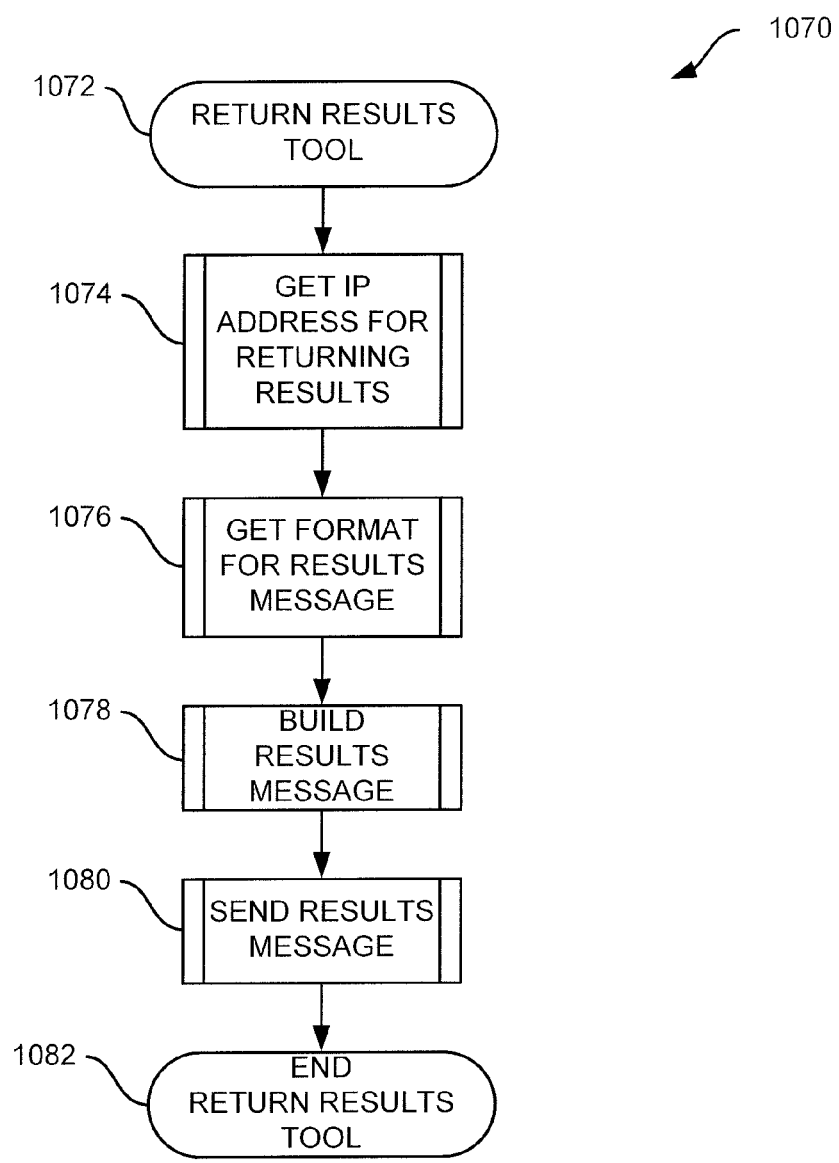

Step 562 is a function call to a return results function described in FIG. 57, which sends the local and agglomerated result to the correct processing node, or home node as necessary. Process 550 terminates at step 564.

FIG. 38 is a flow chart illustrating the mesh tool sub-process 570 as invoked in step 554 of process 550 in FIG. 37. Mesh tool sub-process 570 extracts the input and output data descriptions from the algorithm request message and computes the mesh size for local computation, using the processing node position on which it runs. The mesh is a description of the input and output data to be used, and defines how much of the result is computed by this processing node and which input values are used to compute the result. The mesh is dependant on the type of algorithm, the position of the processing node in the HC, and the total number of processing nodes in the HC. Sub-process 570 begins at step 572 and continues with step 574.

Figure 39:
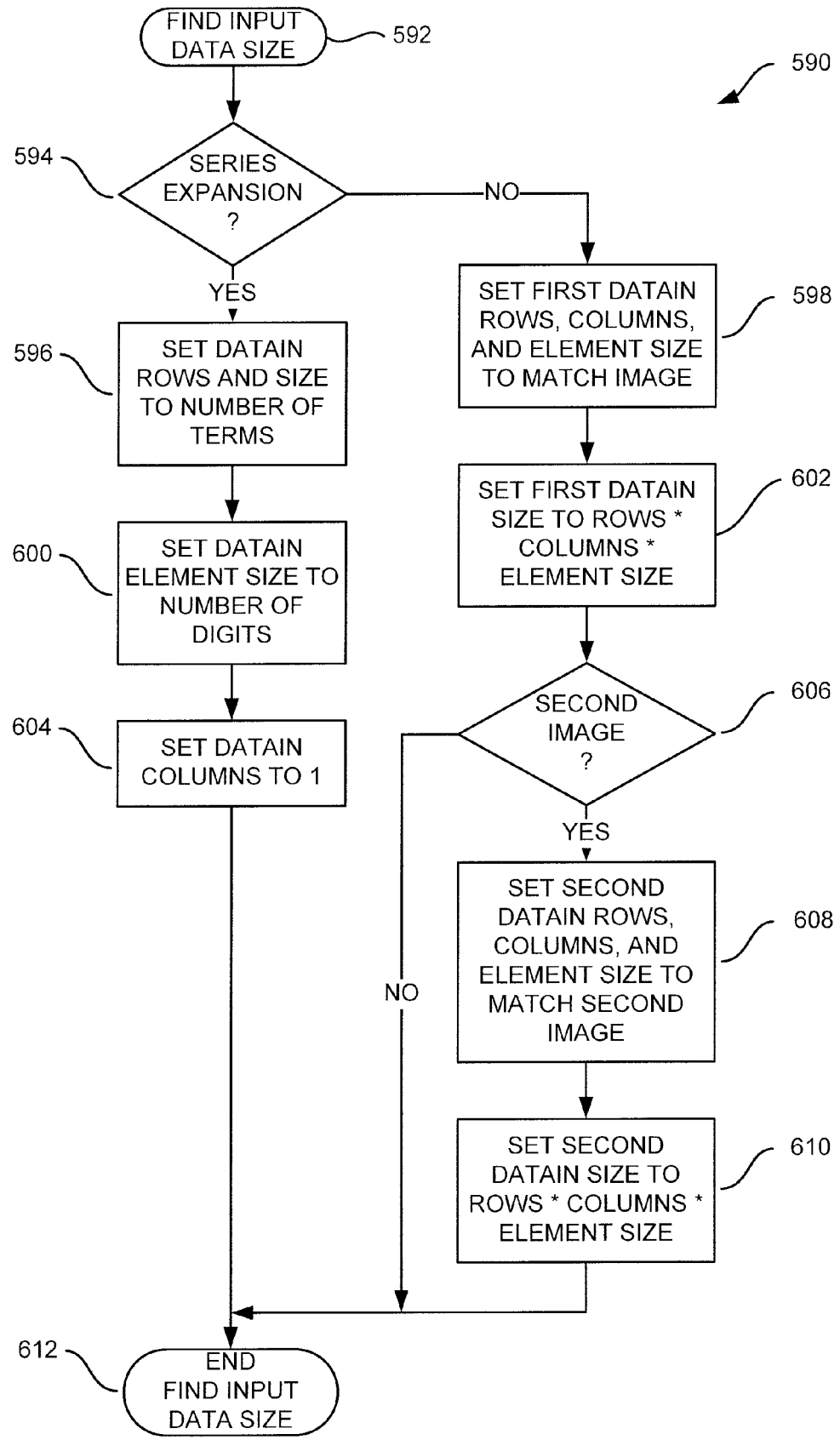

Step 574 is a function call to a find an input data size function described in FIG. 39, which extracts the input data size from the algorithm processing request. Sub-process 570 continues with step 576.

Figure 40:
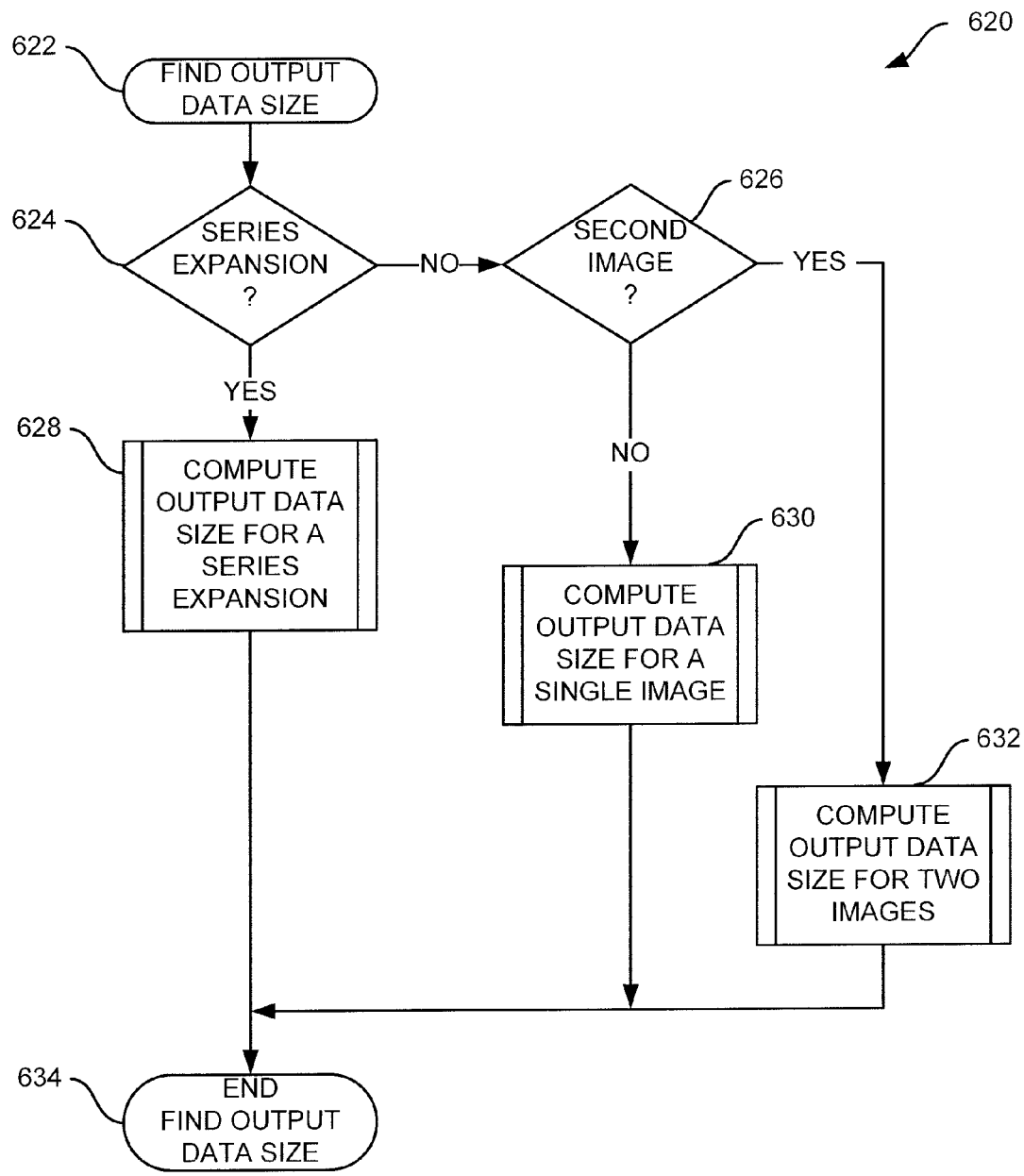

Step 576 is a function call to a compute output data size sub-process described in FIG. 40, which calculates the output data set size based on the input data set size and the computation type of the new algorithm. Sub-process 570 continues with step 578.

Figure 44:
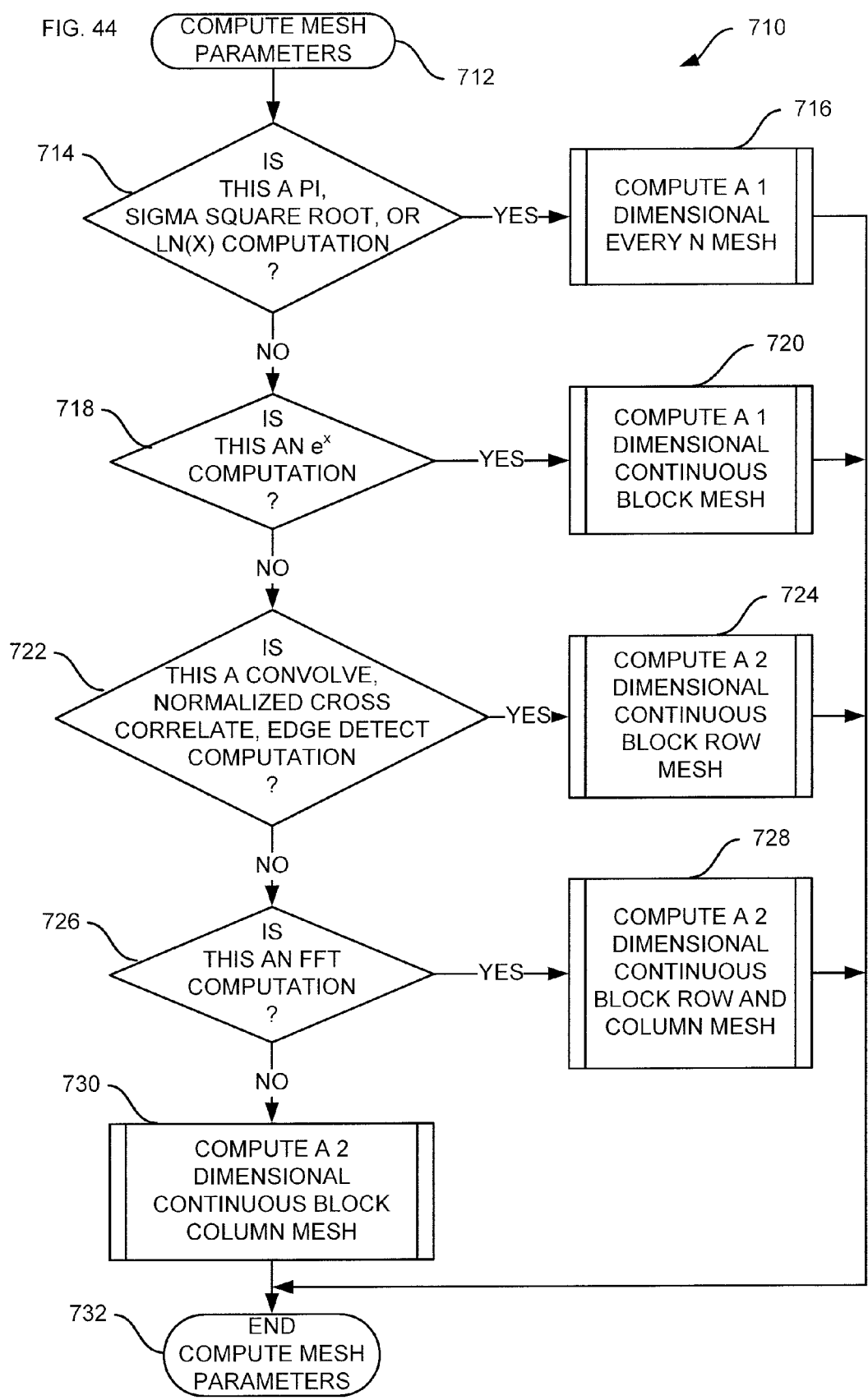

Step 578 is a function call to a compute mesh parameters sub-process described in FIG. 44, which determines the mesh parameters that define which part of the results are to be computed by this processing node. Sub-process 570 terminates at step 580, returning to where it was invoked.

FIG. 39 is a flow chart describing one find input data size sub-process 590 that starts at step 592 and continues with step 594.

Step 594 is a decision. If the new algorithm is a series expansion, sub-process 590 continues with step 596; otherwise sub-process 590 continues with step 598.

Step 596 sets the data input rows and data input size to the number of terms in the series. Sub-process 590 continues with step 600.

Step 598 sets the first data input rows, columns and element size to match the input image size. Sub-process 590 continues with step 602.

Step 600 sets the data input element size to the number of digits provided per element. Sub-process 590 continues with step 604.

Step 602 sets the first data input size to the data input rows×columns×element size defined in step 598. Sub-process 590 continues with step 606.

Step 604 sets the data input columns to one. Sub-process 590 terminates at step 612, returning control to the invoking process.

Step 606 is a decision. If there is a second input image, sub-process 590 continues with step 608; otherwise sub-process 590 terminates at step 612, returning control to the invoking process.

Step 608 sets the second data input rows, columns and element size to match the second input image. Sub-process 590 continues with step 610.

Step 610 sets the second data input size to the data input rows×columns×element size defined in step 608. Sub-process 590 terminates at step 612, returning control to the invoking process.

FIG. 40 is a flowchart illustrating one sub-process 620 to find output data size as invoked by process 550 in FIG. 37. Sub-process 620 starts at step 622 and continues with step 624.

Step 624 is a decision. If the new algorithm is a series expansion, sub-process 620 continues with step 628; otherwise sub-process 620 continues with step 626.

Step 626 is a decision. If there is a second image, sub-process 620 continues with step 632; otherwise sub-process 620 continues with step 630.

Figure 41:
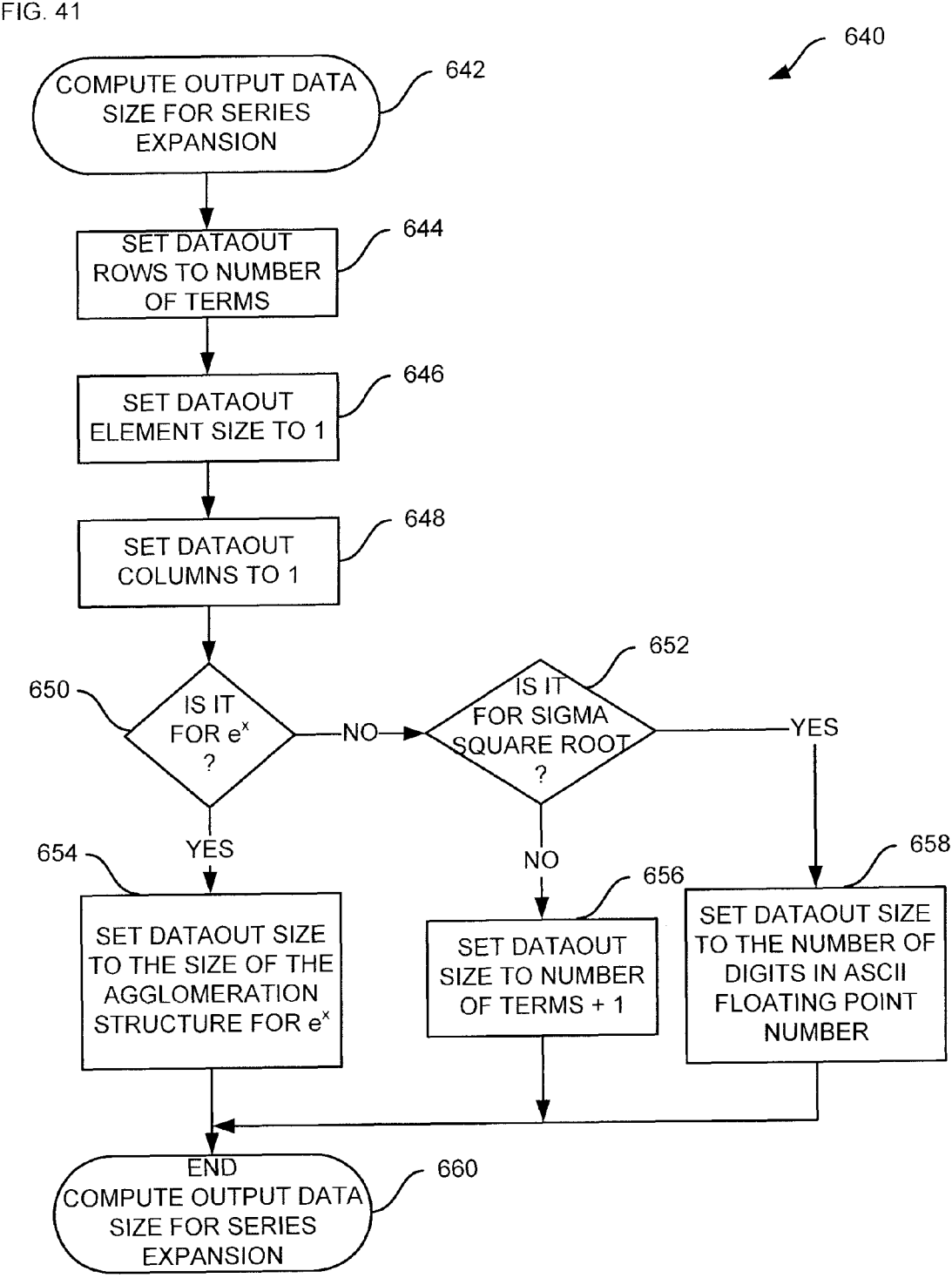

Step 628 invokes sub-process compute output series size for a series expansion defined in FIG. 41, which calculates the output data size for the series calculated by the new algorithm. Sub-process 620 terminates at step 634, returning control to the invoking process.

Figure 42:
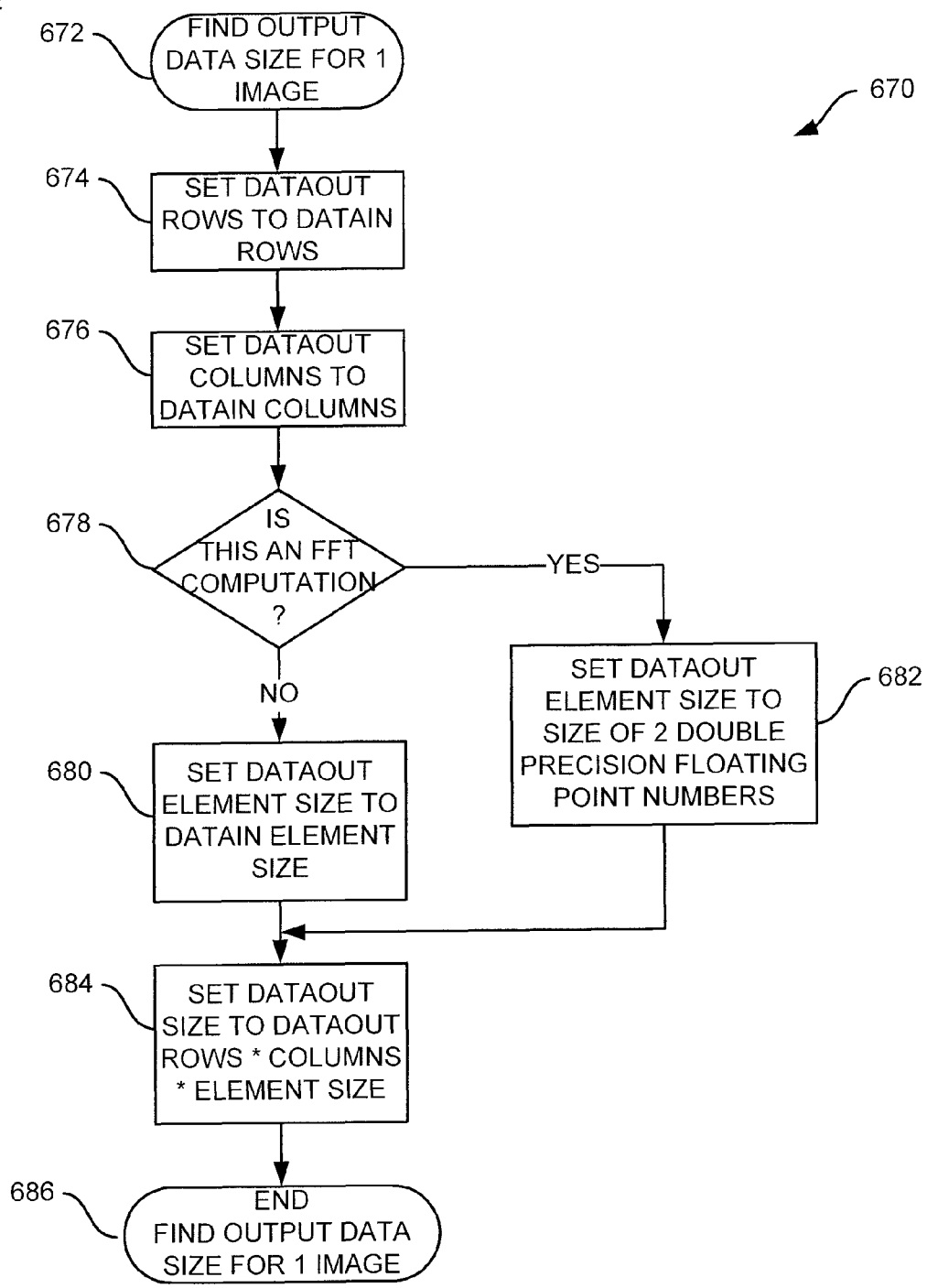

Step 630 invokes sub-process compute output data size for a single image defined in FIG. 42, which calculates the output data size for a single image. Sub-process 620 terminates at step 634, returning control to the invoking process.

Figure 43:
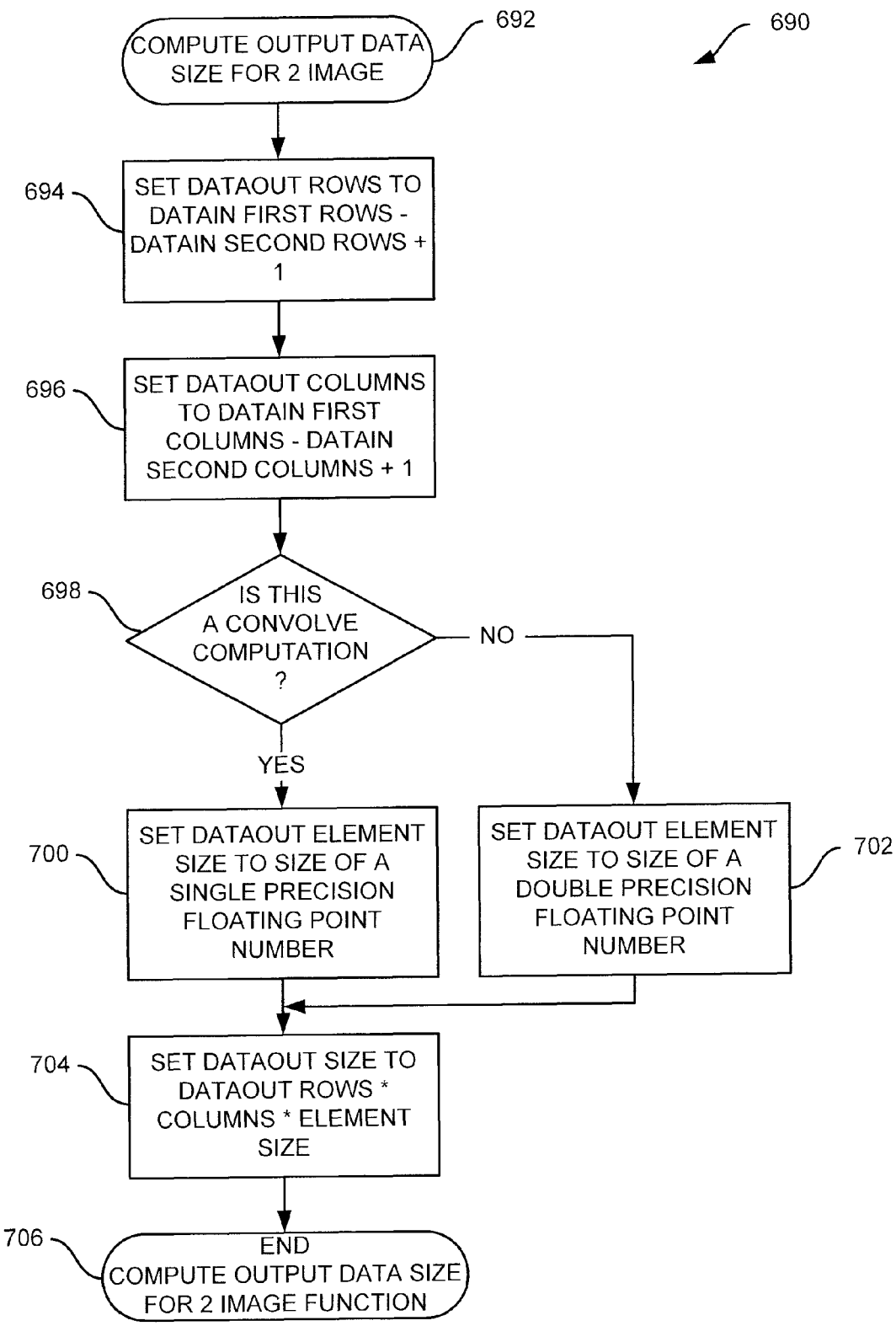

Step 632 invokes sub-process compute output data size for two images defined in FIG. 43, which calculates the output data size for two images. Sub-process 620 terminates at step 634, returning control to the invoking process.

FIG. 41 illustrates one sub-process 640 for computing the output data size for the series expansion used in the new algorithm. Sub-process 640 starts at step 642 and continues with step 644.

Step 644 sets the data output rows to the number of terms in the series. Sub-process 640 continues with step 646.

Step 646 sets the data output element size to one. Sub-process 640 continues with step 648.

Step 648 sets the data output columns to one. Sub-process 640 continues with step 650.

Step 650 is a decision. If the new algorithm is an $e^x$ expansion, sub-process 640 continues with step 654; otherwise sub-process 640 continues with step 652.

Step 652 is a decision. If the new algorithm is a Sigma square root expansion, sub-process 640 continues with step 658; otherwise sub-process 640 continues with step 656.

Step 654 sets the output data size to the size of the agglomeration structure for the $e^x$ expansion. Sub-process 640 terminates at step 660, returning control to the invoking process.

Step 656 sets the data output size to the number of terms in the series plus one. Sub-process 640 terminates at step 660, returning control to the invoking process.

Step 658 sets the data output size to the number of digits in an ASCII floating point number. Sub-process 640 terminates at step 660, returning control to the invoking process.

FIG. 42 illustrates one sub-process 670 for calculating the output data size when the input data is a single image. Sub-process 670 starts at step 672 and continues with step 674.

Step 674 sets the data output rows equal to the data input rows. Sub-process 670 continues with step 676.

Step 676 sets the data output columns equal to the data input columns. Sub-process 670 continues with step 678.

Step 678 is a decision. If the new algorithm is a FFT computation, sub-process 670 continues with step 682; otherwise sub-process 670 continues with step 680.

Step 680 sets the data output size equal to the data input element size. Sub-process 670 continues with step 684;

Step 682 sets the data output element size to the size of two double precision floating-point numbers. Sub-process 670 continues with step 684.

Step 684 sets the data output size to the data output rows× columns×element size. Sub-process 670 terminates at step 686, returning control to the invoking process.

FIG. 43 illustrates one sub-process 690 for calculating the size of the output data when the new algorithm has two input images. Sub-process 690 starts at step 692 and continues with step 694.

Step 694 sets the data output rows equal to the data input first rows, minus the data input second rows, plus one. Sub-process 690 continues with step 696.

Step 696 sets the data output columns to the data input first columns, minus the data input second columns, plus one. Sub-process 690 continues with step 698.

Step 698 is a decision. If the new algorithm is a convolve computation, sub-process 690 continues with step 700; otherwise sub-process 690 continues with step 702.

Step 700 sets the data output element size to the size of a single precision floating-point number. Sub-process 690 continues with step 704.

Step 702 sets the data output element size to the size of a double precision floating-point number. Sub-process 690 continues with step 704.

Step 704 sets the output data size to the data output rows× columns×element size. Sub-process 690 terminates at step 706, returning control to the invoking process.

FIG. 44 illustrates one sub-process 710 for calculating parameters for the mesh. Sub-process 710 starts at step 712 and continues with step 714.

Step 714 is a decision. If the new algorithm is a Pi, Sigma square root or LN(X) computation, sub-process 710 continues with step 716; otherwise sub-process 710 continues with step 718.

Figure 45:
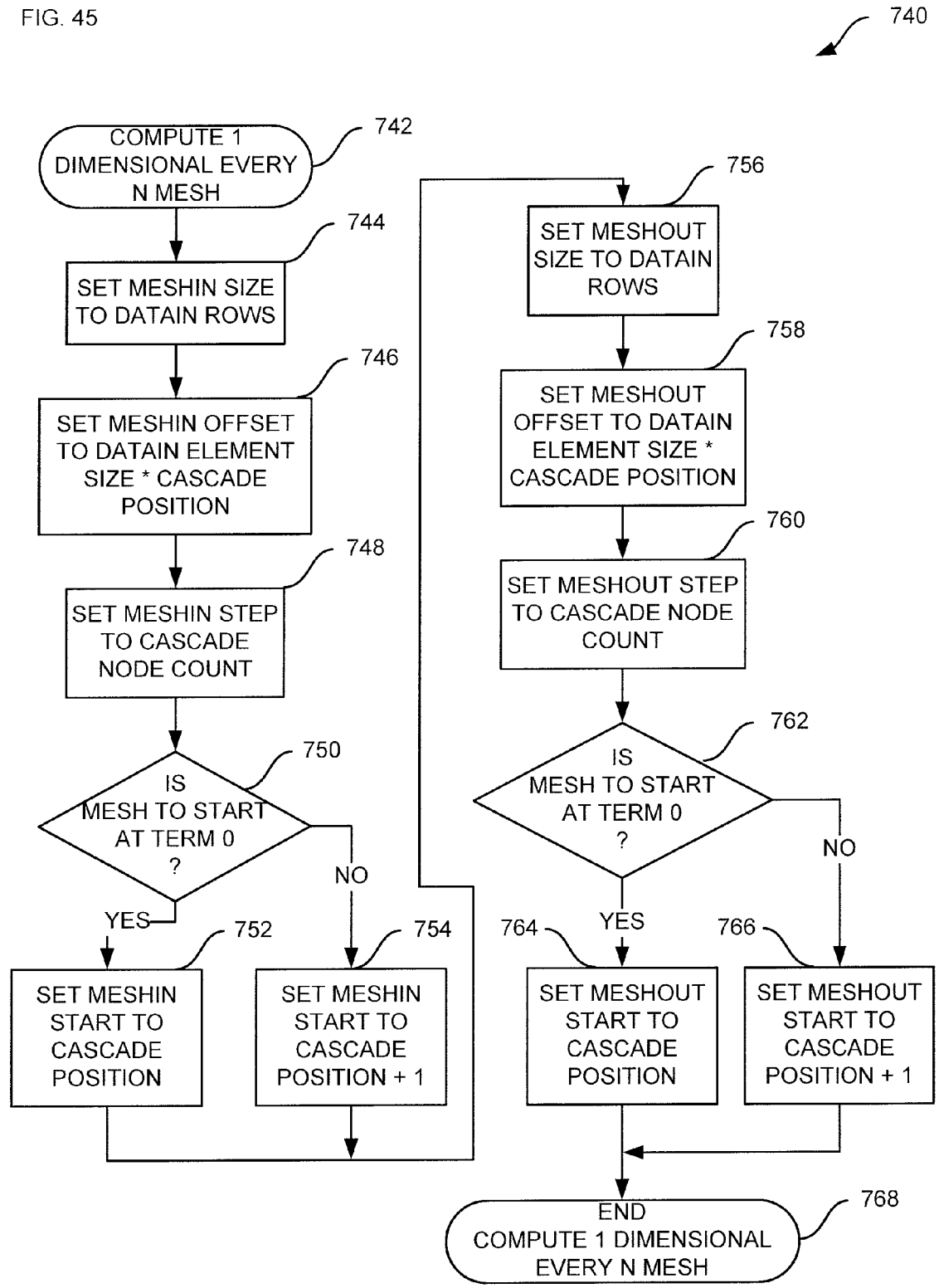

Step 716 invokes a sub-process to calculate a single dimensional mesh for every value of N, described in FIG. 45. Sub-process 710 terminates with step 732, returning control to the invoking process.

Step 718 is a decision. If the new algorithm is a $e^x$ computation, sub-process 710 continues with step 720; otherwise sub-process 710 continues with step 722.

Figure 46:
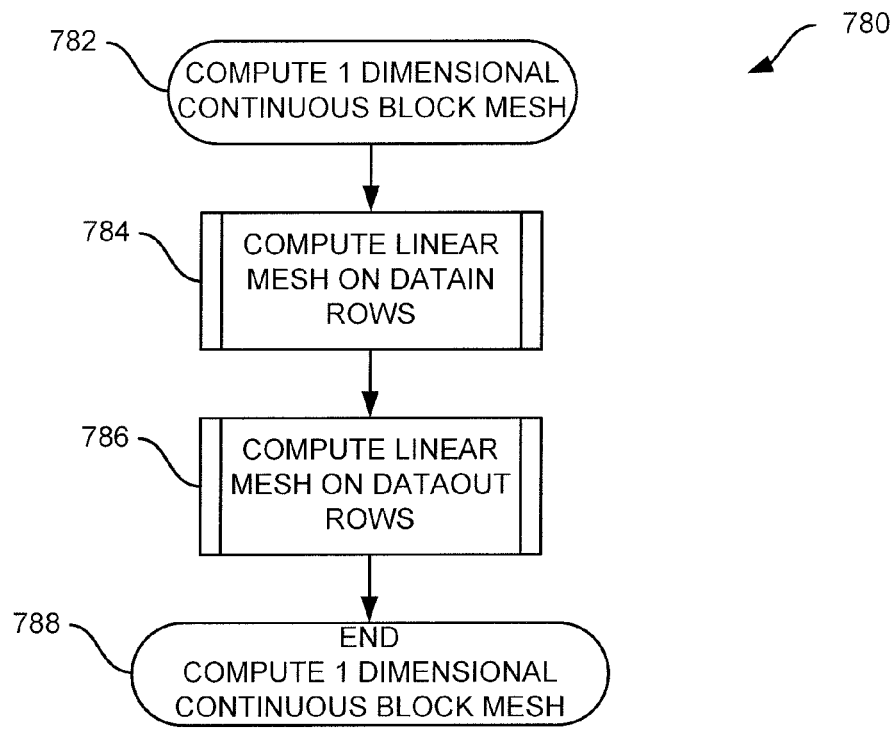

Step 720 invokes a sub-process to calculate a 1-dimensional continuous block mesh, defined in FIG. 46. Sub-process 710 terminates with step 732, returning control to the invoking process.

Step 722 is a decision. If the new algorithm is a convolution, normalized cross correlate or edge detection algorithm, sub-process 710 continues with step 724; otherwise sub-process 710 continues with step 726.

Step 724 invokes a sub-process to calculate a 2-dimensional continuous block row mesh, defined in FIG. 46. Sub-process 710 terminates with step 732, returning control to the invoking process.

Step 726 is a decision. If the new algorithm is an FFT calculation, sub-process 710 continues with step 728; otherwise sub-process 710 continues with step 730.

Figure 48:
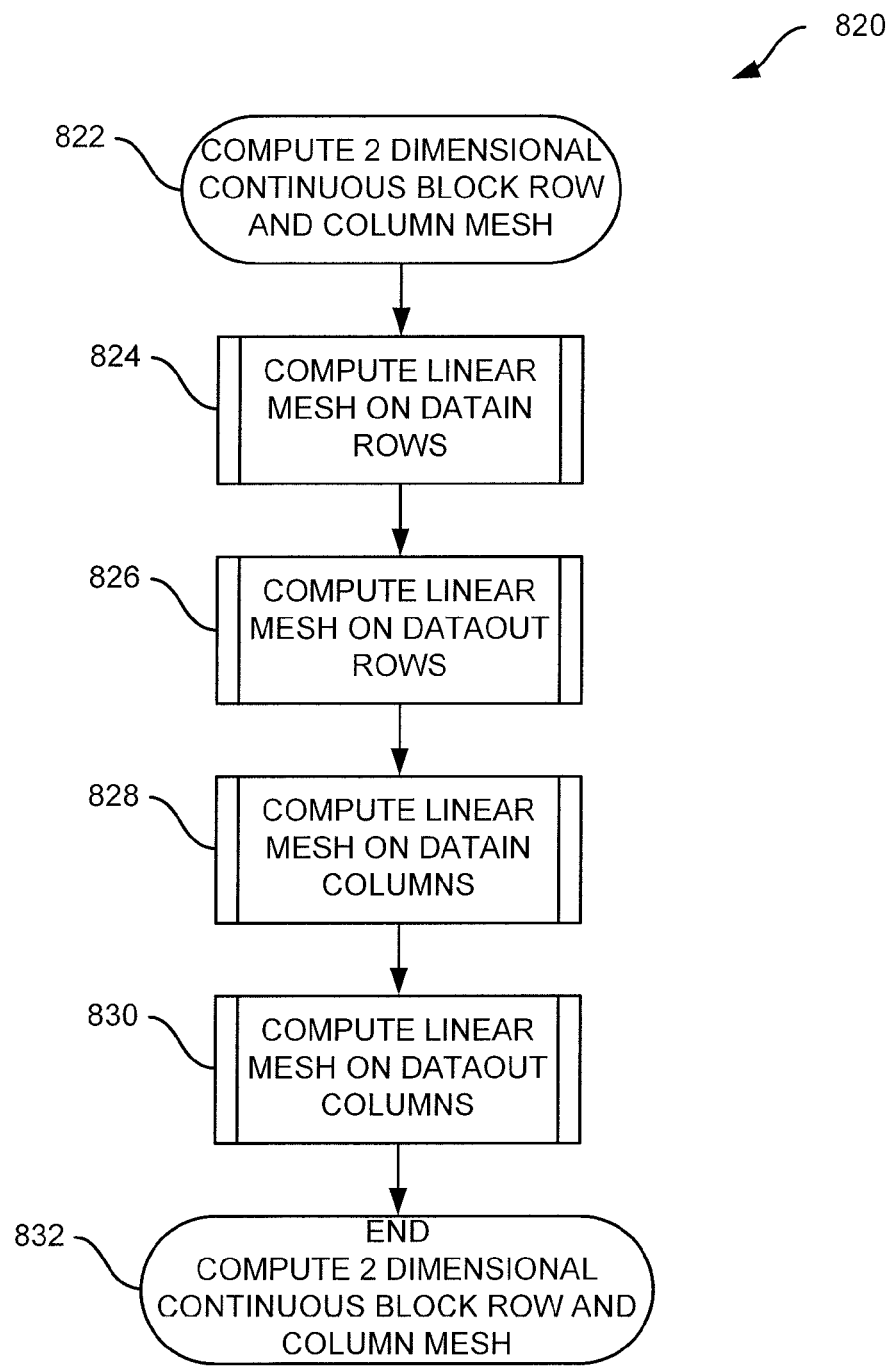

Step 728 invokes a sub-process to calculate a 2-dimensional continuous block row and column mesh, defined in FIG. 48. Sub-process 710 terminates with step 732, returning control to the invoking process.

Figure 47:
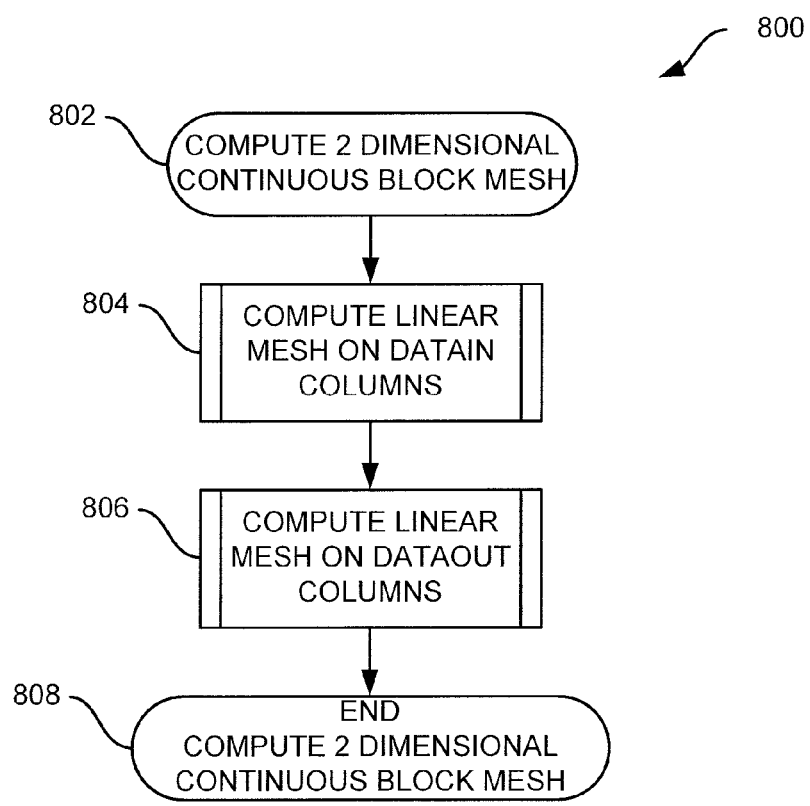

Step 730 invokes a sub-process to calculate a 2-dimensional continuous block column mesh, defined in FIG. 47. Sub-process 710 terminates with step 732, returning control to the invoking process.

FIG. 45 illustrates one sub-process to 740 to calculate a single dimensional every N mesh. Sub-process 740 starts with step 742 and continues with step 744.

Step 744 sets the mesh input size to the data input rows. Sub-process 740 continues with step 746.

Step 746 sets the mesh input offset to the data input element size×the processing node's cascade position. Sub-process 740 continues with step 748.

Step 748 sets the mesh input step equal to the number of processing nodes working on the algorithm processing request. Sub-process 740 continues with step 750.

Step 750 is a decision. If the mesh is to start at term 0, sub-process 740 continues with step 752; otherwise sub-process 740 continues with step 754.

Step 752 sets the mesh start equal to the processing node's cascade position. Sub-process 740 continues with step 756;

Step 754 sets the mesh input start to the processing node's cascade position, plus one. Sub-process 740 continues with step 756.

Step 756 sets the mesh output size to the data input rows. Sub-process 740 continues with step 758.

Step 758 sets the mesh output offset to the data input element size×the processing node's cascade position. Sub-process 740 continues with step 760.

Step 760 sets the mesh output step equal to the count of processing nodes working on the algorithm processing request. Sub-process 740 continues with step 762.

Step 762 is a decision. If the mesh is to start at term zero, sub-process 740 continues with step 764; otherwise sub-process 740 continues with step 766.

Step 764 set the mesh output start equal to the processing node's cascade position. Sub-process 740 terminates at step 768, returning control to the invoking process.

Step 766 sets the mesh output start to the processing node's cascade position, plus one. Sub-process 740 terminates at step 768, returning control to the invoking process.

FIG. 46 illustrates one sub-process 780 to compute a single dimensional continuous block mesh, which is also the same sub-process 780 for computing a two dimensional continuous block row mesh. Sub-process 780 starts at step 782 and continues with step 784.

Figure 49:
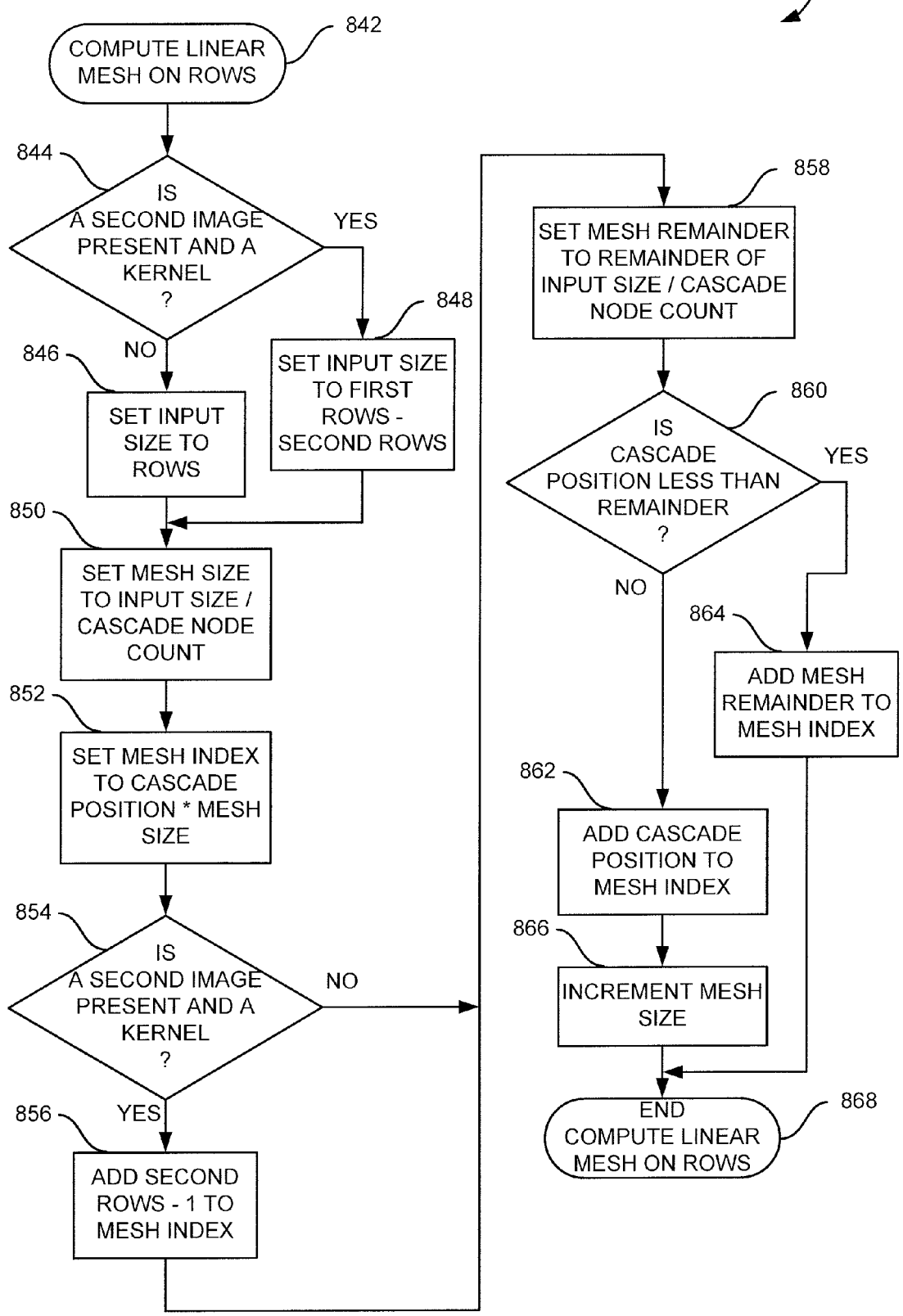

Step 784 invokes a sub-process to calculate a linear mesh based on data input rows, as defined in FIG. 49. Sub-process 780 continues with step 786.

Figure 50:
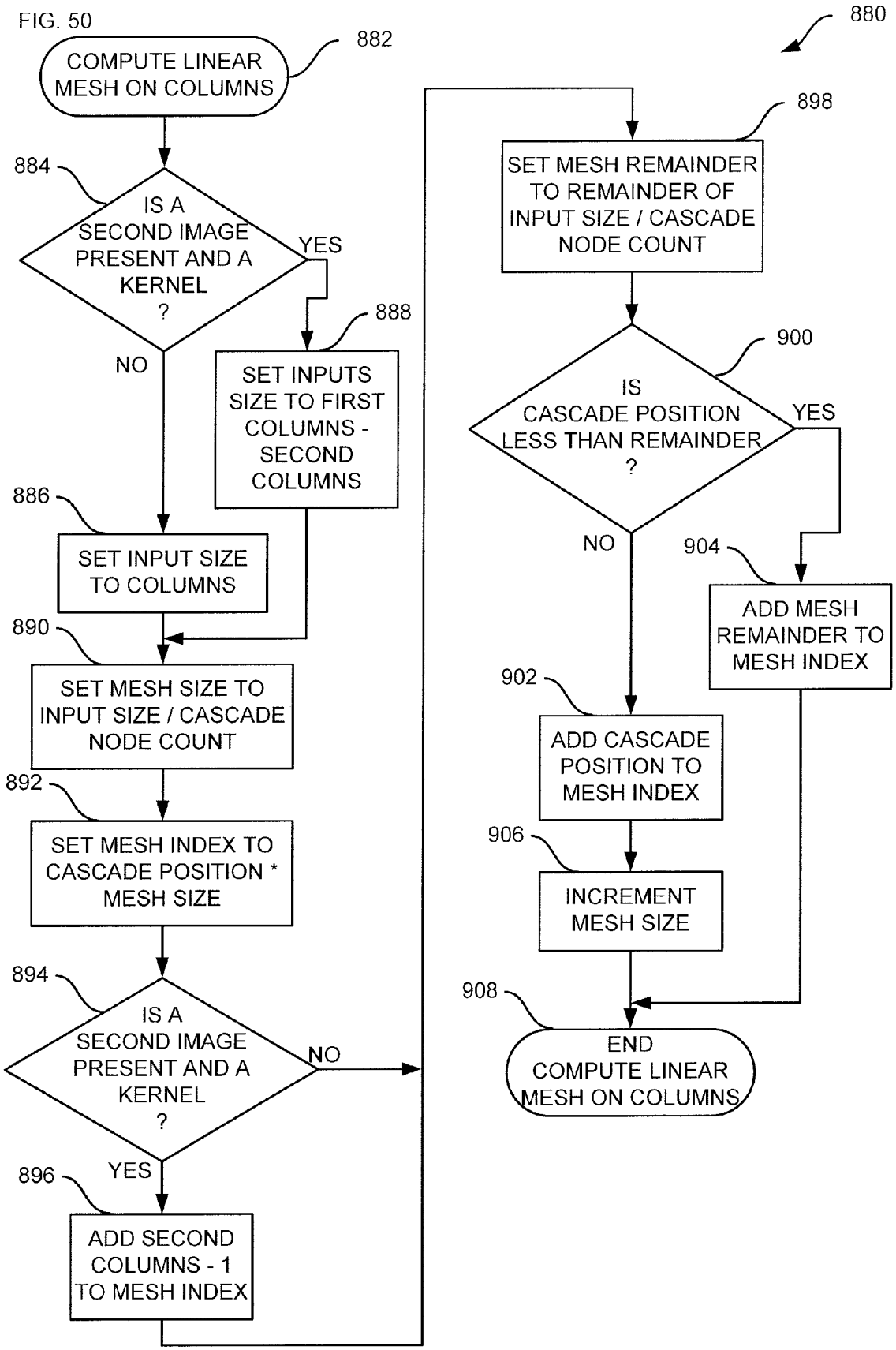

Step 786 invokes a sub-process to calculate a linear mesh based on data output rows, defined in FIG. 50. Sub-process 780 terminates at step 788, returning control to the invoking process.

FIG. 47 is a flow chart illustrating one sub-process 800 for calculating a 2-dimensional continuous block mesh. Sub-process 800 starts at step 802 and continues with step 804.

Step 804 invokes a sub-process to compute a linear mesh on data input columns, defined in FIG. 49. Sub-process 800 continues with step 806.

Step 806 invokes a sub-process to calculate a linear mesh based on data output columns, defined in FIG. 50. Sub-process 800 terminates at step 808, returning control to the invoking process.

FIG. 48 is a flow chart illustrating one sub-process 820 for calculating a 2-dimensional continuous clock row and column mesh. Sub-process 820 starts at step 822 and continues with step 824.

Step 824 invokes a sub-function to calculate a linear mesh on data input rows, defined in FIG. 49. Sub-process 820 continues with step 826.

Step 826 invokes a sub-process to calculate a linear mesh based on data output rows. Sub-process 820 continues with step 828.

Step 828 invokes a sub-function to calculate a linear mesh on data input columns, defined in FIG. 49. Sub-process 820 continues with step 830.

Step 830 invokes a sub-process to calculate a linear mesh based on data output columns. Sub-process 820 terminate at step 832, returning control to the invoking process.

FIG. 49 is a flow chart illustrating one sub-process 840 for computing a linear mesh on rows. Sub-process 840 may be invoked for both data input and data output calculations. Sub-process 840 starts at step 842 and continues with step 844.

Step 844 is a decision. If a second image is present with a kernel, sub-process 840 continues with step 848; otherwise sub-process 840 continues with step 846.

Step 846 sets the input size to rows. Sub-process 840 continues with step 850.

Step 848 sets the input size to the first rows minus the second rows. Sub-process 840 continues with step 850.

Step 850 sets the mesh size to the input size divided by the count of processing nodes working on the algorithm processing request. Sub-process 840 continues with step 852.

Step 852 sets the mesh index to the cascade position of the processing node on which the algorithm is running×mesh size. Sub-process 840 continues with step 854.

Step 854 is a decision. If a second image is present with a kernel, sub-process 840 continues with step 856; otherwise sub-process 840 continues with step 858.

Step 856 adds second rows minus one to the mesh index. Sub-process 840 continues with step 858.

Step 858 sets the mesh remainder to the remainder of the input size divided by the count of processing nodes working on the algorithm processing request. Sub-process 840 continues with step 860.

Step 860 is a decision. If the cascade position of the processing node is less than the mesh remainder calculated in step 858, sub-process 840 continues with step 864; otherwise sub-process 840 continues with step 862.

Step 862 adds the cascade position of the processing node to the mesh index. Sub-process 840 continues with step 866.

Step 864 adds the mesh remainder calculated in step 858 to the mesh index. Sub-process 840 terminates at step 868, returning control to the invoking process.

Step 866 increments the mesh size. Sub-process 840 terminates at step 868, returning control to the invoking process.

FIG. 50 is a flow chart illustrating one sub-process 880 for computing a linear mesh on columns. Sub-process may be invoked for both data input and data output calculations. Sub-process 880 starts at step 882 and continues with step 884.

Step 884 is a decision. If a second image is present with a kernel sub-process 880 continues with step 888; otherwise sub-process 880 continues with step 886.

Step 886 sets the input size to columns. Sub-process 880 continues with step 890.

Step 888 sets the input size to the first columns minus second rows. Sub-process 880 continues with step 890.

Step 890 sets the mesh size to the input size divided by the count of processing nodes working on the algorithm processing request. Sub-process 880 continues with step 892.

Step 892 sets the mesh index to the cascade position of the processing node on which the algorithm is running×mesh size. Sub-process 880 continues with step 894, Step 894 is a decision. If a second image is present with a kernel, sub-process 880 continues with step 896; otherwise sub-process 880 continues with step 898.

Step 896 adds second columns minus one to the mesh index. Sub-process 880 continues with step 898.

Step 898 sets the mesh remainder to the remainder of the input size divided by the count of processing nodes working on the algorithm processing request. Sub-process 880 continues with step 900.

Step 900 is a decision. If the cascade position of the processing node is less than the mesh remainder calculated in step 898, sub-process 880 continues with step 904; otherwise sub-process 880 continues with step 902.

Step 902 adds the cascade position of the processing node to the mesh index. Sub-process 880 continues with step 906.

Step 904 adds the mesh remainder calculated in step 898 to the mesh index. Sub-process 880 terminates at step 908, returning control to the invoking process.

Step 906 increments the mesh size. Sub-process 880 terminates at step 908, returning control to the invoking process.

FIG. 51 is a flow chart illustrating one sub-process 920 to acquire input data needed by the processing node to perform the algorithm processing request. Sub-process 920 starts at step 922 and continues with step 924.

Step 924 is a decision. If the algorithm processing request expects input data, sub-process 920 continues with step 926; otherwise sub-process 920 terminates at step 930, returning control to the invoking process.

Step 926 is a decision. If the data is sent by the HC as a data broadcast, sub-process 920 continues with step 928; otherwise sub-process 920 terminates at step 930, returning control to the invoking process.

Figure 52:
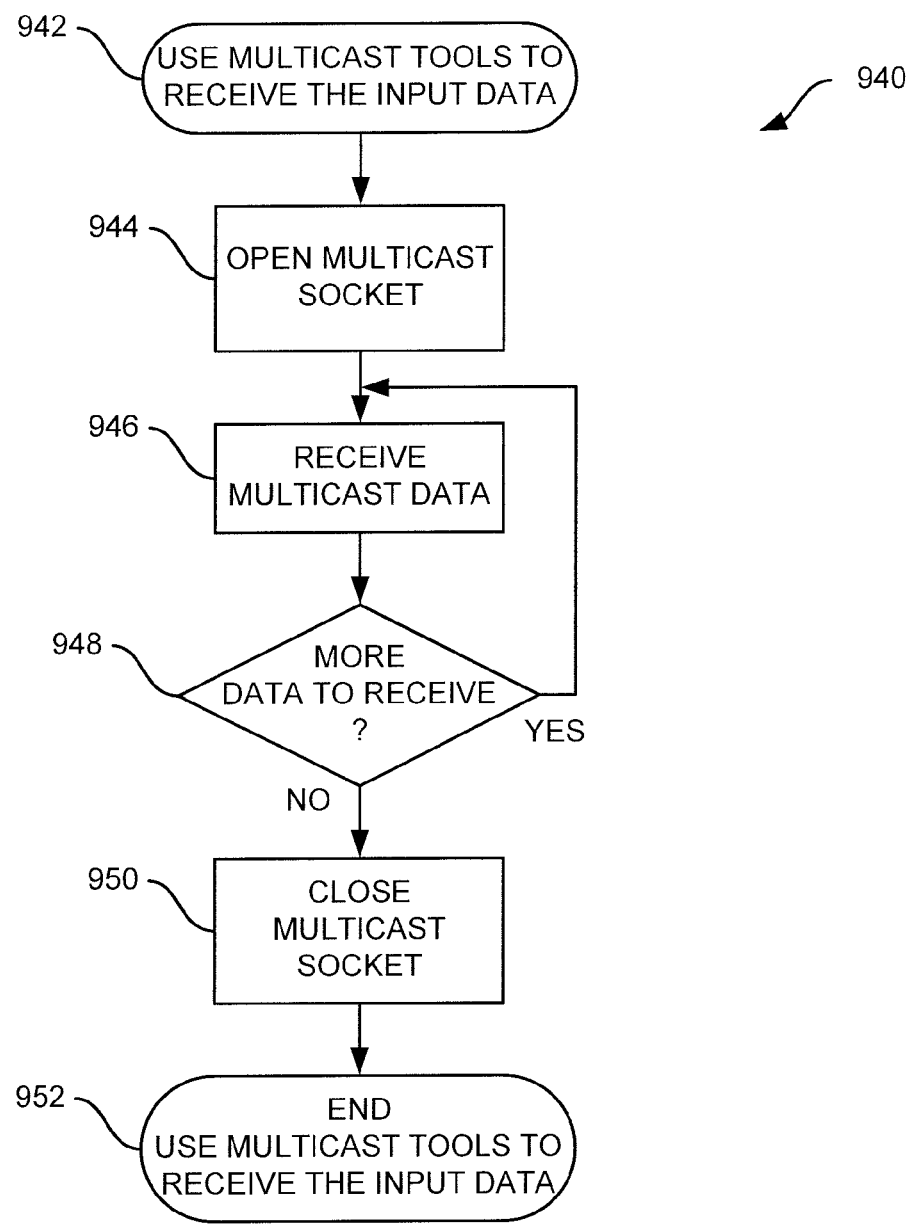

Step 928 invokes a sub-process to use multi-cast tools to receive the broadcast message, defined in FIG. 52. Sub-process 920 terminates at step 930, returning control to the invoking process.

FIG. 52 is a flowchart illustrating one sub-process 940 for using multicast tools to receive the broadcast data. Sub-process 940 starts at step 929 and continues with step 944.

Step 944 opens the multicast socket to receive the broadcast. Sub-process 940 continues with step 946.

Step 946 receives the multicast data. Sub-process 940 continues with step 948.

Step 948 is a decision. If there is more data to receive, sub-process 940 continues with step 946; otherwise sub-process 940 continues with step 950.

Step 950 closes the multicast socket opened in step 944. Sub-process 940 terminates at step 952, returning control to the invoking process.

FIG. 53 is a flowchart illustrating one sub-process 960 to receive results from downstream processing nodes, in agglomeration. Sub-process 960 starts at step 962 and continues with step 964.

Step 964 is a decision. If the agglomeration is of type with multi-home nodes, sub-process 960 terminates at step 980, returning control to the invoking process; otherwise sub-process 960 continues with step 966.

Step 966 determines the number of message to expect from downstream processing nodes. Sub-process 960 continues with step 968.

Step 968 is a decision. If there are no expected messages, sub-process 960 terminates at step 980, returning control to the invoking process; otherwise sub-process 960 continues with step 970.

Step 970 invokes a sub-process to set the result pointers that are used for storing the received results. Sub-process 960 continues with step 972.

Step 972 receives a message with data attached. Sub-process 960 continues with step 974.

Step 974 invokes a sub-process to combine results with prior results. Sub-process 960 continues with step 976.

Step 976 is a decision. If more messages with attached data are expected, sub-process 960 continues with step 970; otherwise sub-process 960 continues with step 978.

Step 978 invokes a sub-process to clean up the storage after agglomeration is complete. Sub-process 960 terminates at step 980, returning control to the invoking process.

Figure 54:
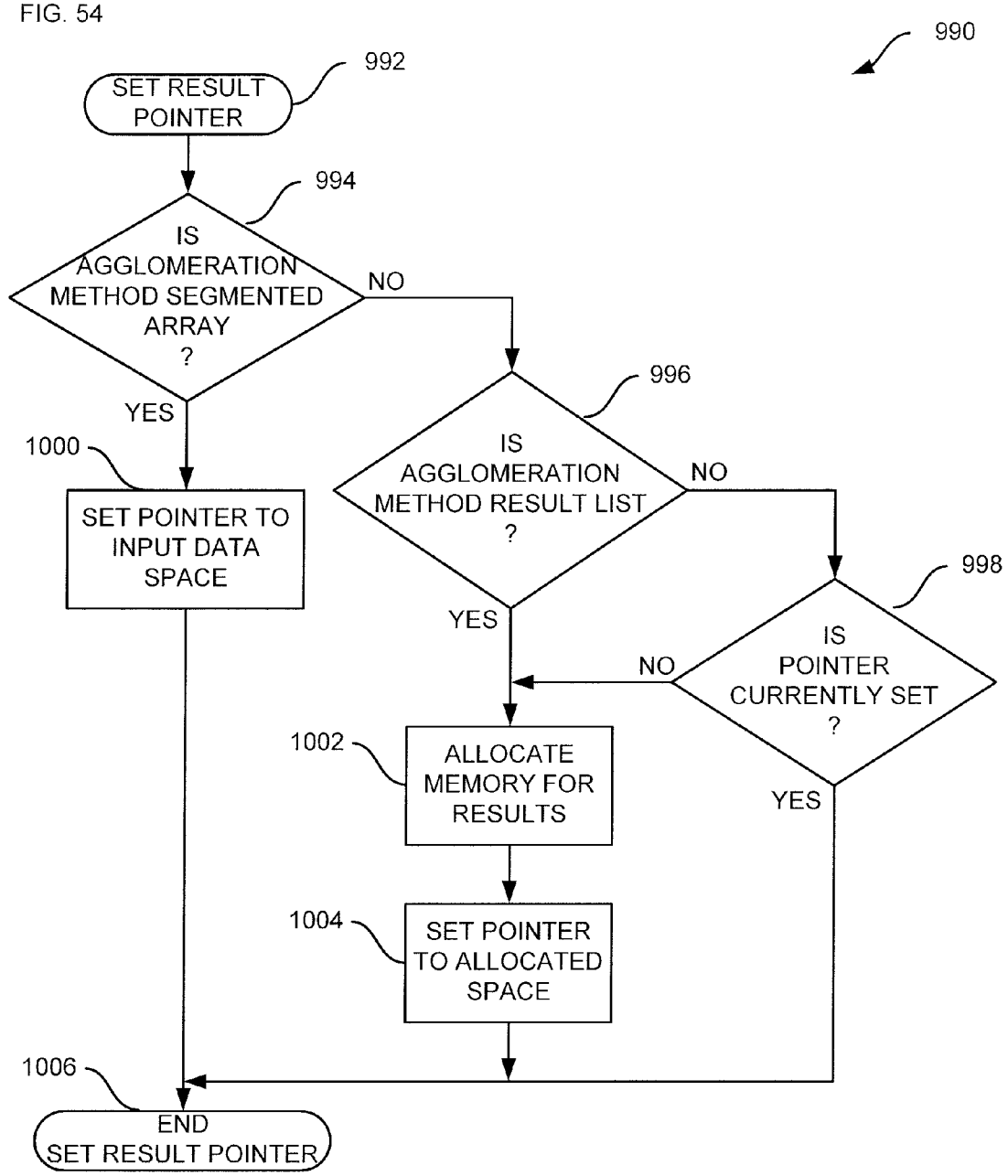

FIG. 54 is a flowchart illustrating one sub-process 990 for setting the results pointers ready for the agglomeration results. Sub-process 990 start at step 992 and continues with step 994.

Step 994 is a decision. If the agglomeration type is a row mesh, the existing memory allocated for the input data can be used, and sub-process 990 continues with step 1000; otherwise sub-process 990 continues with step 996.

Step 996 is a decision. If the agglomeration type is result list, sub-process 990 continues with step 1002; otherwise sub-process 990 continues with step 998.

Step 998 is a decision. If the pointer is currently in use, sub-process 990 terminates at step 1006, returning control to the invoking process; otherwise sub-process 990 continues with step 1002.

Step 1000 sets the data pointer to point at the input data space. Sub-process 990 terminates at step 1006, returning control to the invoking process.

Step 1002 allocated more memory for agglomeration. Sub-process 990 continues with step 1004.

Step 1004 sets the pointer to the memory space allocated by step 1002. Sub-process 990 terminates at step 1006, returning control to the invoking process.

Figure 55:
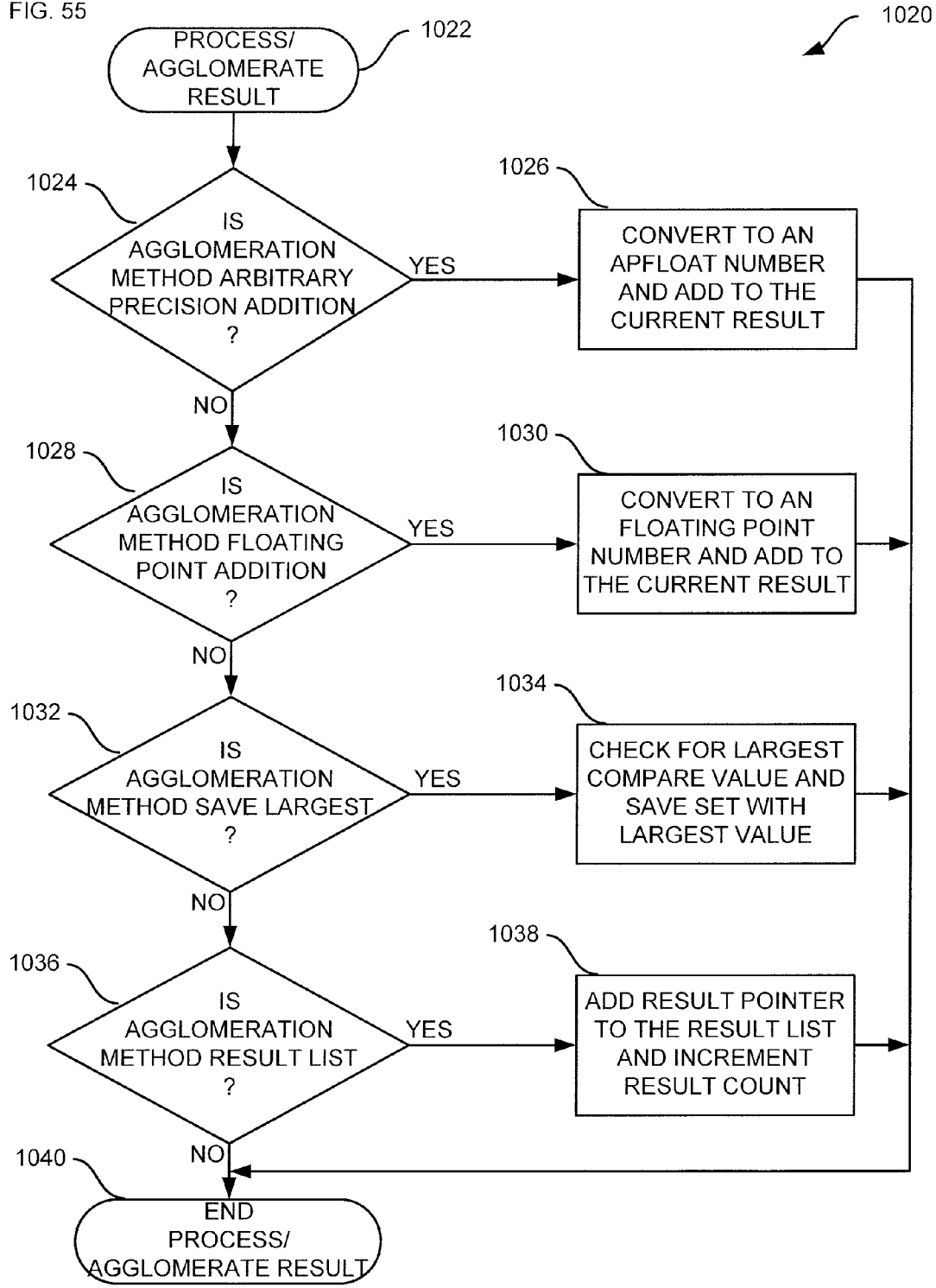

FIG. 55 is a flowchart illustrating one sub-process 1020 for processing the results during agglomeration. Sub-process 1020 starts at step 1022 and continues with step 1024.

Step 1024 is a decision. If the agglomeration type is arbitrary precision addition, then sub-process 1020 continues with step 1026; otherwise sub-process 1020 continues with step 1028.

Step 1026 converts the received agglomeration data to an APFLOAT number and adds it to the accumulated result. Sub-process 1020 terminates at step 1040, returning control to the invoking process.

Step 1028 is a decision. If the agglomeration type is floating point addition, sub-process 1020 continues with step 1030; otherwise sub-process 1020 continues with step 1032.

Step 1030 converts the received agglomeration data to a floating point number and adds it to the accumulated result. Sub-process 1020 terminates at step 1040, returning control to the invoking process.

Step 1032 is a decision. If the agglomeration type is save largest, sub-process 1020 continues with step 1034; otherwise sub-process 1020 continues with step 1036.

Step 1034 compares the received agglomeration result with a stored value, and, if larger, replaces the stored value with the received agglomeration data. Sub-process 1020 terminates at step 1040, returning control to the invoking process.

Step 1036 is a decision. If the agglomeration type is result list, sub-process 1020 continues with step 1038; otherwise sub-process 1020 terminates at step 1040, returning control to the invoking process.

Step 1038 adds the result pointer to the result list and increments the result counter. Sub-process 1020 terminates at step 1040, returning control to the invoking process.

Figure 56:
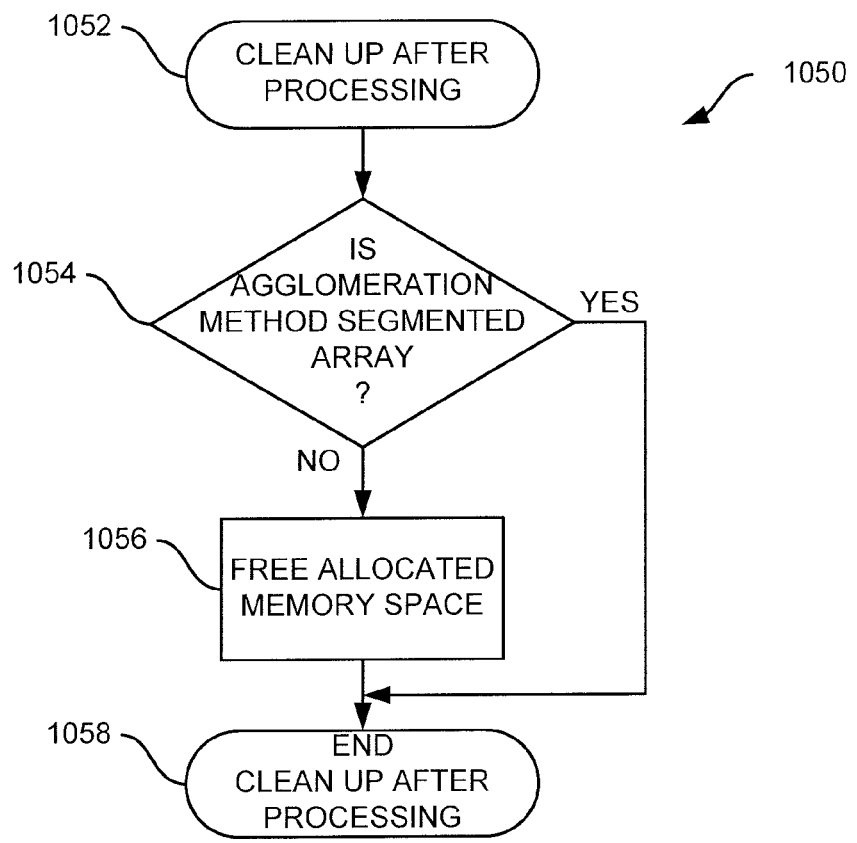

FIG. 56 is a flowchart illustrating one sub-process 1050 for cleaning up the used result space after agglomeration is complete. Sub-process 1050 starts at step 1052 and continues with step 1054.

Step 1054 is a decision. If the agglomeration method was ROWMESH, sub-process 1050 terminates at step 1058, retuning control to the invoking process; otherwise sub-process 1050 continues with step 1056.

Step 1056 frees the allocated memory space. Sub-process 1050 terminates at step 1058, retuning control to the invoking process.

FIG. 57 is a flowchart illustrating one sub-process 1070 for returning the local or agglomerated results to the correct processing node or the home node. Sub-process 1070 starts at step 1072 and continues with step 1074.

Figure 58:
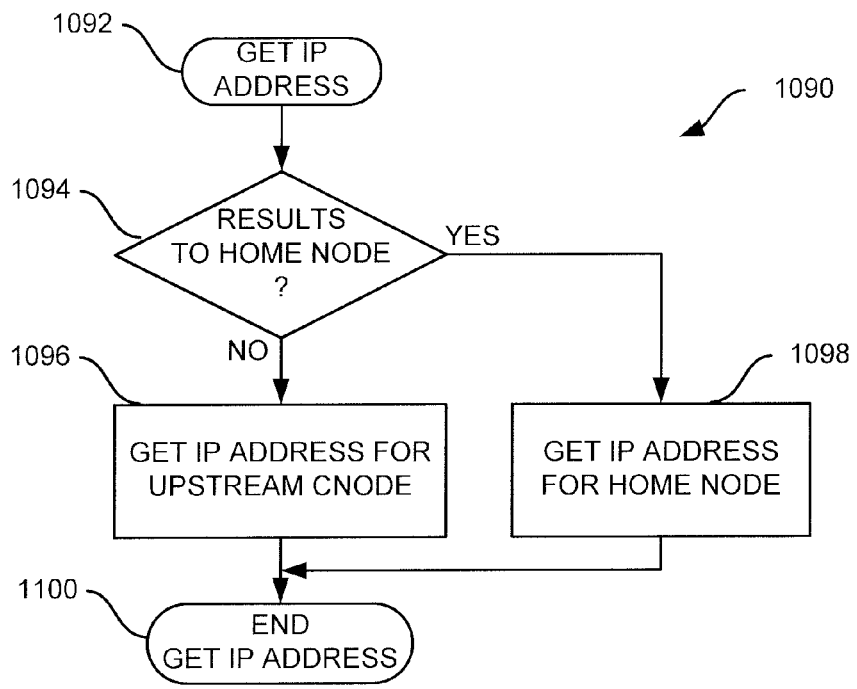

Step 1074 invokes a sub-process to get the address of the destination node to receive the results, defined in FIG. 58. Sub-process 1070 continues with step 1076.

Figure 59:
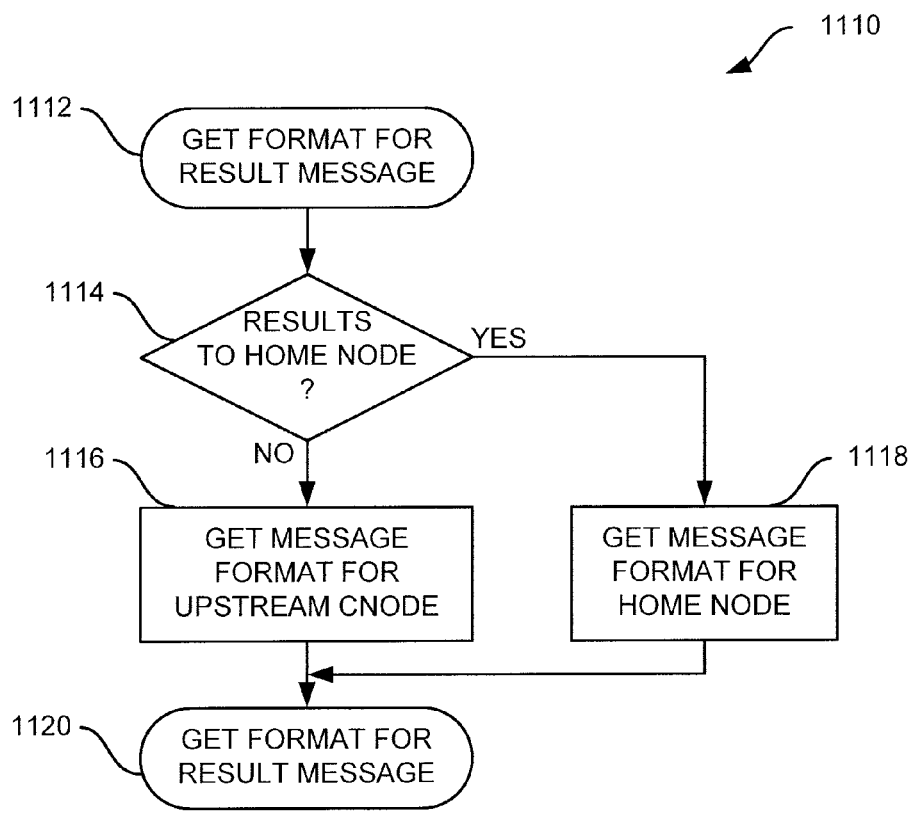

Step 1076 invokes a sub-process to get the format for the result message, defined in FIG. 59. Sub-process 1070 continues with step 1078.

Figure 60:
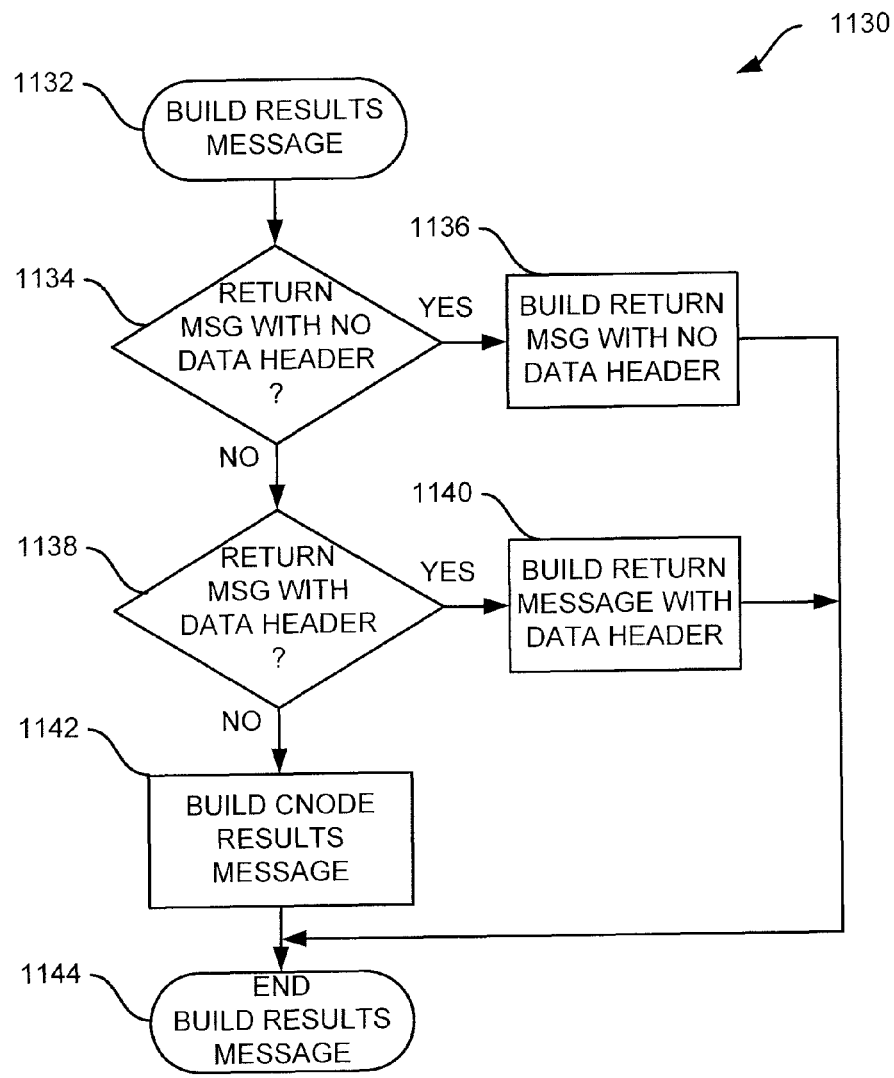

Step 1078 invokes a sub-process to build the result message, defined in FIG. 60. Sub-process 1070 continues with step 1080.

Figure 61:
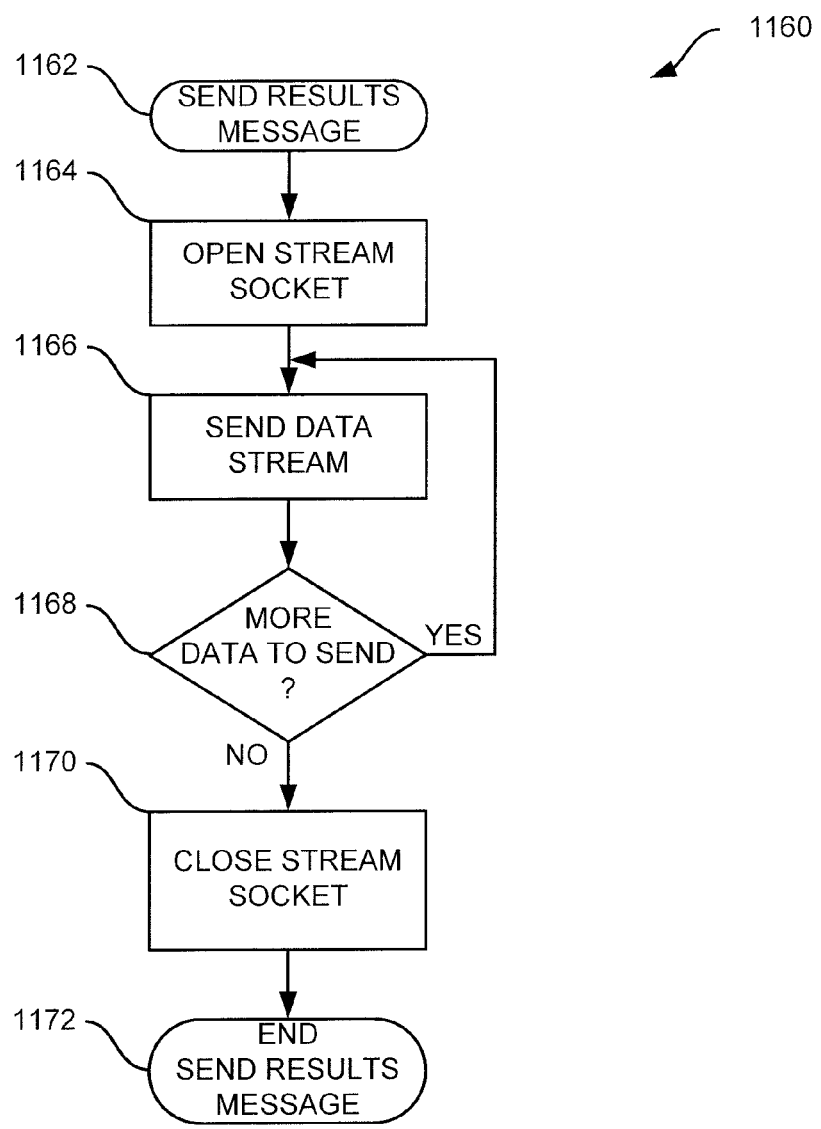

Step 1080 invokes a sub-process to send the result message to the destination node, defined in FIG. 61. Sub-process 1070 terminates at step 1082, returning control to the invoking process.

FIG. 58 is a flowchart illustrating one sub-process 1090 for determining the address of the node to receive the agglomeration results. Sub-process 1090 starts at step 1092 and continues with step 1094.

Step 1094 is a decision. If the results are to be sent to the home node, sub-process 1090 continues with step 1098; otherwise sub-process 1090 continues with step 1096.

Step 1096 gets the address for the upstream processing node. Sub-process 1090 terminates at step 1100, returning control to the invoking process.

Step 1098 gets the address of the home node. Sub-process 1090 terminates at step 1100, returning control to the invoking process.

FIG. 59 is a flowchart illustrating one sub-process 1110 for getting the format of the results message. Sub-process 1110 starts at step 1112 and continues with step 1114.

Step 1114 is a decision. If the result is for the home node, sub-process 1110 continues with step 1118, otherwise sub-process 1110 continues with step 1116.

Step 1116 gets the message format for the upstream processing node. Sub-process 1110 terminates at step 1120, returning control to the invoking process.

Step 1118 gets the message format for the home node. Sub-process 1110 terminates at step 1120, returning control to the invoking process.

FIG. 60 is a flowchart illustrating one sub-process 1130 for building the results message. Sub-process 1130 starts at step 1132 and continues with step 1134.

Step 1134 is a decision. If the message is to be returned without a data header, sub-process 1030 continues with step 1136; otherwise sub-process 1130 continues with step 1138.

Step 1136 builds the message without a data header. Sub-process 1130 terminates at step 1144, returning control to the invoking process.

Step 1138 is a decision. If the message it to be built with a data header, sub-process 1130 continues with step 1140; otherwise sub-process 1130 continues with step 1142.

Step 1142 builds a processing node results message. Sub-process 1130 terminates at step 1144, returning control to the invoking process.

FIG. 61 is a flowchart illustrating one sub-process 1160 for sending the results message. Sub-process 1160 starts at step 1162 and continues with step 1164.

Step 1164 opens the stream socket to the destination node. Sub-process 1160 continues with step 1166.

Step 1166 sends the data down the stream. Sub-process 1160 continues with step 1168.

Step 1168 is a decision. If there is more data to send, sub-process 1160 continues with step 1166; otherwise sub-process 1160 continues with step 1170.

Step 1170 closes the stream socket. Sub-process 1160 terminates at step 1172, returning control to the invoking process.

Using Heterogeneous Computer Systems and Communication Channels to Build an HCAS.

While it is preferred to use computer systems and communication channels of equal specification and performance in an HCAS, the HCAS may be constructed from systems and channels of varying specifications without any significant loss in system efficiency. For example, computer systems with differing processor speeds, single or multiple processor motherboards, and varying numbers of NICs can be utilized as home nodes and processing nodes in the same HCAS.

In parallel processing systems of the prior art, such imbalance of node specification would cause processing imbalances and hence significant efficiency losses in the cluster. On an HCAS, however, load balancing can be performed automatically.

As appreciated by those skilled in the art, many techniques are available for load balancing on parallel processing clusters. One technique that may be utilized on an HCAS is to proportionately allocate the amount of processing required by each processing node based on its processing and communication capability. For example, a processing node with a slower processor clock may be allocated less data to process, or elements to calculate in a series expansion, than a processing node with a faster processor clock. In another example, two processing nodes have identical processor clock speeds, but the first processing node has a communication channel with twice the bandwidth of the second processing node. The first processing node would be allocated more data than the second processing node as it would be able to receive more data in the time taken for the second processing node to receive data.

The expansion of the algorithm processing request in a HC is less influenced by the communication channel speed due to the small message size. Any imbalances in system performance during problem expansion due to communication channel bandwidth imbalances are insignificant.

FURTHER EXAMPLES

The following sections provide further examples of algorithms that may be run on the HCAS.

Decomposition of Two-Dimensional Object Transformation Data For Parallel Processing Geometric transformations of a two-dimensional object include translation, scaling, rotation, and shearing. This section describes how the geometric transformation of a 2D object may be implemented on a HC, in one embodiment. The data partitioning handles an arbitrary number of parallel processing nodes and arbitrarily large objects.

A 2D object may be defined by its endpoints, expressed as coordinates in the (x,y) plane. Let the matrix $M_{XY}$ represent these N endpoints as column vectors:

$$M_{XY} = \begin{bmatrix} X & x_1 & x_1 & \ldots & x_N \\ Y & y_1 & y_1 & \ldots & y_N \end{bmatrix}$$

The endpoints are converted to homogeneous coordinates, setting the third coordinate to 1, to create a new matrix $M_H$:

$$M_H = \begin{bmatrix} x_1 & x_1 & x_1 & \ldots & x_N \\ y_1 & y_1 & y_1 & \ldots & y_N \\ 1 & 1 & 1 & \ldots & 1 \end{bmatrix}$$

This conversion to homogeneous coordinates reduces the 2D transformation problem to the matrix multiplication problem: $M_T = T \times M_H$, where T represents a 3×3 transform matrix and $M_H$ is the 2D object expressed as a 3×N matrix of homogeneous coordinates. The resulting product $M_T$ represents the transformation of the original 2D object.

The transform matrix T may equal one of the following matrices, depending on the type of transformation:

$$T_{translate} = \begin{bmatrix} 1 & 0 & t_x \\ 0 & 1 & t_y \\ 0 & 0 & 1 \end{bmatrix}$$

$t_x$ = translation offset in $x$-direction
$t_y$ = translation offset in $y$-direction $$T_{scale} = \begin{bmatrix} s_x & 0 & 0 \\ 0 & s_y & 0 \\ 0 & 0 & 1 \end{bmatrix}$$

$s_x$ = scale factor in $x$-direction
$x_y$ = scale factor in $y$-direction $$T_{rotate} = \begin{bmatrix} \cos\theta & - & 0 \\ \sin\theta & \cos\theta & 0 \\ 0 & 0 & 1 \end{bmatrix}$$

$\theta$ = angle of rotation about the origin $$T_{shear} = \begin{bmatrix} 1 & sh_x & 0 \\ sh_y & 1 & 0 \\ 0 & 0 & 1 \end{bmatrix}$$

$sh_x$ = shear constant in $x$-direction
$sh_y$ = shear constant in $y$-direction Now the 2D object transformation problem has been reduced to a matrix multiplication problem to be implemented on the HC. An arbitrary matrix is shown below in Table 21 an array of numbers arranged in J rows and K columns.

Data partitioning evenly distributes the elements of a matrix over the parallel processing nodes.

TABLE 21

A Matrix for the HC

|      |   | columns |     |     |     |     |
|------|---|---------|-----|-----|-----|-----|
|      |   | 1       | 2   | 3   | ... | K   |
| rows | 1 | 1,1     | 1,2 | 1,3 | ... | 1,K |
|      | 2 | 2,1     | 2,2 | 2,3 | ... | 2,K |
|      | 3 | 3,1     | 3,2 | 3,3 | ... | 3,K |
|      | ...| ...    | ... | ... | ... | ... |
|      | J | J,1     | J,2 | J,3 | ... | J,K |

Consider the matrix multiplication problem $M_T = T \times M$, where matrix T has dimensions 3×3, matrix M has dimensions 3×N, and the resulting product $M_T$ also has dimensions 3×N. Let 3×N represent the size of the product $M_T$. In the HC implementation of matrix multiplication, each of the P parallel processing nodes receives a copy of T and M. Assuming 3×N>P, the solution size 3×N is divided by the number of nodes P to obtain an integer quotient W and a remainder R. W elements are assigned to each of the P nodes. Any remainder R is distributed, one element per node, to each of the first R nodes. Thus the first R nodes are assigned an element count of W+1, and each and the remaining P-R nodes are assigned an element count of W. The total number of elements assigned equals: R(W+1)+(P-R)W=PW+R=3×N.

The described approach maintains the node computational load balanced to within one element.

Consider the distribution of a product matrix $M_T$ consisting of 3 rows and 50 columns on a 7-node HC. In this case, the integer quotient W is 150/7=21, and the remainder R is 3. Processing nodes $P_1$ through $P_3$ are assigned 22 elements each; nodes $P_4$ through $P_7$ are assigned 21 each. The matrix data partitioning is shown in Table 22, computed with 150 total elements.

TABLE 22

Matrix Data Partitioning

| Processing Node | Row Index | Column Indices of Elements Computed | Number of Elements Computed Per Row |
|---|---|---|---|
| $P_1$ | 1 | 1 → 22 | 22 |
| $P_2$ | 1 | 23 → 44 | 22 |
| $P_3$ | 1 | 45 → 50 | 6 |
|       | 2 | 1 → 16 | 16 |
| $P_4$ | 2 | 17 → 37 | 21 |
| $P_5$ | 2 | 38 → 50 | 13 |
|       | 3 | 1 → 8 | 8 |
| $P_6$ | 3 | 9 → 29 | 21 |
| $P_7$ | 3 | 30 → 50 | 21 |

Processing node $P_1$ multiplies row 1 of transform matrix T with columns 1 through 22 of object matrix M to compute its part of the result. Processing node $P_2$ multiplies row 1 of transform matrix T with columns 23 through 44 of object matrix M to compute its part of the result. Processing node $P_3$ uses rows 1 and 2 of transform matrix T and columns 1 through 16 and 45 through 50 of object matrix M to compute its result. The distribution of work is spread similarly for processing nodes $P_4$ through $P_7$.

The home node performs the matrix data partitioning. Messages describing the command (in this case a matrix multiply) and data partitioning are sent out to the processing nodes. Once the nodes have received their command messages, they wait for the home node to send the input matrix data. The data may be broadcast such that all nodes in the cascade receive it at the same time. Each node thus receives both of the input matrices, which may be more efficient than sending each individual node a separate message with just its piece of input data. This is especially important when considering large numbers of parallel processing nodes. Once a node receives the input matrices, it can proceed with computing the product independent of the other nodes. When the matrix multiply results are ready, they are accumulated up to the home node and merged into the final result. At this point the process is complete.

As this example shows, the 2D object transformation data distribution applied to the HC accommodates arbitrary sized objects in a simple and efficient manner.

Decomposition of Matrix Multiplication Data For Parallel Processing

This section describes how matrix multiplication may be implemented on a HC. The described matrix partitioning can handle an arbitrary number of parallel processing nodes and arbitrarily large matrices.

An arbitrary matrix is shown in Table 23 as an array of numbers arranged in M rows and N columns. Data partitioning evenly distributes the elements of the matrix over the parallel processing nodes.

TABLE 23

Matrix Distribution on a HC

| | | columns | | | |
|---|---|---|---|---|---|
| | | 1 | 2 | 3 | ... N |
| rows | 1 | 1, 1 | 1, 2 | 1, 3 | ... 1, N |
| | 2 | 2, 1 | 2, 2 | 2, 3 | ... 2, N |
| | 3 | 3, 1 | 3, 2 | 3, 3 | ... 3, N |
| | ... | ... | ... | ... | ... |
| | M | M, 1 | M, 2 | M, 3 | ... M, N |

Consider the matrix multiplication problem A×B=C, where input matrix A has dimensions M×N, input matrix B has dimensions N×Q, and the resulting product C has dimensions M×Q. Let E=M×Q represent the size of the product C. In the matrix multiplication implementation, each of the P parallel processing nodes receives a copy of A and B. Assuming E>P, solution size E is divided by the number of nodes P to obtain an integer quotient W and a remainder R. W elements are assigned to each of the P nodes. Any remainder R is distributed, one element per node, to each of the first R nodes. Thus the first R nodes are assigned an element count of $E_i$=W+1 each and the remaining P-R nodes will be assigned an element count of $E_i$=W. The total number of elements assigned equals R(W+1)+(P−R)W=PW+R=E.

Once again, the node computational load is balanced to within one element.

Consider the distribution of a product matrix consisting of 50 rows and 50 columns on a 7-node HC. In this case, the integer quotient Q is 2500÷7=357 and the remainder R is 1. Processing node $P_1$ is assigned 358 elements; nodes $P_2$ through $P_7$ are assigned 357 each. The matrix data partitioning is shown in Table 24.

TABLE 24

50 × 50 Matrix Partitioning

| Processing Node | Row Index | Column Indices of Elements Computed | Number of Elements Computed Per Row |
|---|---|---|---|
| $P_1$ | 1 | 1 → 50 | 50 |
| | 2 | 1 → 50 | 50 |
| | ... | ... | ... |
| | 7 | 1 → 50 | 50 |
| | 8 | 1 → 8 | 8 |
| Total Number of Elements Computed: 358 | | | |
| $P_2$ | 8 | 9 → 50 | 42 |
| | 9 | 1 → 50 | 50 |
| | ... | ... | ... |
| | 14 | 1 → 50 | 50 |
| | 15 | 1 → 15 | 15 |
| Total Number of Elements Computed: 357 | | | |
| $P_i$ | 7i − 6 | 7i − 5 → 50 | 51 − (7i − 5) |
| | 7i − 5 | 1 → 50 | 50 |
| | ... | ... | ... |
| | 7i | 1 → 50 | 50 |
| | 7i + 1 | 1 → 7i + 1 | 7i + 1 |
| Total Number of Elements Computed: 357 | | | |
| $P_7$ | 43 | 44 → 50 | 7 |
| | 44 | 1 → 50 | 50 |
| | ... | ... | ... |
| | 49 | 1 → 50 | 50 |
| | 50 | 1 → 50 | 50 |
| Total Number of Elements Computed: 357 | | | |

Processing node $P_1$ computes rows 1 through 7 for all columns, then computes row 8 for columns 1 through 8 only, for a total of 358 elements computed. $P_1$ uses the first 8 rows of matrix A and all of matrix B to compute its result.

Processing node $P_2$ computes row 8 for columns 9 through 50, rows 9 through 14 for all columns, and row 15 for columns 1 through 15, totaling 357 elements computed. $P_2$ uses rows 8 through 15 of matrix A and all of matrix B to compute its result.

Processing node $P_i$ for 1<i≦7, computes elements 357(i−1)+2 through 357i+1. Dividing by column width 50 produces a row index range of 7i−6 through 7i+1. The first row, 7i−6, is computed for columns 7i−5 through 50. The last row, 7i+1, is computed for columns 1 through 7i+1. The remaining rows are computed for all columns. The total number of elements computed equals 51−(7i−5)+6(50)+7i+1=56−7i+300+7i+1=357. $P_i$ uses rows 7i−6 through 7i+1 of matrix A and all of matrix B to compute its result.

The home node performs the matrix data partitioning. Messages describing the command (in this case a matrix multiply) and data partitioning are sent out to the processing nodes. Once the nodes have received their command messages, they wait for the home node to send the input matrix data. The data is broadcast such that all nodes in the cascade receive it at the same time. Each node receives both of the input matrices, which is much more efficient than sending each individual node a separate message with just its piece of input data.

Once a node receives the input matrices, it can proceed with computing the product independent of the other nodes. When the matrix multiply results are ready, they are accumulated up to the home node and merged into the final result. At this point the process is complete. As this example shows, matrix data distribution applied to the HC accommodates arbitrary sized matrices in a simple and efficient manner.

Decomposition of Parallel Processing Data For Two-Dimensional Convolution Using Fast Fourier Transforms This section describes how a two-dimensional convolution using Fast Fourier Transforms may be partitioned on a HC. The partitioning can handle an arbitrary number of parallel processing nodes and arbitrarily large images.

Consider an image containing M rows and N columns of pixel values and a smaller kernel image containing J rows and K columns (J≦M, K≦N). An efficient method for performing 2D convolution on the image and kernel involves the use of 2D Fast Fourier Transforms. First, the kernel is padded to match the size of the image. Then, a 2D FFT is performed on the image and kernel separately. The results are multiplied, per element, and then an inverse 2D FFT is applied to the product. The final result is equivalent to computing the 2D convolution directly.

An arbitrary input image and kernel are shown below in Tables 25 and 26, respectively, as arrays of pixels. Each parallel processing node receives a copy of the entire kernel. The image is evenly distributed by rows or columns over the processing nodes; the data partitioning here is described by row distribution.

TABLE 25

Image Matrix

| | | columns | | | |
|---|---|---|---|---|---|
| | | 1 | 2 | 3 | ... N |
| rows | 1 | 1, 1 | 1, 2 | 1, 3 | ... 1, N |
| | 2 | 2, 1 | 2, 2 | 2, 3 | ... 2, N |
| | 3 | 3, 1 | 3, 2 | 3, 3 | ... 3, N |
| | ... | ... | ... | ... | ... |
| | M | M, 1 | M, 2 | M, 3 | ... M, N |

TABLE 26

Kernel Matrix

| | | columns | | |
|---|---|---|---|---|
| | | 1 | 2 | ... K |
| Rows | 1 | 1, 1 | 1, 2 | ... 1, K |
| | 2 | 2, 1 | 2, 2 | ... 2, K |
| | ... | ... | ... | ... |
| | J | J, 1 | J, 2 | ... J, K |

The M rows of the input image are evenly distributed over P parallel processing nodes. The rows assigned to a node are defined by the starting row, referred to as row index, $IR_i$, and a row count, $M_i$. Rows are not split across nodes, so the row count is constrained to whole numbers. Assuming M>P, M rows is divided by P nodes to obtain an integer quotient Q and a remainder R. Q contiguous rows are assigned to each of the P nodes. Any remainder R is distributed, one row per node, to each of the first R nodes. Thus the first R nodes are assigned a row count of $M_i$=Q+1 each and the remaining P−R nodes are assigned a row count of $M_i$=Q. The total number of rows assigned equals R(Q+1)+(P−R)Q=PQ+R=M. The row index, $IR_i$, for the first R nodes equals (i−1)(Q+1)+1. For the remaining P−R nodes, $IR_i$ equals (i−1)Q+R+1.

This described approach of this section maintains the node computational load balanced to within one row. The mapping of rows to nodes is illustrated below in Table 27.

TABLE 27

Row Data Partitioning

| Node | 1 | 2 | 3 | ... N |
|---|---|---|---|---|
| $P_1$ | $IR_1$, 1 | $IR_1$, 2 | $IR_1$, 3 | ... $IR_1$, N |
| | $IR_1$ + 1, 1 | $IR_1$ + 1, 2 | $IR_1$ + 1, 3 | ... $IR_1$ + 1, N |
| | ... | ... | ... | ... |
| | $IR_1$ + $M_1$, 1 | $IR_1$ + $M_1$, 2 | $IR_1$ + $M_1$, 3 | ... $IR_1$ + $M_1$, N |
| $P_2$ | $IR_2$, 1 | $IR_2$, 2 | $IR_2$, 3 | ... $IR_2$, N |
| | $IR_2$ + 1, 1 | $IR_2$ + 1, 2 | $IR_2$ + 1, 3 | ... $IR_2$ + 1, N |
| | ... | ... | ... | ... |
| | $IR_2$ + $M_2$, 1 | $IR_2$ + $M_2$, 2 | $IR_2$ + $M_2$, 3 | ... $IR_2$ + $M_2$, N |
| ... | ... | ... | ... | ... |
| $P_P$ | $IR_P$, 1 | $IR_P$, 2 | $IR_P$, 3 | ... $IR_P$, N |
| | $IR_P$ + 1, 1 | $IR_P$ + 1, 2 | $IR_P$ + 1, 3 | ... $IR_P$ + 1, N |
| | ... | ... | ... | ... |
| | $IR_P$ + $M_P$, 1 | $IR_P$ + $M_P$, 2 | $IR_P$ + $M_P$, 3 | ... $IR_P$ + $M_P$, N |

$IR_i$ = row index
$M_i$ = row count for processor $P_i$
M = number of rows
N = number of columns Consider the distribution of an image consisting of 1024 rows and 700 columns on a 7-node HC. In this case, the integer quotient Q is 1024÷7=146 and the row remainder R is 2. Processing nodes $P_1$ and $P_2$ are assigned 147 rows each; nodes $P_3$ through $P_7$ are assigned 146 each. The row index for $P_1$ is 1, the row index for $P_2$ is 148, etc., up to $P_7$, which has a row index of 879.

At the start of a HC computation, messages describing the command (in this case a 2D convolution) are sent out to the processing nodes. Once the nodes have received their command messages, they wait for the home node to send the input data. The data is broadcast such that all nodes in the cascade receive it at the same time. Each node receives the entire dataset, which is more efficient than sending each individual node a separate message with just its piece of data.

Once a node receives the input data, it proceeds with performing the 2D convolution in its assigned rows independent of the other nodes. When the individual results are ready, they are accumulated up to the home node and merged into the final result. At this point the process is complete.

As this example shows, the data distribution as applied to the HC accommodates arbitrary sized images and kernels in a simple and efficient manner.

Decomposition of a Linear System of Equations For Parallel Processing

This section describes a solution of a linear system of equations Ax=b partitioned on a HC. The following partitioning method handles an arbitrary number of parallel processing nodes and arbitrarily large systems of equations. Consider the solution of the equation Ax=b, or, more specifically:

$$a_{1,1}x_1 + a_{1,2}x_2 + a_{1,3}x_3 + ... + a_{1,N}x_N = b_1$$
$$a_{2,1}x_1 + a_{2,2}x_2 + a_{2,3}x_3 + ... + a_{2,N}x_N = b_2$$
$$a_{3,1}x_1 + a_{3,2}x_2 + a_{3,3}x_3 + ... + a_{3,N}x_N = b_3$$
$$...$$
$$a_{N,1}x_1 + a_{N,2}x_2 + a_{N,3}x_3 + ... + a_{N,N}x_N = b_N$$

where A is an N×N matrix of coefficients, b is an N×1 column vector, and x is the N×1 solution being sought.

To solve for x, an LU factorization is performed on A. LU factorization results in a lower triangular matrix L and upper triangular matrix U such that A=L×U. Substituting for A in the original equation, LUx=b or Ux=$L^{-1}$b, and x may also be solved.

First, A and b are combined into a single input matrix with N rows and N+1 columns, as shown in Table 28. Data partitioning evenly distributes the rows of the input matrix over the parallel processing nodes.

TABLE 28

Input Matrix $$\begin{bmatrix} a_{1,1} & a_{1,2} & a_{1,3} & ... & a_{1,N} & b_1 \\ a_{2,1} & a_{2,2} & a_{2,3} & & a_{2,N} & b_2 \\ a_{3,1} & a_{3,2} & a_{3,3} & & a_{3,N} & b_3 \\ ... & & ... & & & \\ a_{N,1} & a_{N,2} & a_{N,3} & & a_{N,N} & b_N \end{bmatrix}$$

The N rows of the input matrix are evenly distributed over P parallel processing nodes. The rows assigned to a node are defined by the starting row, referred to as row index, $IR_i$, and a row count, $N_i$. Rows are not split across nodes, so the row count is constrained to whole numbers. Assuming N>P, N rows is divided by P nodes to obtain an integer quotient Q and a remainder R. Q contiguous rows are assigned to each of the P nodes. Any remainder R is distributed, one row per node, to each of the first R nodes. Thus the first R nodes is assigned a row count of $N_i=Q+1$ each and the remaining P–R nodes is assigned a row count of $N_i=Q$. The total number of rows assigned equals $R(Q+1)+(P-R)Q=PQ+R=N$. The row index, $IR_i$, for the first R nodes equals $(i-1)(Q+1)+1$. For the remaining P–R nodes, $IR_i$ equals $(i-1)Q+R+1$.

This described approach of this section again maintains node computational load balanced to within one row. The mapping of rows to nodes is illustrated in Table 29.

TABLE 29

Mapping of Rows to Nodes

| Node | 1 | 2 | 3 | ... N + 1 |
|---|---|---|---|---|
| $P_1$ | $IR_1, 1$ | $IR_1, 2$ | $IR_1, 3$ | ... $IR_1, N + 1$ |
|  | $IR_1 + 1, 1$ | $IR_1 + 1, 2$ | $IR_1 + 1, 3$ | ... $IR_1 + 1, N + 1$ |
|  | ... | ... | ... | ... |
|  | $IR_1 + N_1, 1$ | $IR_1 + N_1, 2$ | $IR_1 + N_1, 3$ | ... $IR_1 + N_1, N + 1$ |
| $P_2$ | $IR_2, 1$ | $IR_2, 2$ | $IR_2, 3$ | ... $IR_2, N + 1$ |
|  | $IR_2 + 1, 1$ | $IR_2 + 1, 2$ | $IR_2 + 1, 3$ | ... $IR_2 + 1, N + 1$ |
|  | ... | ... | ... | ... |
|  | $IR_2 + N_2, 1$ | $IR_2 + N_2, 2$ | $IR_2 + N_2, 3$ | ... $IR_2 + N_2, N + 1$ |
| ... | ... | ... | ... | ... |
| $P_P$ | $IR_P, 1$ | $IR_P, 2$ | $IR_P, 3$ | ... $IR_P, N + 1$ |
|  | $IR_P + 1, 1$ | $IR_P + 1, 2$ | $IR_P + 1, 3$ | ... $IR_P + 1, N + 1$ |
|  | ... | ... | ... | ... |
|  | $IR_P + N_P, 1$ | $IR_P + N_P, 2$ | $IR_P + N_P, 3$ | ... $IR_P + N_P, N + 1$ |

$IR_i$ = row index
$N_i$ = row count for processor $P_i$
N = number of rows

Consider the distribution of an input matrix of 100 rows and 101 columns on a 7-node HC. In this case, the integer quotient Q is 10100÷7=1442 and the row remainder R is 6. Processing nodes $P_1$ through $P_6$ are assigned 1443 rows each; node $P_7$ is assigned 1442 rows. The row index for $P_1$ is 1, the row index for $P_2$ is 1444, etc., up to $P_7$, which has a row index of 8659.

The home node performs the matrix data partitioning of this section. Messages describing the command (in this case a linear solve) and data partitioning are sent out to the processing nodes. Once the nodes have received their command messages, they wait for the home node to send the input matrix data. The data may be broadcast such that all nodes in the cascade receive it at the same time. Each node may thus receive the entire dataset, which may be more efficient than sending each individual node a separate message with just its piece of data.

Once a node receives the input matrix, it proceeds with solving the linear system in its assigned rows, and independent of the other nodes except when sharing data to determine the pivot row at each iteration. When the individual results are ready, they are accumulated up to the home node and merged into the final result. At this point the process is complete.

As this example shows, the data distribution applied to the HC accommodates arbitrary sized linear systems of equations in a simple and efficient manner.

Those skilled in the art will appreciate that variations from the specified embodiments disclosed above are contemplated herein. The description should not be restricted to the above embodiments, but should be measured by the following claims.

The invention claimed is:

1. A method for parallel computation comprising:
   transmitting an algorithm computation request and associated data from a requesting host to a home node of a computing system wherein the request includes a requested number (N) of processing nodes to be applied to computation of the request;
   distributing the computation request from the home node to a plurality of processing nodes including N processing nodes coupled to the home node, wherein the computation request is distributed in a hierarchical order time interval sequence such that the N processing nodes form a Howard Cascade structure;
   broadcasting the associated data from the home node to all of the plurality of processing nodes;
   agglomerating a final computation result from partial computation results received from the plurality of processing nodes wherein the agglomeration is performed in the reverse order of the hierarchical ordering; and
   returning the final computation result from the home node to the requesting host.

2. The method of claim 1 wherein the step of distributing comprises:
   distributing the computation request to the N processing nodes in a time sequence hierarchical order.

3. The method of claim 1 wherein the step of distributing comprises:
   distributing the computation request to the N processing nodes in a hierarchical order so as to minimize the utilization of communication channels coupling the N processing nodes to one another and the communication channels coupling the N processing nodes to the home node.

4. The method of claim 1 wherein the step of distributing comprises:
   distributing the computation request to the N processing nodes in a hierarchical order time interval sequence, wherein each processing node includes a number of processors (P) and a number of communication channels (C) and wherein a first processing node that receives the computation request in a first time interval may forward the computation request to a second processing node hierarchically deeper than the first processing node in a next time interval and wherein the total number of time intervals (t) required to distribute the computation request to all processing nodes is at most:

$$t=\phi.\log((N+P)/P)/\log(C+1.\kappa.$$

5. The method of claim 1 further comprising:
   partitioning the associated data to generate data set information identifying a portion of the associated data to be utilized by each corresponding processing node, wherein the step of distributing includes distributing the data set information to the processing nodes.

6. The method of claim 5 further comprising:
   determining a performance measure for processing of each processing node, wherein the step of partitioning comprises: partitioning the associated data in accordance with the performance measure of each processing node to balance processing load between the processing nodes.

7. A computer readable storage medium tangibly embodying program instructions for a method for parallel computation, the method comprising:
   transmitting an algorithm computation request and associated data from a requesting host to a home node of a computing system wherein the request includes a requested number (N) of processing nodes to be applied to computation of the request;
   distributing the computation request from the home node to a plurality of processing nodes including N processing nodes coupled to the home node, wherein the computation request is distributed in a hierarchical order time interval sequence such that the N processing nodes form a Howard Cascade structure;

broadcasting the associated data from the home node to all of the plurality of processing nodes;

agglomerating a final computation result from partial computation results received from the plurality of processing nodes wherein the agglomeration is performed in the reverse order of the hierarchical ordering; and returning the final computation result from the home node to the requesting host.

8. The computer readable storage medium of claim 7 wherein the method step of distributing comprises: distributing the computation request to the N processing nodes in a time sequence hierarchical order.

9. The computer readable storage medium of claim 7 wherein the method step of distributing comprises: distributing the computation request to the N processing nodes in a hierarchical order so as to minimize the utilization of communication channels coupling the N processing nodes to one another and the communication channels coupling the N processing nodes to the home node.

10. The computer readable storage medium of claim 7 wherein the method step of distributing comprises: distributing the computation request to the N processing nodes in a hierarchical order time interval sequence, wherein each processing node includes a number of processors (P) and a number of communication channels (C) and wherein a first processing node that receives the computation request in a first time interval may forward the computation request to a second processing node hierarchically deeper than the first processing node in a next time interval and wherein the total number of time intervals (t) required to distribute the computation request to all processing nodes is at most:

$$t = \phi \cdot \log((N+P)/P)/\log(C+1) \cdot \kappa.$$

11. The computer readable storage medium of claim 7 wherein the method further comprises: partitioning the associated data to generate data set information identifying a portion of the associated data to be utilized by each corresponding processing node, wherein the method step of distributing includes distributing the data set information to the processing nodes.

12. The computer readable storage medium of claim 11 wherein the method further comprises: determining a performance measure for processing of each processing node, wherein the method step of partitioning comprises: partitioning the associated data in accordance with the performance measure of each processing node to balance processing load between the processing nodes.

13. A system for parallel computation comprising:

means for transmitting an algorithm computation request and associated data from a requesting host to a home node of a computing system wherein the request includes a requested number (N) of processing nodes to be applied to computation of the request;

means for distributing the computation request from the home node to a plurality of processing nodes including N processing nodes coupled to the home node, wherein the computation request is distributed in a hierarchical order time interval sequence such that the N processing nodes form a Howard Cascade structure;

means for broadcasting the associated data from the home node to all of the plurality of processing nodes;

means for agglomerating a final computation result from partial computation results received from the plurality of processing nodes wherein the agglomeration is performed in the reverse order of the hierarchical ordering; and means for returning the final computation result from the home node to the requesting host.

14. The system of claim 13 wherein the means for distributing comprises:

means for distributing the computation request to the N processing nodes in a time sequence hierarchical order.

15. The system of claim 13 wherein the means for distributing comprises:

means for distributing the computation request to the N processing nodes in a hierarchical order so as to minimize the utilization of communication channels coupling the N processing nodes to one another and the communication channels coupling the N processing nodes to the home node.

16. The system of claim 13 wherein the means for distributing comprises:

means for distributing the computation request to the N processing nodes in a hierarchical order time interval sequence, wherein each processing node includes a number of processors (P) and a number of communication channels (C) and wherein a first processing node that receives the computation request in a first time interval may forward the computation request to a second processing node hierarchically deeper than the first processing node in a next time interval and wherein the total number of time intervals (t) required to distribute the computation request to all processing nodes is at most:

$$t = \phi \cdot \log((N+P)/P)/\log(C+1) \cdot \kappa.$$

17. The system of claim 13 further comprising:

means for partitioning the associated data to generate data set information identifying a portion of the associated data to be utilized by each corresponding processing node, wherein the means for distributing includes distributing the data set information to the processing nodes.

18. The system of claim 17 further comprising:

means for determining a performance measure for processing of each processing node, wherein the means for partitioning comprises: means for partitioning the associated data in accordance with the performance measure of each processing node to balance processing load between the processing nodes.

* * * * *